United States Patent
Sunaga

(10) Patent No.: US 8,066,381 B2
(45) Date of Patent: Nov. 29, 2011

(54) POLARIZING BEAM SPLITTER, PROJECTION OPTICAL SYSTEM, PROJECTION DISPLAY

(75) Inventor: Toshihiro Sunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 607 days.

(21) Appl. No.: 12/192,207

(22) Filed: Aug. 15, 2008

(65) Prior Publication Data

US 2009/0046253 A1 Feb. 19, 2009

(30) Foreign Application Priority Data

Aug. 17, 2007 (JP) ................ P2007-212571

(51) Int. Cl.
*G03B 21/14* (2006.01)
*G02B 5/30* (2006.01)
*G02B 27/28* (2006.01)

(52) U.S. Cl. ............ 353/20; 359/485.03; 359/489.11

(58) Field of Classification Search ........... 353/20, 353/122; 359/483, 485, 487, 494–497, 499–501, 359/618, 629–630, 634, 485.03, 485.05–485.06, 359/489.11–489.13, 566

See application file for complete search history.

(56) References Cited

U.S. PATENT DOCUMENTS

| 6,672,721 | B2 | 1/2004 | Aastuen et al. | |
|---|---|---|---|---|
| 7,234,816 | B2 | 6/2007 | Bruzzone et al. | |
| 7,660,499 | B2 * | 2/2010 | Anderson et al. | 385/37 |
| 2003/0058408 | A1 * | 3/2003 | Magarill et al. | 353/20 |
| 2004/0130681 | A1 * | 7/2004 | Aastuen et al. | 353/20 |
| 2004/0196437 | A1 * | 10/2004 | Kang | 353/20 |
| 2004/0227994 | A1 | 11/2004 | Ma et al. | |
| 2005/0140932 | A1 * | 6/2005 | Magarill et al. | 353/33 |
| 2006/0098283 | A1 | 5/2006 | Sato | |

FOREIGN PATENT DOCUMENTS

| JP | 4-356038 | 12/1992 |
|---|---|---|
| JP | 9-138369 | 5/1997 |
| JP | 2003-131212 | 5/2003 |
| JP | 2004-533019 | 10/2004 |
| JP | 2006-003384 | 1/2006 |
| JP | 2006-301338 | 2/2006 |
| JP | 2007-504516 | 3/2007 |
| JP | 2007-520756 | 7/2007 |

\* cited by examiner

*Primary Examiner* — Tony Ko
*Assistant Examiner* — Jori S Reilly-Diakun
(74) *Attorney, Agent, or Firm* — Finnegan, Henderson, Farabow, Garrett & Dunner, LLP

(57) ABSTRACT

A polarizing beam splitter includes: first and second prisms each having first and second end surfaces serving as an input surface or an output surface of light and an opposed surface as side surfaces of a pillar-like member; and at least two parallel flat layers disposed in parallel between the opposed surfaces of the first and second prisms. Here, one of the least two parallel flat layers is a first parallel flat layer polarization-separating the input beam. When it is assumed that the refractive index of a base material of the first and second prisms is Np, the resultant refractive index of the parallel flat layers other than the other parallel flat layer of the at least two parallel flat layers is Na, and the refractive index of the other parallel flat layer of the at least two parallel flat layers is Nb, $(Na-Np) \times (Nb-Np) < 0$ is satisfied.

18 Claims, 26 Drawing Sheets

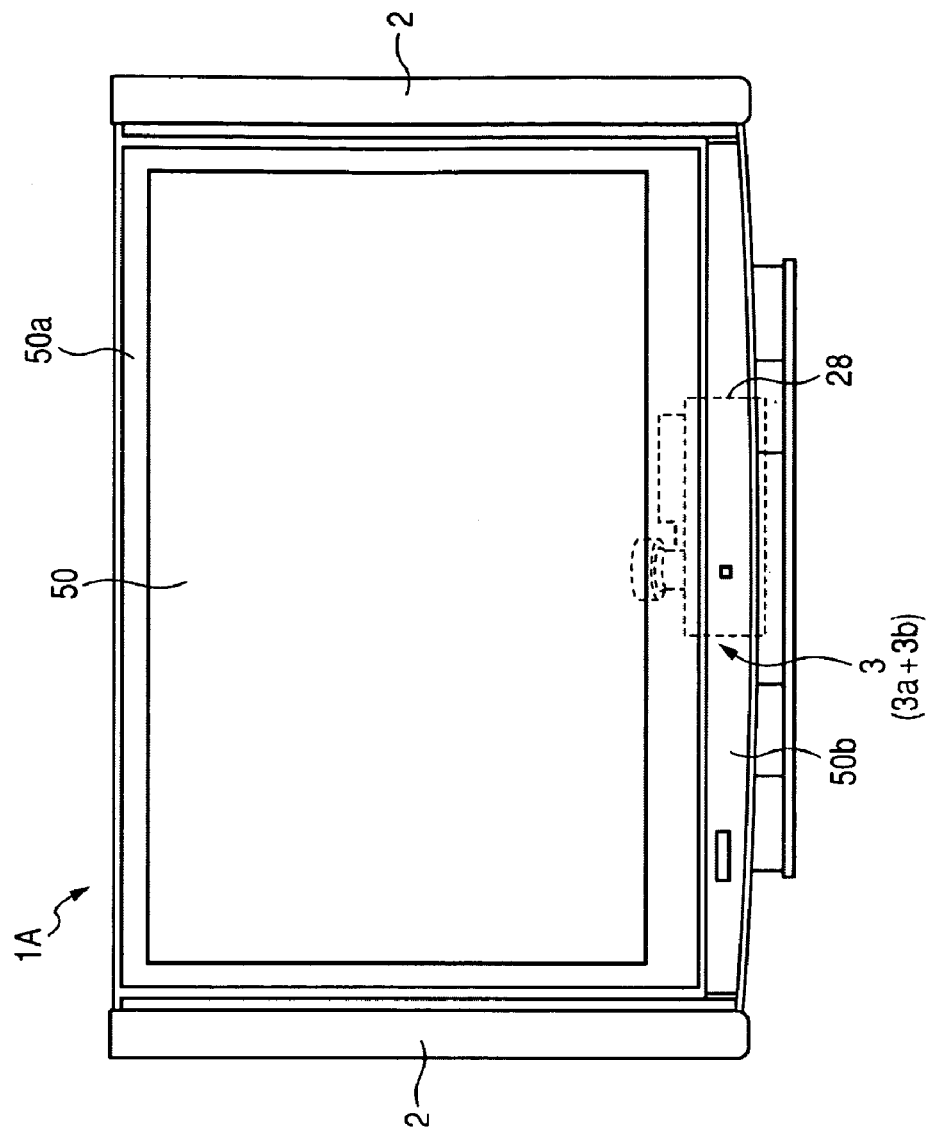
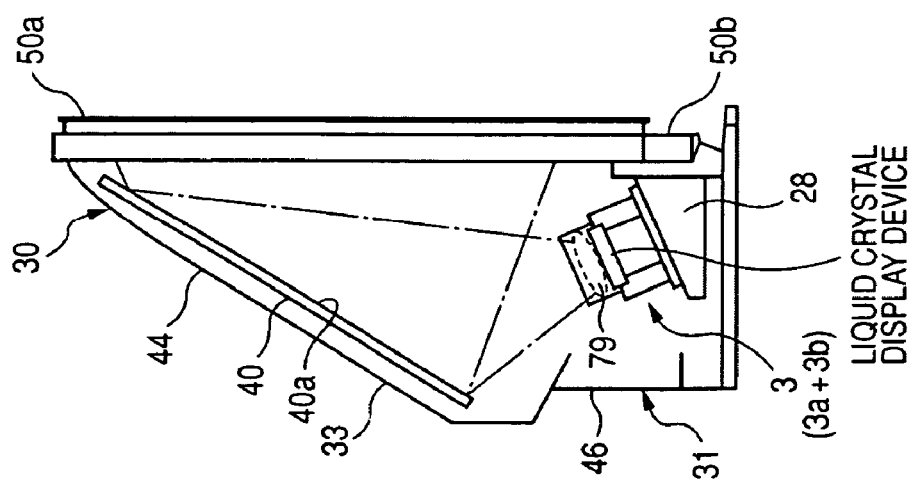
<CONFIGURATION OF REAR PROJECTION TYPE>

<CONFIGURATION OF FRONT EMISSION TYPE>
(APPLICATION TO CONFERENCE SYSTEM)

DEFOCUS CHARACTERISTIC
OF MTF (IDEAL STATE)

DEFOCUS CHARACTERISTIC
OF MTF (FIRST REFERENCE)

FIRST OPERATIONAL EXAMPLE

SECOND OPERATIONAL EXAMPLE

FIG. 7

<OPTICAL CONSTANT OF POLARIZING BEAM SPLITTER 100A>

| θ1 | t_106A | t_108A | N_102<br>N_104 | N_106A | N_108A |
|---|---|---|---|---|---|
| 45° | 0.5 mm | 0.5 mm | 1.59142 | 1.56605 | 1.62286 |

As_106A = 15.5 μm
As_108A = -15.8 μm

As_106A + As_108A = -0.3 μm

FIRST OPERATIONAL EXAMPLE

SECOND OPERATIONAL EXAMPLE

FIG. 13

<OPTICAL CONSTANT OF POLARIZING BEAM SPLITTER 100B>

| θ2 | t_106B | t_108B | N_102<br>N_104 | N_106B | N_108B |
|---|---|---|---|---|---|
| 45° | 0.7 mm | 0.4 mm | 1.56605 | 1.60548 | 1.51633 |

As_106B = -27.9 μm

As_108B = 27.6 μm

As_106B + As_108B = -0.3 μm

FIRST OPERATIONAL EXAMPLE

SECOND OPERATIONAL EXAMPLE

<OPTICAL CONSTANT OF POLARIZING BEAM SPLITTER 100C>

| θ3 | t_106C | t_108C | t_109C | N_102 N_104 | N_106C | N_108C | N_109C |
|---|---|---|---|---|---|---|---|
| 45° | 0.5 mm | 0.5 mm | 0.3 mm | 1.58 | 1.53 | 1.64 | 1.61 |

As_106C = 34.0 μm          As_106C + As_109C = 24.8 μm
As_108C = −27.9 μm
As_109C = −9.2 μm

As_106C + As_109C + As_108C = −3.1 μm

<VIEWPOINT ON RESULTANT REFRACTIVE INDEX: THIRD EMBODIMENT>

$\theta_p < \theta_{xc} \rightarrow N\_102 > N_{xc}$ $\theta_a > \theta_{xc} \rightarrow N\_106C < N_{xc}$
CONCLUSION: $N\_106C < N_{xc} < N\_102$

FIRST OPERATIONAL EXAMPLE

SECOND OPERATIONAL EXAMPLE

<OPTICAL CONSTANT OF POLARIZING BEAM SPLITTER 100D>

| θ4 | t_106D | t_108D | t_109D | N_102<br>N_104 | N_106D | N_108D | N_109D |
|---|---|---|---|---|---|---|---|
| 45° | 0.5 mm | 0.5 mm | 0.1 mm | 1.56 | 1.53 | 1.64 | 1.47 |

As_106D = 19.4 μm      As_106D + As_109D = 34.3 μm
As_108D = −35.8 μm
As_109D = 14.9 μm

As_106D + As_109D + As_108D = −1.5 μm

<VIEWPOINT ON RESULTANT REFRACTIVE INDEX: FOURTH EMBODIMENT>

θd > θxd → N_109D < Nxd
    CONCLUSION: N_109D < Nxd < N_106D

FIG. 27A

<OPTICAL CONSTANT OF POLARIZING BEAM SPLITTER 100A_R>

| $\theta 5\_R$ | $t\_106A\_R$ | $t\_108A\_R$ | $N\_102\_R$ $N\_104\_R$ | $N\_106A\_R$ | $N\_108A\_R$ |
|---|---|---|---|---|---|
| 45° | 0.6 mm | 0.6 mm | 1.5871 | 1.56188 | 1.61824 |

<OPTICAL CONSTANT OF POLARIZING BEAM SPLITTER 100A_G>

| $\theta 5\_G$ | $t\_106A\_G$ | $t\_108A\_G$ | $N\_102\_G$ $N\_104\_G$ | $N\_106A\_G$ | $N\_108A\_G$ |
|---|---|---|---|---|---|
| 45° | 0.5 mm | 0.5 mm | 1.59142 | 1.56605 | 1.62286 |

<OPTICAL CONSTANT OF POLARIZING BEAM SPLITTER 100A_B>

| $\theta 5\_B$ | $t\_106A\_B$ | $t\_108A\_B$ | $N\_102\_B$ $N\_104\_B$ | $N\_106A\_B$ | $N\_108A\_B$ |
|---|---|---|---|---|---|
| 45° | 0.4 mm | 0.4 mm | 1.601 | 1.57529 | 1.6331 |

$As\_106A\_B = 12.4\ \mu m$ $As\_108A\_B = -12.7\ \mu m$ $As\_106A\_B + As\_108A\_B = -0.3\ \mu m$

POLARIZING BEAM SPLITTER, PROJECTION OPTICAL SYSTEM, PROJECTION DISPLAY

CROSS REFERENCES TO RELATED APPLICATIONS

The present invention contains subject matter related to Japanese Patent Application JP 2007-212571 filed in the Japanese Patent Office on Aug. 17, 2007, the entire contents of which is incorporated herein by reference.

BACKGROUND OF THE INVENTION

1. Field of the Invention

The present invention relates to an optical prism (a so-called polarizing beam splitter) as an optical member used for a projection optical system for separating polarization by separating an input beam into two linearly-polarized beams perpendicular to each other, transmitting and outputting one polarized beam, and reflecting the other polarized beam, a projection optical device (projection optical system) employing the polarizing beam splitter, and a projection display such as a liquid projector having the projection optical device as a main part or a rear projection display displaying a projected image on a rear projection screen.

2. Description of the Related Art

Projection displays emitting a light beam from a light source to a small-sized image forming unit forming an optical image corresponding to an image signal and enlarging and projecting the optical image onto a screen by the use of a projection lens so as to obtain a large-sized image are known. An active-matrix liquid crystal panel modulating a light beam using polarization is widely and practically used in the image forming unit. A transmissive or reflective liquid crystal panels can be used as the liquid crystal panel, but the reflective liquid crystal panel enhancing a pixel aperture ratio even with a small size of the liquid crystal panel has attracted attention with the requirement for an increase in brightness, a decrease in size, and an increase in precision of the projection display. In the projection display employing the reflective liquid crystal panel, since an input portion and an output portion of the liquid crystal is the same, it is necessary to separate polarization by the use of a polarizing beam splitter.

FIGS. 29A and 29B are diagrams illustrating a known polarizing beam splitter and a basic optical system of a reflective liquid crystal projector having the polarizing beam splitter and a liquid crystal panel. Here, FIG. 29A is a diagram illustrating a polarization separating function of the polarizing beam splitter and FIG. 29B is a diagram illustrating the basic optical system of the reflective liquid crystal projector.

As shown in FIG. 29A, the known polarizing beam splitter 942 has a structure in which an optical member having a multi-layered film constituting a polarization separating surface 943a is disposed between slopes of two triangular glass prisms (rectangular prisms) 942a and 942b and they are bonded to each other. The polarizing beam splitter 942 has a function of allowing the polarization separating surface 943a to transmit a P polarization component of P and S polarization components input to the polarizing beam splitter 942 and allowing the polarization separating surface 943a to reflect the S polarization component.

As shown in FIG. 29B, a projection optical device 901 as a basic optical system of a projection display having the polarizing beam splitter 942 includes a light emitting unit 912, an image forming unit 914, and a projection lens 917 having an input lens 917a and a transmission lens 917b.

The light emitting unit 912 emits a light beam to the image forming unit 914 and the image forming unit 914 modulates the light beam on the basis of image information and inputs the modulated light beam as an image-projecting light beam to the input lens 917a of the projection lens 917. The image-projecting light beam input to the input lens 917a is projected onto a screen not shown by the transmission lens 917b of the projection lens 917, whereby an image is projected onto the screen.

The light emitting unit 912 specifically includes a light source (discharge lamp) 922 emitting a predetermined color beam (for example, white beam) and a light-emitting optical system 923. The light-emitting optical system 923 includes a reflecting mirror (parabolic mirror) 924 condensing the beam from the light source 922 and a lens group 925 disposed in front of the light source 922 in a straight line with respect to an optical axis. Only one convex lens is shown as the lens group 925 in the drawings, but for example, a UV cut filter or a condenser lens having a half wavelength plate may be provided.

The image forming unit 914 includes a polarizing beam splitter 942 and a reflective liquid crystal display (hereinafter, also referred to as a reflective liquid crystal panel) 970 generating a light beam corresponding to image information. As described above, the polarizing beam splitter 942 has a function of reflecting or transmitting an input beam depending on the polarization directions of the beam.

For example, the light beam (emitted light) emitted from the light source 922 is condensed by the reflecting mirror 924, is converted into a substantially parallel light beam, and is input to the lens group 925. The light beam having passed through the lens group 925 is condensed and applied to the reflective liquid crystal panel 970 through the polarizing beam splitter 942 having a polarization separating function. The polarizing beam splitter 942 disposed before the reflective liquid crystal panel 970 reflects the S polarization component and transmits the P polarization component, as shown in FIG. 29A. Accordingly, in this configuration, the P polarization component is input to the reflective liquid crystal panel 970.

In the reflective liquid crystal panel 970, the birefringence of liquid crystal varies depending on voltage information of an input image signal SV. That is, the reflective liquid crystal panel 970 applies an electric field to the liquid crystal in accordance with the input image signal SV. The alignment of liquid crystal molecules is changed by the applied electric field. Since the alignment of the liquid crystal molecules has an optical rotatory power, the input beam (P polarization component) polarization-rotates and is then output. In this configuration, while the input beam to the reflective liquid crystal panel 970 passes through the liquid crystal, is reflected by a reflecting film, and passes through the liquid crystal again, the polarization of the light beam is changed from the P polarization component to the S polarization component due to the birefringence and the resultant beam is then output.

The light beam (hereinafter, also referred to as a panel-output beam) output from the reflective liquid crystal panel 970 and spatially modulated on the basis of the image information SV becomes an optical image corresponding to the image signal SV and is input again to the polarizing beam splitter 942. Only the S polarization component (with respect to the polarization separating surface 942c of the polarizing beam splitter 942) of which the vibration direction of polarization has been rotated by the reflective liquid crystal panel 970 is reflected by the polarization separating surface 942c of the polarizing beam splitter 942 and travels to the projection lens 917.

Thereafter, an image is enlarged and projected onto a screen (not shown) by the projection lens 917. That is, an optical image formed by the variation in polarization of a light beam in the reflective liquid crystal panel 970 is enlarged and projected to the screen (not shown), thereby forming a projected image.

The P polarization component of which the polarization is not changed by the reflective liquid crystal panel 970 passes through the polarizing beam splitter 942 and returns to the light emitting unit 912.

As described above, by using the reflective liquid crystal panel 970, a large-sized image with high precision can be displayed by a relatively-small projection optical device 903. However, there is still a need for a small-sized projection display having high brightness and high contrast.

Here, the polarizing beam splitter 942 is formed by bonding the triangular glass prisms 942a and 942b to each other and a multi-layered optical film is deposited and stacked on the bonding surface to form the polarization separating surface 942c, thereby separating the polarization. For example, the polarization separating surface 942c is formed of a polarization separating film using a Brewster angle.

The polarizing beam splitter 942 employing the glass prisms 942a and 942b has great dependency of the P polarization spectrum transmittance and the S polarization spectrum reflectance on an incidence angle, does not provide a good polarization separating characteristic, and does not provide a projected image with a high contrast ratio. Accordingly, in order to obtain a projected image with a high contrast ratio, the incidence angle to the polarizing beam splitter 942 is, for example, in the range of 45±8 degree (air-converted angle) and thus a relatively-dark projection lens 917 having an F number of about F3.5 or more is necessary. That is, in order to improve the polarization separating characteristic (an extinction ratio of transmission or reflection of the P polarized beam and the S polarized beam), it is necessary to input a light beam having a large F number, that is, a light beam close to a parallel beam.

However, in the above-mentioned configuration, it is difficult to increase the brightness due to the restriction of the incident angle to the polarizing beam splitter 942, even using the reflective liquid crystal panel 970 having a small panel size but a high pixel aperture ratio.

Therefore, various suggestions for improving the polarization separating characteristic have been made to solve such a problem. For example, it can be considered that a Vikuiti (registered trademark and/or trademark) DBEF-D film is used in the polarization separating element. There has been suggested a structure in which a wire-grid polarization separating element separating the polarization by the use of a metallic grid formed in minute grid shapes out of metal is inserted between the triangular glass prisms (for example, see JP-A-2003-131212 and JP-A-2006-3384).

By using the wire-grid polarization separating element, a good polarization separating characteristic with respect to a variation in incidence angle of a light beam can be obtained (for example, to cope with 45±15 degree) and the F number of the light-emitting optical unit or the projection lens can be reduced to F2.0 without causing an optical loss or a decrease in contrast of the polarization separating prism, thereby constructing a projection display with high brightness, high contrast, and high precision.

SUMMARY

However, the configuration using the known DBEF-D film for the polarization separating element or the configuration using the wire-grid polarization separating element has a problem with astigmatism. That is, as known widely, when a parallel flat layer arranged oblique about the optical axis of an optical system is interposed between two glass prisms, the astigmatism occurs. When the astigmatism occurs, an in-focus position in a direction is different from an in-focus position in a direction perpendicular to the direction, thereby greatly deteriorating the resolution.

Since the known DBEF-D film is a polymer film, is much thicker than a usual multi-layered film, and is arranged oblique about the input beam, the astigmatism occurs.

The polarizing beam splitter employing the wire grid described in JP-A-2003-131212 and JP-A-2006-3384 has a structure in which a glass substrate having the wire grid formed thereon is inserted between prisms. In this case, since the wire-grid polarization separating element is not rotationally symmetric about the optical axis of the projection lens, the astigmatism is caused, thereby deteriorating the resolution of the projected image. When the refractive index of the glass substrate is different from the refractive index of the prisms, the astigmatism is caused. The astigmatism can be reduced by reducing the thickness of the glass substrate of the wire-grid polarization separating element. In this case, however, the degree of flatness of the glass substrate is reduced to cause a distortion of the wire-grid polarization separating element, thereby deteriorating the resolution of the projected image.

For example, a method of inserting a cylindrical lens is known as a general method of reducing the astigmatism. In this case, however, the number of unnecessary components increases to complicate the structure of the projection optical system. Since the back-focus of the projection lens need be enhanced, the size and the cost increase. Accordingly, the method is not desirable.

Therefore, it is desirable to provide a method being capable of suppressing, with a relatively simple configuration the astigmatism occurring in a parallel flat layer having a polarization separating function, using a polarizing beam splitter having a structure in which the parallel flat layer having a predetermined thickness and a polarization separating function is inserted between plural prisms having substantially the same refractive index.

According to an embodiment of the invention, there is provided a polarizing beam splitter suitable for a projection optical device, including: first and second prisms each having first and second end surfaces serving as an input surface or an output surface of light and an opposed surface as side surfaces of a pillar-like member; and at least two parallel flat layers disposed in parallel between the opposed surfaces of the first and second prisms.

Here, one of the least two parallel flat layers is a first parallel flat layer polarization-separating the input beam. For example, in order to improve the polarization separating performance, a wire-grid polarization separating element having a metallic grid formed in stripes with a period much minuter than wavelengths of visible rays on a surface of a flat substrate having a certain thickness or a polarization separating element having a polarizing film with a certain thickness formed in a main part thereof may be used. The other parallel flat layer of the at least two parallel flat layers serves to correct the astigmatism occurring in the first parallel flat layer and the like.

When it is assumed that the refractive index of a base material of the first and second prisms is Np, the resultant refractive index of the parallel flat layers other than the other parallel flat layer of the at least two parallel flat layers is Na, and the refractive index of the other parallel flat layer of the at least two parallel flat layers is Nb, (Na−Np)×(Nb−Np)<0 is satisfied. That is, the product of the differences in refractive index (Na−Np) and (Nb−Np) is negative.

The technical spirit of the embodiment of the invention is that when the polarizing beam splitter is used for a projection optical device, the relation of differences in refractive index (Na−Np) and (Nb−Np) is regulated in the polarizing beam splitter so as to suppress the occurrence of astigmatism in the relation between the resolution of the reflective panel used as the projection optical device and the F number of the projection lens as the projection unit.

The original reason for the occurrence of astigmatism is that the input beam is refracted in the first parallel flat layer and the like to shift the optical path in parallel when the first parallel flat layer and the like has a certain thickness and a refractive index different from that of the prisms. The second parallel flat layer serves to reduce the shifted distance by refracting the input beam in a direction opposite to that of the first parallel flat layer and the like.

For example, in the law of refraction, the refracted beam is refracted to get closer to the normal line than the input beam when the beam travels from a medium having a low refractive index to a medium having a high refractive index, and the refracted beam is refracted to get more apart from the normal line than the input beam when the beam travels from the medium having a high refractive index to the medium having a low refractive index.

In this embodiment, the parallel flat layers are disposed between the first and second prisms. Accordingly, when the second parallel flat layer is not disposed and a beam is input from the first prism to the first parallel flat layer, the refracted beam is refracted to get closer to the normal line (to get more apart from the normal line) than the input beam. When the beam is input to the second prism after traveling by the thickness, the refracted beam in the second prism is refracted to get more apart from the normal line (to get closer to the normal line). Accordingly, the beam in the first prism and the beam in the second prism are parallel to each other and are shifted in parallel by a predetermined distance corresponding to the thickness of the first parallel flat layer and the like. Therefore, in order to reduce the parallel shift distance, the second parallel flat layer refracting the input beam to in the direction opposite to the refraction direction by the first parallel flat layer is added thereto.

Since it is determined depending on the comparison result of the refractive index of the input-side medium and the refractive index of the output-side medium whether the refracted beam gets closer to or more apart from the normal line than the input beam. Accordingly, when it is intended that the second parallel flat layer refracts the input beam in the direction opposite to the resultant refraction direction by the first parallel flat layer and the like, the product of the differences in refractive index (Na−Np) and (Nb−Np) can be set negative.

According to another embodiment of the invention, there is provided a projection optical device or a projection display including: projection optical device including: a light source; a reflective panel generating an optical image in accordance with an image signal; a projection lens enlarging and projecting the optical image generated by the reflective panel; and a polarizing beam splitter separating the polarization of a light beam guided from the light source through a predetermined optical path to guide the light beam to the reflective panel and separating the polarization of the light beam reflected by the reflective panel to guide the resultant light beam to the projection lens.

Here, the polarizing beam splitter includes first and second prisms each having first and second end surfaces serving as an input surface or an output surface of a light beam and an opposed surface as side surfaces of a pillar-like member and at least two parallel flat layers disposed in parallel between the opposed surfaces of the first and second prisms, and one of the least two parallel flat layers is a first parallel flat layer polarization-separating an input beam. The other of the at least two parallel flat layers serves to correct the astigmatism occurring in the first parallel flat layer and the like.

When it is assumed that the refractive indexes of the parallel flat layers are N−x (where x is an identifier for identifying the parallel flat layers), the thicknesses of the parallel flat layers are t_x, the slope angles of the parallel flat layers about the normal line of the reflective panel are θ, and the refractive index of the first and second prisms is Np, the astigmatism As_x occurring in the parallel flat layers is expressed by Expression 1:

$$As\_x = -\frac{((N\_x/Np)^{\wedge}2 - 1)\sin^2\theta}{((N\_x/Np)^{\wedge}2 - \sin^2\theta)^{3/2}} \cdot \frac{t\_x}{Np}. \quad (1)$$

when the absolute value of the resultant astigmatism of the astigmatism occurring in all the parallel flat layers other than the other parallel flat layer of the at least two parallel flat layers and the absolute value of the second astigmatism occurring in the other parallel flat layer of the at least two parallel flat layers are greater than the depth of focus Fδ where δ represents the pixel pitch of the reflective panel and F represents the F number of the projection lens, the absolute value of a value obtained by adding the second astigmatism to the resultant astigmatism is smaller than 1/n of the depth of focus Fδ and preferably smaller than ½n of the depth of focus Fδ, where n represents the number of times that the light beam reflected by the reflective panel passes through the at least two parallel flat layers of the polarizing beam splitter at the time of passing through the polarizing beam splitter and being guided to the projection lens.

The 1/n of the depth of focus Fδ is a first reference value of an allowable astigmatism quantity and the ½n of the depth of focus Fδ is a second reference value of the allowable astigmatism quantity. The materials or thicknesses of the parallel flat layers are properly set so that the resultant astigmatism occurring in the second parallel flat layer and the parallel flat layers (including the first parallel flat layers having the polarization separating function) other than the second parallel flat layer in total is smaller than the allowable astigmatism associated with the depth of focus Fδ calculated from the pixel pitch δ of the reflective panel and the F number F of the projection lens.

The first reference value or the second value stricter than the first reference value defines the astigmatism allowed in view of the focusing performance. Since the excessive decrease in astigmatism is not substantially meaningful, the allowable astigmatism value is defined in view of the resolution or the focusing performance. When the resultant astigmatism and the second astigmatism are opposite each other in sign and have substantially the same magnitude, the absolute value of the value obtained by adding the resultant astigmatism and the second astigmatism is almost zero, which is most desirable.

In order to satisfy the condition associated with the sum of astigmatism, the polarizing beam splitter may be set so that the product of the differences in refractive index (Na−Np) and (Nb−Np) is negative.

According to the embodiments of the invention, since the second parallel flat layer correcting the astigmatism occurring in the first parallel flat layer and the like having the polarization separating function is disposed in the polarizing beam splitter, it is possible to suppress the astigmatism, compared with the case not having the above-mentioned configuration. It is also possible to improve the focusing performance of the projection optical device or the projection display. For example, even by using the first parallel flat layer having a certain thickness and the polarization separating function, it is possible to suppress the occurrence of astigmatism, thereby constructing an optical system having a desired resolution.

Since the astigmatism occurring in the optical system is suppressed by adding the second parallel flat layer having a function of correcting the astigmatism to the polarizing beam splitter, unnecessary components such as a cylindrical lens may be omitted. Accordingly, the structure of the projection optical system is not complicated and thus the back-focus of the projection lens may not be enhanced. Therefore, the problems with an increase in size of the optical system or an increase in cost due to the unnecessary components are not caused.

BRIEF DESCRIPTION OF THE DRAWINGS

FIGS. 1A and 1B are diagrams schematically illustrating a projection television as an example of a rear projection display.

FIG. 7 is a table showing optical constants of the polarizing beam splitter according to the first embodiment of the invention.

FIG. 13 is a table showing optical constants of the polarizing beam splitter according to the second embodiment of the invention.

FIG. 27A to 27C are tables showing optical constants of color polarizing beam splitters used in the projector unit according to the fifth embodiment of the invention.

DETAILED DESCRIPTION OF THE INVENTION

Figure 2:
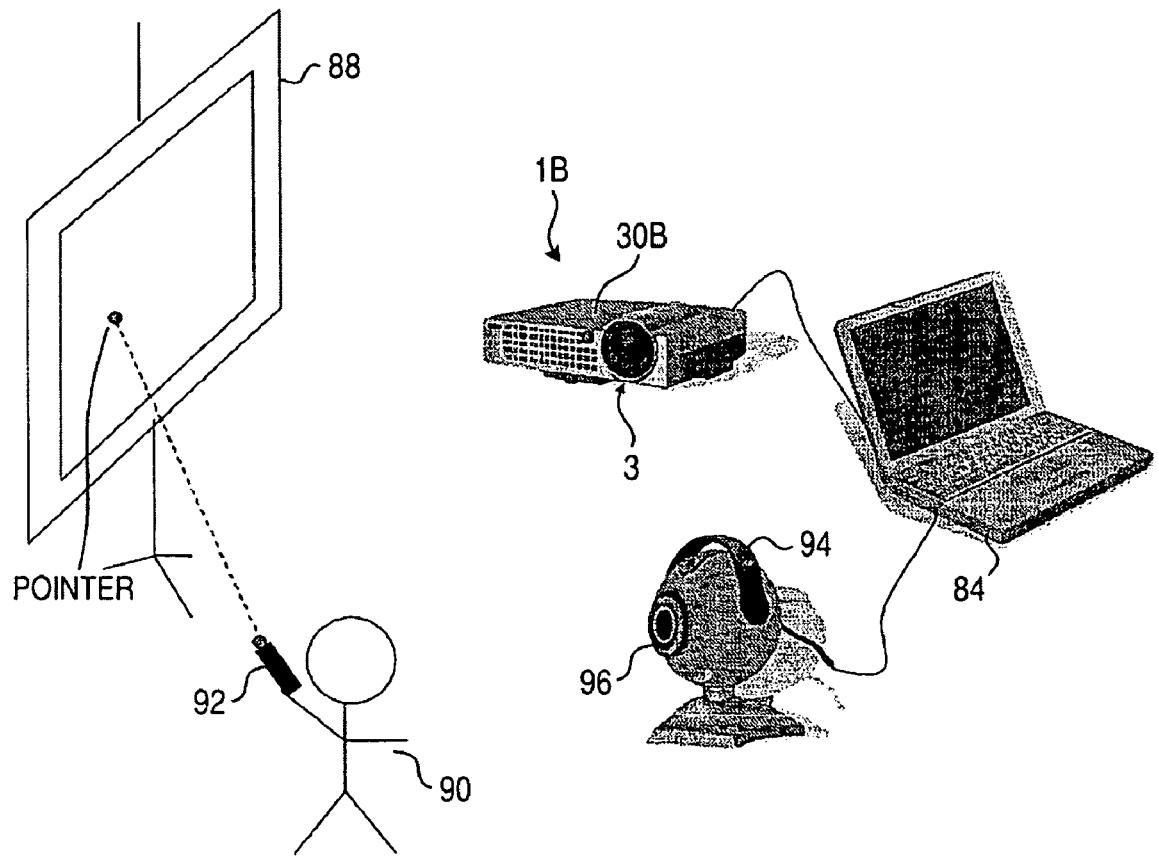
FIG. 2 is a diagram illustrating the entire configuration of a television conference system employing a liquid projector as another example of the projection display.

Hereinafter, embodiments of the invention will be described in detail with reference to the accompanying drawings.

Projection Display (First Example)

FIGS. 1A and 1B are diagrams schematically illustrating a projection television as a first example of a rear projection display according to an embodiment of the invention, where FIG. 1A is a front view and FIG. 1B is a side view.

As shown in FIGS. 1A and 1B, the projection television 1A as the rear projection display includes a frame (a frame of a chassis) 30A and the frame 30A is provided with a projector unit 3 as an example of a projection optical device which is a basic optical system of a projection display, a reflecting mirror 40, and a transmission-type screen 50. A speaker 2 is disposed on both sides of the screen 50. In this example, the frame 30A and the screen 50 constitute the entire chassis. The rear projection display is constructed using the transmission-type screen 50.

The projector unit 3 serves to output an image-projecting light beam and enlarges and projects an optical image, which is spatially modulated by inputting a light beam from a light source to a reflecting panel and rotationally polarizing the input beam on the basis of an image signal by the use of the reflecting panel, by the use of a projection unit (projection lens). In this embodiment, a reflective liquid crystal panel having a pair of substrates opposed to each other and a liquid crystal layer sealed between the pair of substrates is used as the reflective panel.

The frame 30A includes a bottom cabinet 31 supporting the projector unit 3, a rectangular frame-like screen attachment portion not shown but disposed above the bottom cabinet 31, and an inverted-trapezoid reflecting mirror attachment portion 33 disposed in the back of the screen attachment portion above the bottom cabinet 31.

The reflecting mirror 40 has a reflecting surface 40a, is disposed above the projector unit 3 and in the back of the rear projection screen 50, and serves to reflect the image-projecting light beam emitted from the projector unit 3 to the rear surface of the screen 50 by the use of the reflecting surface 40a. The reflecting mirror 40 is attached to the reflecting mirror attachment portion 33 via screen attachment portions disposed on the left, right, top and bottom and screws and a rear upper cover 44 is attached to the frame 30A so as to cover the screen attachment portion and the reflecting mirror 40.

The screen 50 displays a television image on the front surface by allowing the image-projecting light beam reflected by the reflecting mirror 40 to be projected onto the rear surface thereof. The screen 50 includes a Fresnel lens disposed on an image source side and a lenticular screen disposed in the back of the Fresnel lens. In addition, a particular screen for reducing the deterioration in contrast due to external light and protecting the lenticular screen may be further provided.

The screen 50 is attached to the screen attachment portion by the use of lateral attachment members and screws not shown and a frame-like decorative plate 50a is attached to the screen attachment portion so as to cover the attachment members and the periphery of the screen 50. The front portion of the bottom cabinet 31 is located on the front surface of the frame 30A below the screen attachment portion and a decorative plate 50b is attached to the lower portion of the frame-like decorative plate 50a so as to cover the front portion.

The projector unit 3 is attached to the frame 30A with a base member 28 interposed therebetween in the back of the front portion of the bottom cabinet 31 and a rear lower cover 46 is attached to the frame 30A so as to cover the projector unit 3 and the like. More specifically, the projector unit 3 includes a light source-side unit 3a and an image emission-side unit 3b. The light source-side unit 3a and the image emission-side unit 3b are both attached to the base member 28 and are attached to the frame 30A with the base member 28 interposed therebetween.

The front surface of the base member 28 is screwed and fixed to the bottom cabinet 31 (frame 30A). A shaft matched with the optical axis of the projection lens 18 protrudes from the upper surface, that is, the frame 30A side, of the base member 28. Four boss portions protrude from the upper surface around the shaft and the upper end surfaces of the boss portions serve as support surfaces extending along the plane perpendicular to the optical axis of the projection lens 18.

An electrical decorative portion of the projection television 1A is not shown, but includes a receiving circuit receiving broadcast waves (analog waves or ground or satellite digital waves), an image signal processing circuit, a sound signal processing circuit driving the speaker 2, a control circuit controlling the entire parts, and an operation switch receiving a user's operation.

The receiving circuit selects a channel on the basis of a command from the control circuit, modulates a television signal received from an antenna, separates the television signal into an image signal and a sound signal, and outputs the separated signals. The image signal processing circuit performs a necessary signal process on the image signal to generate three-color image information of red (R), green (G), and blue (B) and supplies image signals (driving signals) corresponding to the color image information to liquid crystal display units (display panels) of three color liquid crystal displays (details of which will be described later).

The sound signal processing circuit performs a necessary signal process or an amplification process on the sound signal to generate audio signals and supplies the generated audio signals to the speaker 2. Accordingly, sound is output from the speaker 2. The operation switch is used to perform various operations or setting associated with viewing the broadcast of the projection television 1A, and includes a channel selecting switch, a volume control switch, and an input changing switch. The control circuit controls the receiving circuit, the image signal processing circuit, and the sound signal processing circuit on the basis of the operation of the operation switch.

Although not shown, external input terminals receiving image signals and sound signals supplied from an external device such as a DVD player or a video deck and an input switching circuit switching the image signals and the sound signals supplied to the external input terminals to the image signal processing circuit and the sound signal processing circuit are also provided. The image signals and the sound signals supplied to the external input terminals by the operation of the operation switch are supplied to the image signal processing circuit and the sound signal processing circuit through the input switching circuit.

Projection Display (Second Example)

FIG. 2 is a diagram illustrating the entire configuration of a television conference system as an example of an information providing system employing a second example of the projection display. FIG. 2 shows a configuration of a presenter-side conference room in a usual television conference system. As a structure for displaying image information on a screen, the conference room includes a computer 84 storing a variety of projection image information as conference materials, a liquid crystal projector 1B as a projection device connected to the computer 84, a reflective screen 88 for displaying an image output from the liquid crystal projector 1B, and a laser pointer 92 for displaying a mark as a pointer indicated by the presenter 90 on the information displayed on the screen 88. A front projection display is constructed using the reflective screen 88.

Similarly to the projection television 1A, a projector unit 3 as an example of the projection optical device which is a basic optical system of the projection display is built in a chassis 30B of the liquid crystal projector 1B as the front projection display.

The shown television conference system is equipped with a head set 94 picking up the voice of the presenter 90 or a listener (not shown) in the conference room and a television camera 96 taking a picture of the material image projected on the screen 88, the presenter 90, and the like in the conference room. The television camera 96 takes a picture of the conference room and also takes a picture of a pointer mark projected on the screen 88 by the laser pointer 92. The camera taking a picture of the conference room and the camera taking a picture of the pointer mark may be provided individually.

The presenter 90 can indicate a specific position on the image projected on the screen 88 with the laser pointer 92 in a hand. For example, a red laser diode is used in the laser pointer 92 and a red circular pointer mark is displayed at an illuminated position of the laser pointer 92 on the screen 88. At this time, the television camera 96 takes a picture of the pointer mark on the screen 88 and sends the taken information to the computer 84.

Software for identifying the position indicated by the laser pointer 92 from the image information is installed in the computer 84. The position indicated by the pointer is specified by finding out the pointed portion (light spot) on the screen 88 using an image processing technique such as identifying the pointed portion with a brightness threshold level or identifying the indicated red color.

Basic Optical System of Projection Display

Basic Concept

Figure 3:
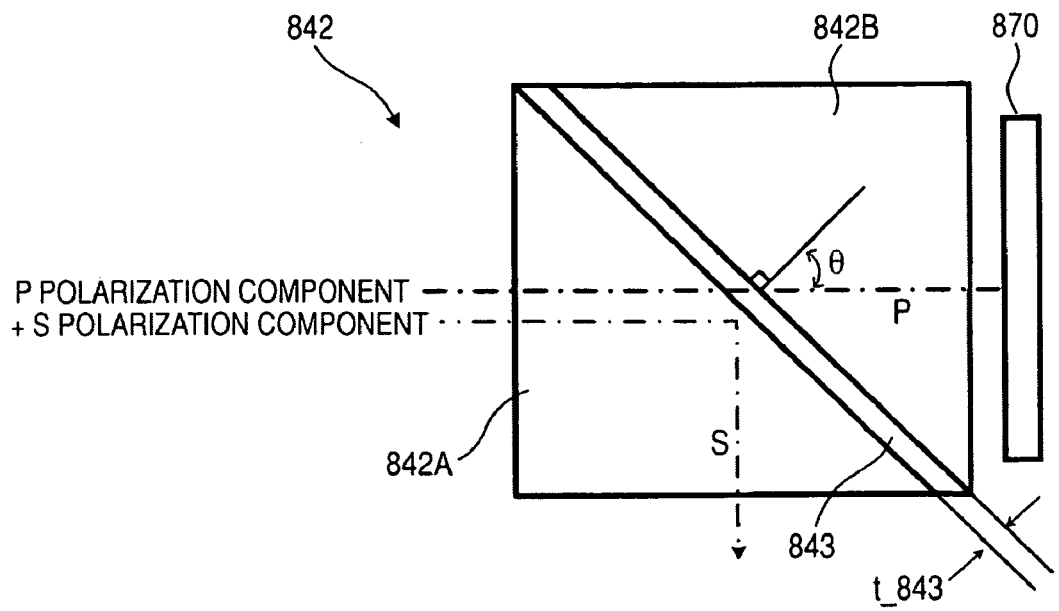
FIG. 3 is a diagram illustrating the astigmatism occurring in a polarizing beam splitter.
Figure 4A:
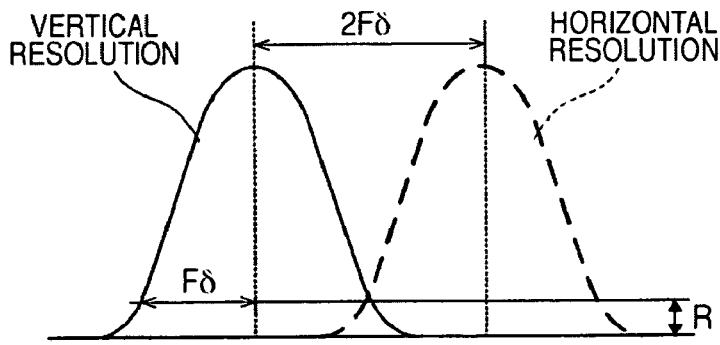
FIGS. 4A and 4B are diagrams illustrating a defocus characteristic of MTF of an optical system when the astigmatism occurs.
Figure 4B:
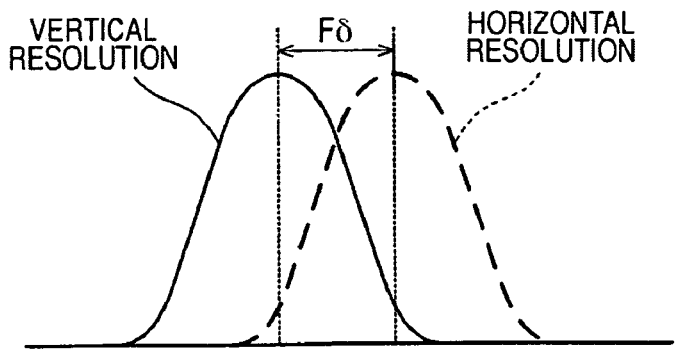

FIGS. 3, 4A and 4B are diagrams illustrating a basic principle for constructing the polarizing beam splitter (optical prism), the projection optical device, and the projection display according to an embodiment of the invention. Here, FIG. 3 is a diagram illustrating the astigmatism occurring in the polarizing beam splitter. FIGS. 4A and 4B are diagrams illustrating a defocus characteristic of MTF (Modulation Transfer Function) of the optical system when the astigmatism occurs.

As shown in FIG. 3, the projection optical device or the projection display basically includes a polarizing beam splitter 842 and a reflective liquid crystal panel 870. In the polarizing beam splitter 842, a parallel flat layer 843 having a polarizing separating function and a thickness t_843 is disposed as an example of the optical member between slopes (opposed surfaces) of two triangular glass prisms (rectangular prisms) 842A and 842B. The parallel flat layer 843 is inserted between the glass prisms 842A and 842B in a state where it is tilted at a slope angle θ (for example, 45 degree) about the normal line of the reflective liquid crystal panel 870.

The polarizing beam splitter 842 having the above-mentioned configuration allows the parallel flat layer 843 to transmit a P polarization component of P and S polarization components input to the polarizing beam splitter 842 and allows the parallel flat layer 843 to reflect the S polarization component.

When it is assumed that the refractive indexes of the glass prisms 842A and 842B are Np_842a and Np_842b (both are Np), the refractive index of the parallel flat layer 843 is N_843, and the thickness thereof is t_843, the astigmatism As_843 expressed by Expression 2 occurs while the light beam (the P polarization component in this example) reflected by the reflective liquid crystal panel 870 passes through the parallel flat layer 843. When the parallel flat layer 843 has a certain thickness t_843 and a difference in refractive index exists between the refractive index N-843 of the parallel flat layer 843 and the refractive index Np of the glass prisms 842A and 842B, the resolution of the optical system, that is, the focusing performance, is deteriorated due to the occurrence of the astigmatism As_843.

$$As\_843 = -\frac{((N\_843/Np)^\wedge 2 - 1)\sin^2\theta}{((N\_843/Np)^\wedge 2 - \sin^2\theta)^{3/2}} \cdot \frac{t\_843}{Np} \quad (2)$$

The defocus characteristic of MTF of the optical system when the astigmatism As occurs is shown in FIG. 4A. The solid line in the drawing represents the vertical resolution and the dotted line represents the horizontal resolution. When a certain distance is focused, an in-focus range (referred to as depth of focus) is generated before and after the focal surface and the depth of focus is determined by "F number of lens× allowable defocus". Accordingly, when an indicator (pixel pitch) indicating the resolution of the reflective liquid crystal panel 870 is δ and the F number of the projection lens in use is F, the pixel pitch δ corresponds to the allowable defocus and thus the depth of focus is expressed as Fδ in this example. Here, R in the drawing represents the limited resolution.

When there is no deterioration in resolution in the projection lens and the like (that is, in an ideal state), the magnitude of the allowable astigmatism As (allowable astigmatism value As0) is "2×Fδ", that is, two times the depth of focus Fδ, as shown in FIG. 4A.

However, the deterioration in resolution actually exists in the projection lens and the like. Accordingly, the allowable astigmatism value As0 is determined in consideration of the actual deterioration in resolution. For example, the defocus characteristic of MTF when the allowable astigmatism value As0 is equal to the depth of focus Fδ is shown in FIG. 4B. When a first reference allowable astigmatism As0_1 is as shown in the drawing, it is possible to obtain a desired resolution sufficiently in spite of the deterioration in resolution in the projection lens and the like. Preferably, in order to further enhance the actual allowable deterioration in resolution, a second reference allowable astigmatism value As0_2 is equal to or less than a half Fδ/2 of the depth of focus Fδ.

In this example, while a panel-output beam output from the reflective liquid crystal panel 870 is input to the polarizing beam splitter 842 and is projected to a desired position on the screen by the projection lens, the light beam passes through the parallel flat layer 843 just one times. When the projection optical system is constructed so that the light beam passes through the parallel flat layer 843 n times, the first reference allowable astigmatism value As0_1 is set equal to or less than Fδ/n and the second reference allowable astigmatism value As0_2 is set equal to or less than Fδ/(2×n).

First Embodiment

Figure 5A:
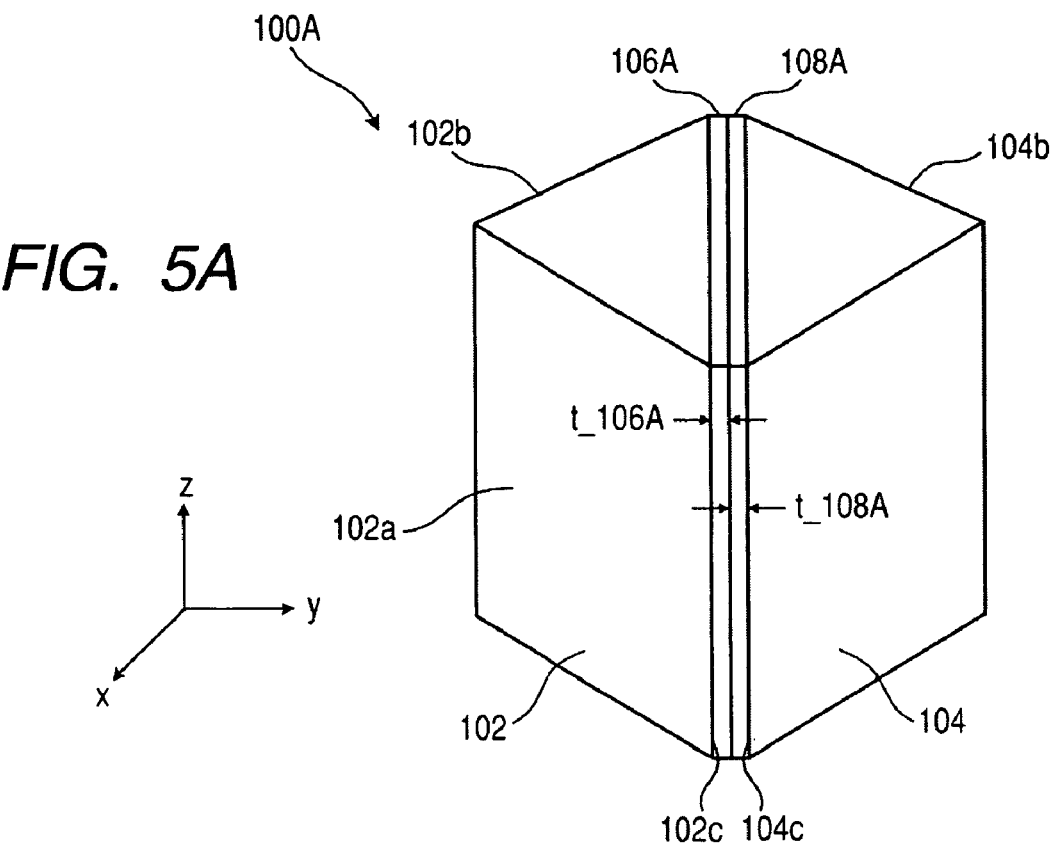
FIGS. 5A and 5B are diagrams illustrating the entire configuration of a polarizing beam splitter according to a first embodiment of the invention.

FIGS. 5A to 7 are diagrams illustrating a basic configuration of a polarizing beam splitter according to a first embodiment of the invention. Here, FIGS. 5A and 5B are diagrams illustrating the entire configuration of the polarizing beam splitter 100A according to the first embodiment. Specifically, FIG. 5A is a perspective view illustrating the entire configuration of the polarizing beam splitter 100A according to the first embodiment and FIG. 5B is a sectional view illustrating the polarizing beam splitter 100A according to the first embodiment in the x-y plane. FIGS. 6A and 6B are diagrams illustrating an operation of the polarizing beam splitter 100A according to the first embodiment. FIG. 7 is a table illustrating optical constants of the polarizing beam splitter 100A according to the first embodiment.

Figure 5B:
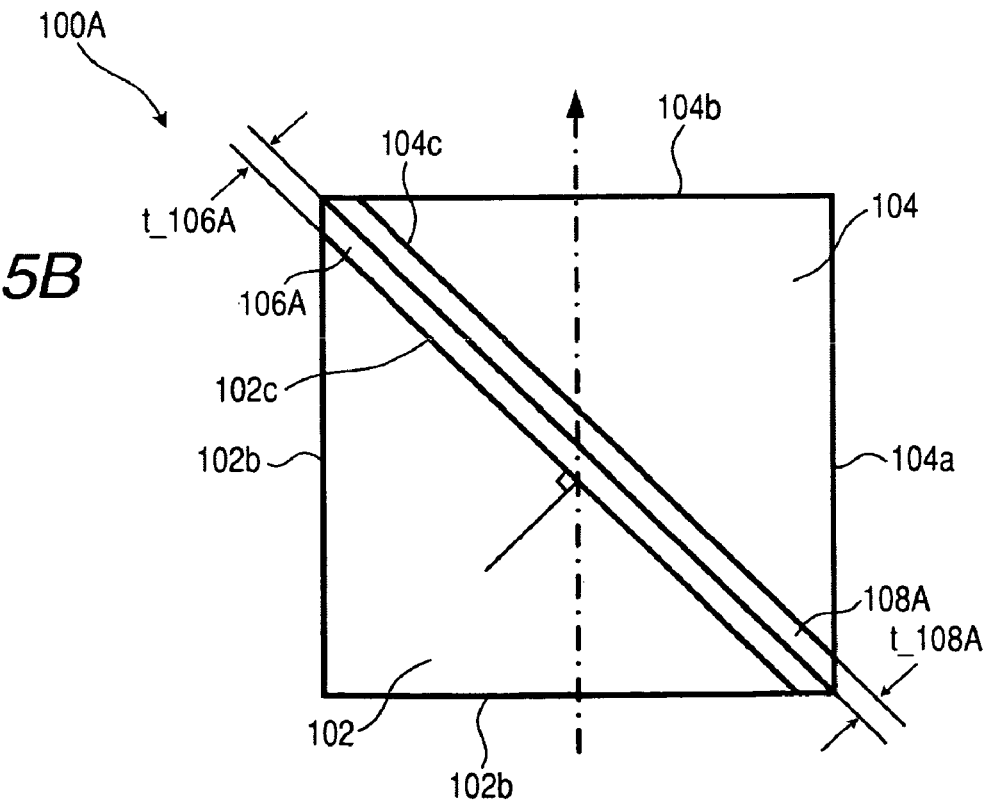

As shown in FIGS. 5A and 5B, the polarizing beam splitter 100A according to the first embodiment includes triangular glass prisms (prism substrates) 102 and 104 using glass having substantially the same refractive index as a base material and two parallel flat layers 106A and 108A disposed between the opposed surfaces of the glass prisms 102 and 104.

The first parallel flat layer 106A has a polarizing film having a certain thickness t_106A as a main part and serves as a polarization separating element as a whole. For example, the Vikuiti (registered trademark and/or trademark) DBEF-D film is used in the polarization separating element.

The second parallel flat layer 108A has a certain thickness t_108A and is formed of a base material (glass substrate in this embodiment) equal or similar to that of the glass prisms 102 and 104. The optical constants of the second parallel flat layer suitable for the optical constants of the first parallel flat layer 106A are set to have a function of correcting the astigmatism As1 due to the first parallel flat layer 106A having the polarization separating function (details of which are described later).

The glass prism 102 has a triangular prism shape having three side surfaces 102a, 102b, and 102c. The side surfaces 102a and 102b serve as an input surface or an output surface when the polarizing beam splitter 100A is disposed in the optical path. The side surface 102c is an opposed surface opposed to the other glass prism 104. Similarly, the glass prism 104 has a triangular prism shape having three side surfaces 104a, 104b, and 104c. The side surfaces 104a and 104b serve as an input surface or an output surface when the polarizing beam splitter 100A is disposed in the optical path. The side surface 104c is an opposed surface opposed to the glass prism 102. Hereinafter, for the purpose of convenient description, the side surfaces 102a, 102b, 104a, and 104b are also referred to as an input surface or an output surface depending on the formed optical path and the sides surfaces 102c and 104c are also referred to as an opposed surface.

Two parallel flat layers 106A and 108A are disposed substantially in parallel between two triangular glass prisms 102 and 104, so that the first parallel flat layer 106A is close to the opposed surface (side surface 102c) of the glass prism 102 and the second parallel flat layer 108A is close to the opposed surface (side surface 104c) of the glass prism 104. Here, the first parallel flat layer 106A is bonded and fixed to the opposed surface 102c of the glass prism 102 with an adhesive and the second parallel flat layer 108A is bonded and fixed to the opposed surface 104c of the glass prism 104 with an adhesive.

Figure 6A:
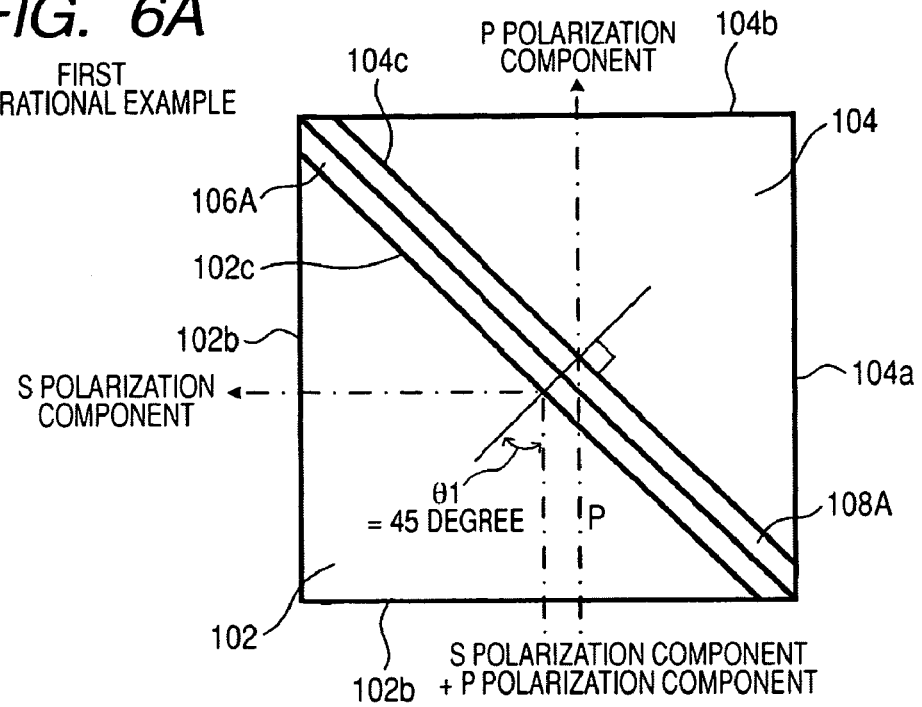
FIGS. 6A and 6B are diagrams illustrating an operation of the polarizing beam splitter according to the first embodiment of the invention.

The basic operation of the polarizing beam splitter 100A according to the first embodiment in which two parallel flat layers 106A and 108A are disposed between the glass prisms 102 and 104 is as follows. In the first operational example, it is assumed that a light beam is input from the input surface (side surface 102a) of the glass prism 102, as shown in FIG. 6A. The input beam has a P polarization component and an S polarization component. The parallel flat layers 106A and 108A are tilted by θ1 (=θp: for example, 45±15 degree) about the light beam input to the glass prism 102.

The input beam is input to the input surface (side surface 102a in the drawing) of the glass prism 102 and is then input to the bonding surface (opposed surface 102c) of the glass prism 102 and the first parallel flat layer 106A. Then, the beam is input to the first parallel flat layer 106A. Here, since the first parallel flat layer 106A has the polarization separating function, the S polarization component thereof is reflected and the P polarization component is transmitted. Thereafter, the S polarization component is input to the glass prism 102 again and is output from the output surface (side surface 102b in the drawing). On the other hand, the P polarization component is output from the first parallel flat layer 106A, is input to and transmitted by the second parallel flat layer 108A, and then is input to the glass prism 104. Then, the P polarization component is input to and transmitted by the glass prism 104 and then is output from the output surface (side surface 104b in the drawing).

Figure 6B:
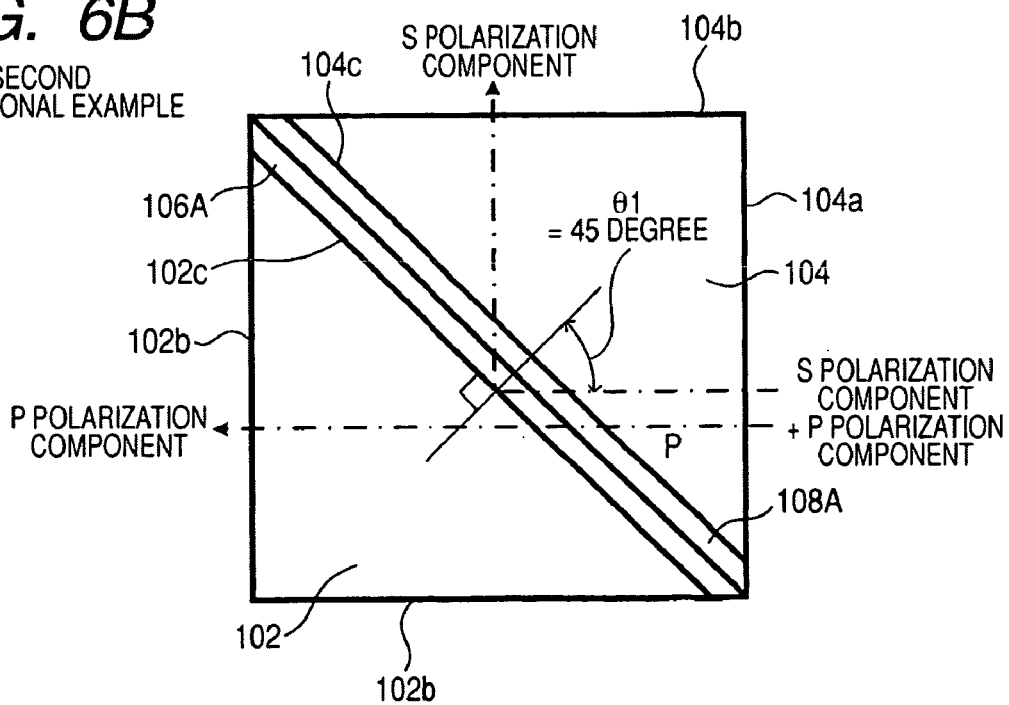

In the second operational example, as shown in FIG. 6B, it is assumed that a light beam is input to the input surface (side surface 104a) of the glass prism 104. The input beam has a P polarization component and an S polarization component. The parallel flat layers 106A and 108A are tilted by θ1 (=θp: for example, 45±15 degree) about the light beam input to the glass prism 104.

The input beam is input to the input surface (side surface 104a in the drawing) of the glass prism 104, is transmitted by the second parallel flat layer 108A, and is then input to the bonding surface of the second parallel flat layer 108A and the first parallel flat layer 106A. Then, the beam is input to the first parallel flat layer 106A. Here, since the first parallel flat layer 106A has the polarization separating function, the S polarization component thereof is reflected and the P polarization component is transmitted. Thereafter, the S polarization component is output from the first parallel flat layer 106A, is input again to the second parallel flat layer 108A, is transmitted by the second parallel flat layer 108A, is input to the glass prism 104, and is output from the output surface (side surface 104b in the drawing). On the other hand, the P polarization component is output from the first parallel flat layer 106A and is input to the glass prism 102. Then, the P polarization component is transmitted by the glass prism and then is output from the output surface (side surface 102b in the drawing).

Here, the optical constants of the optical members 102, 104, 106A, and 108A of the polarizing beam splitter 100A according to the first embodiment are set as shown in the table of FIG. 7 so as to correct the astigmatism due to the first parallel flat layer 106A having the polarization separating function by the use of the second parallel flat layer 108A, where the refractive index N_102 of the glass prism 102 and the refractive index N_104 of the glass prism 104 are equally the refractive index Np1 (=Np), the refractive index and the thickness of the first parallel flat layer 106A are N_106A (=Na) and t_106A (=ta), respectively, and the refractive index and the thickness of the second parallel flat layer 108A are N_108A (=Nb) and t_108A (=tb).

In the optical constant shown in FIG. 7, the product of a difference in refractive index (N_106A−N_102)=(Na−Np) between the first parallel flat layer 106A and the glass prism 102 and a difference in refractive index (N_108A−N_104)= (Nb−Np) between the second parallel flat layer 108A and the glass prism 104 is (Na−Np)×(Nb−Np)=(1.56605−1.59142)× (1.62286−1.59142)=−0.000 798, which satisfies the condition of negative (<0).

In the optical constants shown in FIG. 7, from Expression 1 (or Expression 2), the astigmatism As_106A (=As1) of the first parallel flat layer 106A is 15.5 μm and the astigmatism As_108A (=As2) of the second parallel flat layer 108A is −15.8 μm, which are meaningful magnitudes. However, both astigmatism As_106A and As_108A has the opposite signs and substantially the same magnitude. Accordingly, the total astigmatism As which is the absolute value (=|As1+As2|) of the resultant astigmatism of both astigmatism As_106A and As_108A is 0.3 μm and it is expected to be much smaller than the allowable astigmatism value As0.

Figure 8:
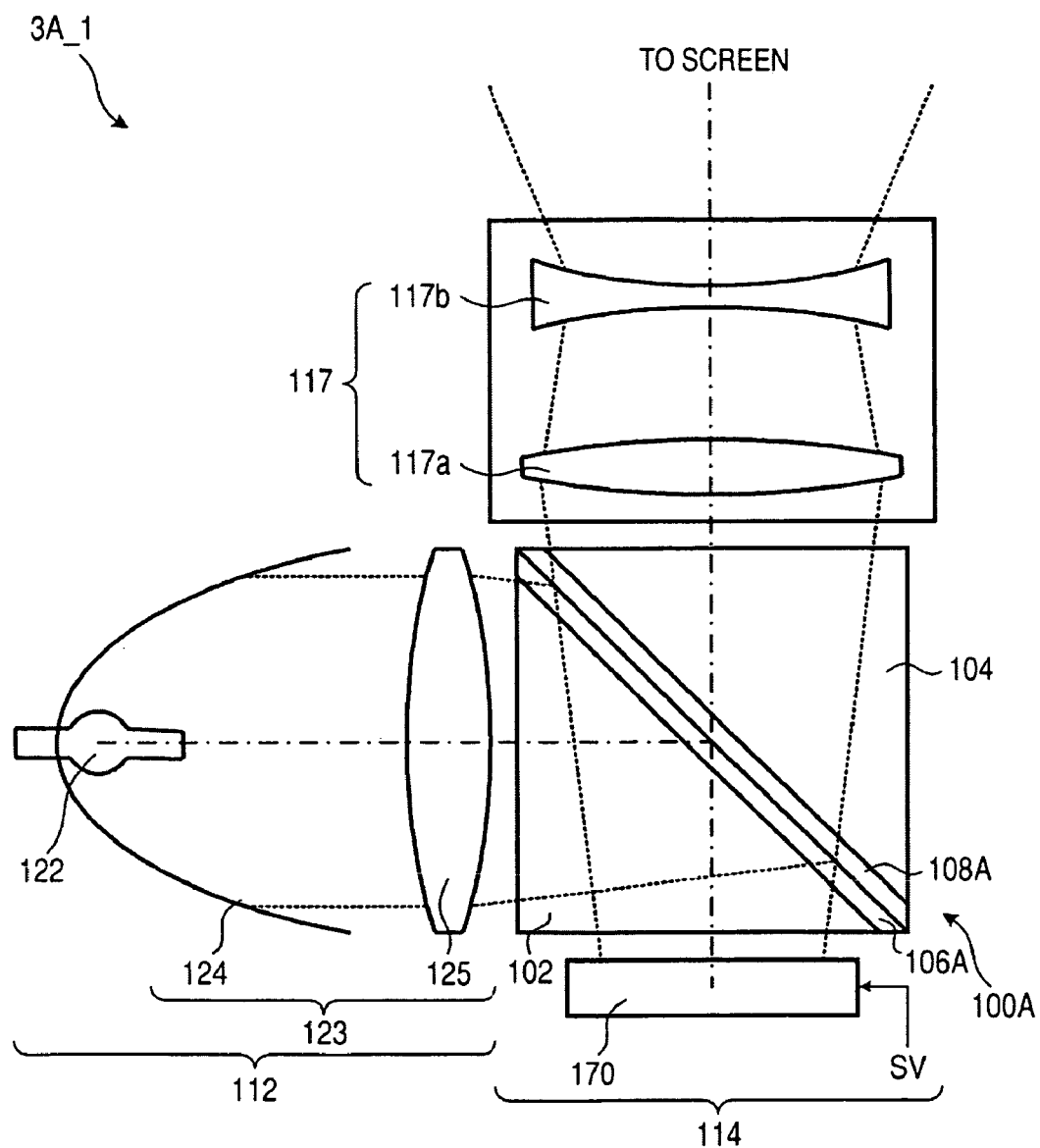
FIG. 8 is a diagram illustrating a projector unit having a basic configuration employing the polarizing beam splitter according to the first embodiment of the invention.

FIG. 8 is a diagram illustrating a projector unit 3A_1 (projection optical system) having a basic configuration employing the polarizing beam splitter 100A according to the first embodiment. In this basic configuration, the S polarization component is input to the reflective liquid crystal panel 170.

As shown in of FIG. 8, the projector unit 3A_1 according to the first embodiment (basic configuration) includes a light emitting unit 112, an image forming unit 114, and a projection lens 117 having an input lens 117a and a transmission lens 117b.

The light emitting unit 112 emits a light beam to the image forming unit 114 and the image forming unit 114 modulates the light beam on the basis of image information SV and inputs the modulated light beam as an image-projecting light beam to the input lens 117a of the projection lens 117. The image-projecting light beam input to the input lens 117a is projected onto a screen not shown by the transmission lens 117b of the projection lens 117, whereby an image is projected onto the screen.

The light emitting unit 112 specifically includes a light source (discharge lamp) 122 emitting a predetermined color beam (for example, white beam) and a light-emitting optical system 123. The light-emitting optical system 123 includes a reflecting mirror (parabolic mirror) 124 condensing the beam from the light source 122 and a lens group 125 disposed in front of the light source 122 in a straight line with respect to an optical axis. Only one convex lens is shown as the lens group 125 in the drawings, but for example, a UV cut filter or a condenser lens having a half wavelength plate may be provided.

The image forming unit 114 includes the polarizing beam splitter 100A according to the first embodiment and a reflective liquid crystal panel 170 generating a light beam corresponding to image information. The polarizing beam splitter 100A has a function of reflecting or transmitting an input beam depending on the polarization directions of the beam. The reflective liquid crystal panel 170 is disposed at a focused position of the S polarization component reflected by the first parallel flat layer 106A of the polarizing beam splitter 100A.

For example, the light beam (emitted light) emitted from the light source 122 is condensed by the reflecting mirror 124, is converted into a substantially parallel light beam, and is input to the lens group 125. The light beam having passed through the lens group 125 is condensed and applied to the reflective liquid crystal panel 170 through the polarizing beam splitter 100A having a polarization separating function. The polarizing beam splitter 100A disposed before the reflective liquid crystal panel 170 allows the first parallel flat layer 106A to selectively reflect the S polarization component and to transmit the P polarization component, as shown in of FIGS. 6A and 6B. Accordingly, in this configuration, the S polarization component is input to the reflective liquid crystal panel 170.

The reflective liquid crystal panel 170 applies an electric field to the liquid crystal on the basis of the applied image signal SV. Accordingly, the input beam (S polarization component in this example) rotates in polarization, is converted from the S polarization component into the P polarization component, and is then output. That is, the input beam is spatially modulated on the basis of the image signal SV and is converted into a second polarization component (P polarization component in this example) by the reflective liquid crystal panel 170, and an optical image corresponding to the image signal SV input to the reflective liquid crystal panel 170 is output from the reflective liquid crystal panel 170.

The panel-output beam spatially modulated on the basis of the image information SV and output from the reflective liquid crystal panel 170 is an optical image corresponding to the image signal SV and is input again to the polarizing beam splitter 100A. At this time, the P polarization component of which the vibration direction is rotated by the reflective liquid crystal panel 170 is input to the glass prism 102, is input to and transmitted by the first parallel flat layer 106A, is input to and transmitted by the second parallel flat layer 108A, and is then input to the glass prism 104. The P polarization component input to the glass prism 104 is transmitted thereby and is output from the output surface. Thereafter, the optical image formed with the change in polarization of the beam by the reflective liquid crystal panel 170 is enlarged and projected onto the screen not shown by the projection lens 117.

Here, while the panel-output beam output from the reflective liquid crystal panel 170 is input to the polarizing beam splitter 100A and is projected to a desired position on the screen by the projection lens 117, the astigmatism As_106A (=As1) occurs in the first parallel flat layer 106A and the astigmatism As_108A (=As2) occurs in the second parallel flat layer 108A.

However, the optical constants of the polarizing beam splitter 100A are set as shown in FIG. 7, the positive astigmatism As_106A (=As1) of 15.5 μm occurs due to the first parallel flat layer 106A, but the negative astigmatism As_108A (=As2) of −15.8 μm occurs due to the second parallel flat layer 108A. Accordingly, both astigmatism is almost cancelled and the total astigmatism As (=|As1+As2|) is satisfactorily small.

For example, when the F number of the projection lens 117 used in the projector unit 3A_1 according to the first embodiment (basic configuration) is 2.5 and the pixel pitch of the reflective liquid crystal panel 170 is 7 μm, the depth of focus Fδ is 17.5 μm and a half of the depth of focus Fδ is Fδ/2=8.75 μm. The absolute values of both astigmatism As_106A (=As1) and As_108A (=As2) are greater than the half Fδ/2 (=8.75 μm) of the depth of focus Fδ. Accordingly, the desired resolution is not obtained using only the first parallel flat layer 106A. On the contrary, by providing the second parallel flat layer 108A correcting the astigmatism As_106A due to the first parallel flat layer 106A, the absolute value (=|As1+As2|) of the total astigmatism As is 0.3 μm. The absolute value (=|As1+As2|) of the total astigmatism As is equal to or less than the depth of focus Fδ (=17.5 μm) as the first reference allowable astigmatism value As0_1, is also equal to or less than the half Fδ/2 (=8.75 μm) of the depth of focus Fδ as the second reference allowable astigmatism value As0_2, and is much less than the allowable astigmatism value As0, thereby obtaining a desired resolution.

However, since the contrast is badly influenced depending on the arrangement of the second parallel flat layer 108A, it should be noted whether the second parallel flat layer 108A is disposed in the front of or in the back of the first parallel flat layer 106A.

For example, in the projector unit 3A_1 according to the first embodiment shown in FIG. 8, the second parallel flat layer 108A is disposed after the first parallel flat layer 106A selectively reflecting the S polarization component and transmitting the P polarization component in a path of the light beam (optical path) from the light source 122. Accordingly, the bad influence of the second parallel flat layer 108A on contrast is hardly made in the projector unit 3A_1 according to the first embodiment.

First Embodiment

Modified Example

Figure 9:
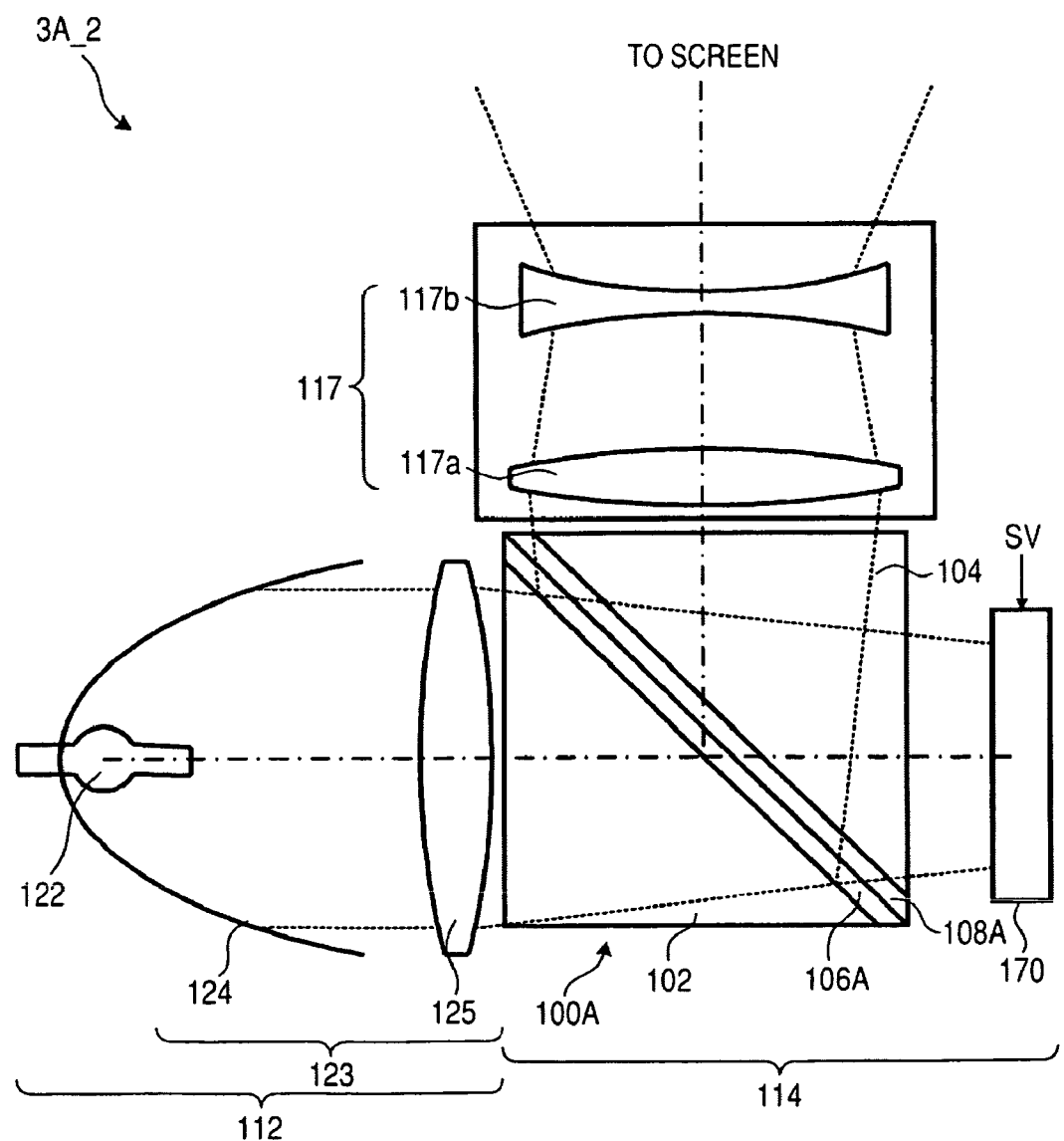
FIG. 9 is a diagram illustrating a projector unit having a modified configuration employing the polarizing beam splitter according to the first embodiment of the invention.
Figure 29A:
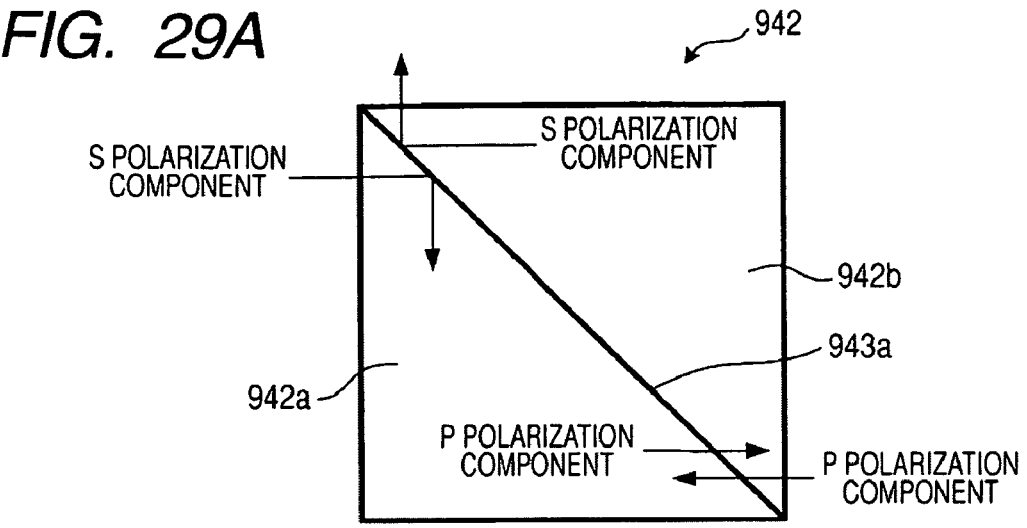
FIGS. 29A and 29B are diagrams illustrating a known polarizing beam splitter and a basic optical system of a reflective liquid crystal projector having the polarizing beam splitter and a liquid crystal panel.
Figure 29B:
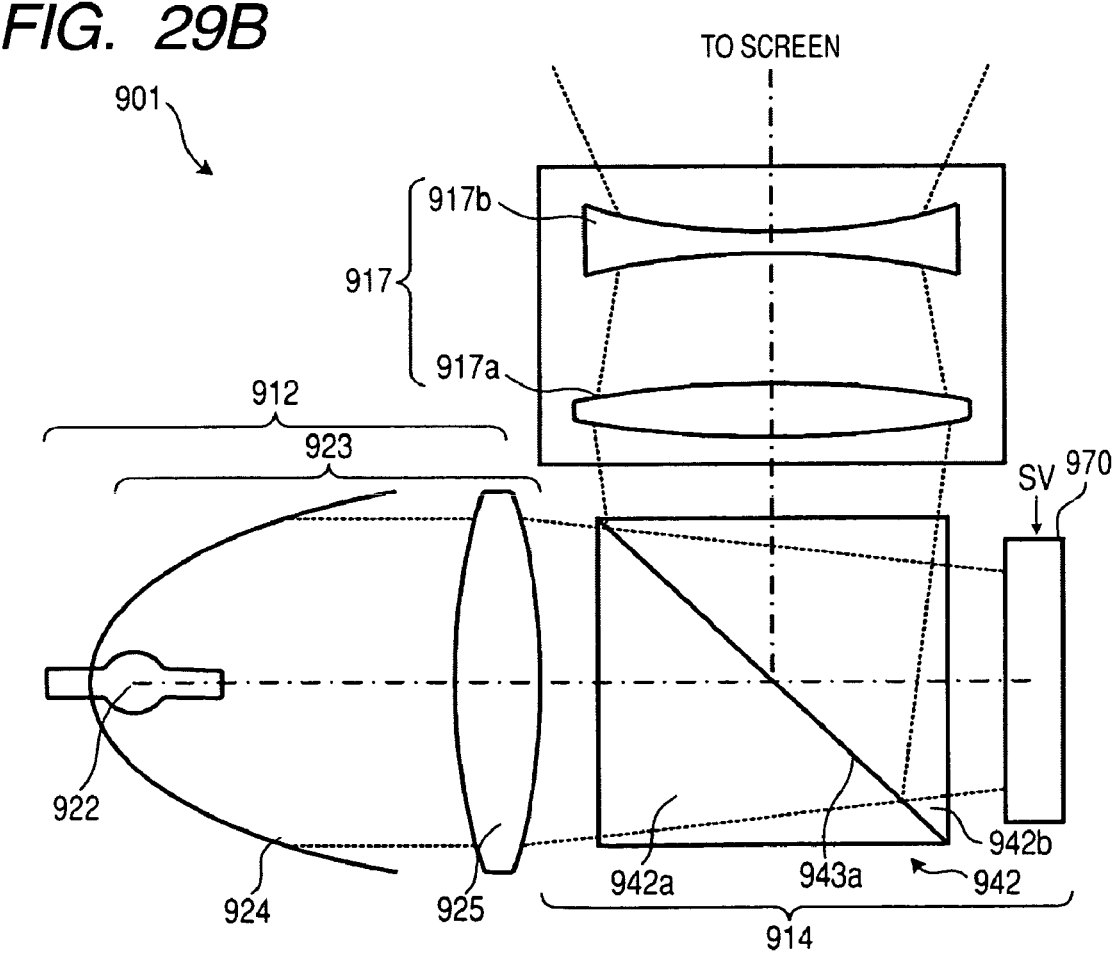

FIG. 9 is a diagram illustrating a projector unit 3A_2 (projection optical system) having a modified configuration of the first embodiment using the polarizing beam splitter 100A according to the first embodiment. In this modified configuration, the P polarization component is input to the reflective liquid crystal panel 170 as shown in FIG. 29B. In the device configuration, the known polarizing beam splitter 942 in the configuration shown in FIG. 29B is replaced with the polarizing beam splitter 100A according to the first embodiment. Here, the detailed description thereof is omitted.

In this modified example, the panel-output beam (S polarization component) spatially modulated on the basis of the image information SV and output from the reflective liquid crystal panel 170 is an optical image corresponding to the image signal SV and is input again to the polarizing beam splitter 100A. At this time, the S polarization component of which the vibration direction is rotated by the reflective liquid crystal panel 170 is input to the glass prism 104, is input to and transmitted by the second parallel flat layer 108A, and is then input to the first parallel flat layer 106A. The first parallel flat layer 106A has the polarization separating function as a whole and thus reflects the S polarization component.

Accordingly, the S polarization component input to the first parallel flat layer 106A is reflected and output from the first parallel flat layer 106A, is input to and transmitted by the second parallel flat layer 108A, and is then input to the glass prism 104. The S polarization component input to the glass prism 104 is transmitted thereby and is output from the output surface (side surface 104b). Thereafter, the optical image formed with the variation in polarization in the reflective liquid crystal panel 170 is enlarged and projected to the screen not shown by the projection lens 117.

Here, while the panel-output beam output from the reflective liquid crystal panel 170 is input to the polarizing beam splitter 100A and is projected to a desired position on the screen by the projection lens 117, the astigmatism As_108A (=As2) occurs in the second parallel flat layer 108A and the astigmatism As_106A (=As1) occurs in the first parallel flat layer 106A. Since only the S polarization component is selectively reflected by the first parallel flat layer 106A, the astigmatism As_106A (=As1) occurs in the first parallel flat layer 106A and the astigmatism As_108A (=As2) occurs in the second parallel flat layer 108A.

However, the optical constants of the polarizing beam splitter 100A are set as shown in FIG. 7, the negative astigmatism As_108A (=As2) of −15.8 μm occurs due to the second parallel flat layer 108A, but the positive astigmatism As_106A (=As1) of 15.5 μm occurs due to the first parallel flat layer 106A. Accordingly, both are almost cancelled. The positive astigmatism As_106A (=As1) of 15.5 μm occurs due to the first parallel flat layer 106A, but the negative astigmatism As_108A (=As2) of −15.8 μm occurs due to the second parallel flat layer 108A. Accordingly, both astigmatism is almost cancelled and the total astigmatism As (=|2×As1+2×As2|) is satisfactorily small. That is, since the astigmatism occurring due to the two times transmission of the light beam by the first parallel flat layer 106A is 2×As1=31.0 μm and the astigmatism occurring due to the two times transmission of the light beam by the second parallel flat layer 108A is 2×As2=−31.6 μm, both are almost cancelled.

For example, when the F number of the projection lens 117 used in the projector unit 3A_2 according to the first embodiment (modified configuration) is 2.5 and the pixel pitch of the reflective liquid crystal panel 170 is 7 μm, the depth of focus Fδ is 17.5 μm and a half of the depth of focus Fδ is Fδ/2=8.75 μm. The absolute values of both astigmatism As_106A and As_108A are greater than the half Fδ/2 (=8.75 μm) of the depth of focus Fδ. Accordingly, since the astigmatism of 31.0 μm occurs, the desired resolution is not obtained using only the first parallel flat layer 106A. On the contrary, by providing the second parallel flat layer 108A correcting the astigmatism As_106A due to the first parallel flat layer 106A, the total astigmatism As (=|2×As1+2×As2|) is 0.6 μm. The total astigmatism AS (=|2×As1+2×As2|) is equal to or less than a half Fδ/2 (=8.75 μm) of the depth of focus Fδ as the first reference allowable astigmatism value As0_1, is also equal to or less than a quarter Fδ/4 (=4.38 μm) of the depth of focus Fδ as the second reference allowable astigmatism value As0_2, and is much less than the allowable astigmatism value As0, thereby obtaining a desired resolution.

However, in the projector unit 3A_2 having the above-mentioned modified configuration, since the first parallel flat layer 106A performs the polarization separating function as a whole, it cannot be said that the panel-output beam spatially modulated on the basis of the image information SV and output from the reflective liquid crystal panel 170 passes through the entire part of the first parallel flat layer 106A two times. Accordingly, The correction by the second parallel flat layer 108A may be excessive. As a result, the basic configuration shown in FIG. 8 is more excellent.

Second Embodiment

Figure 10:
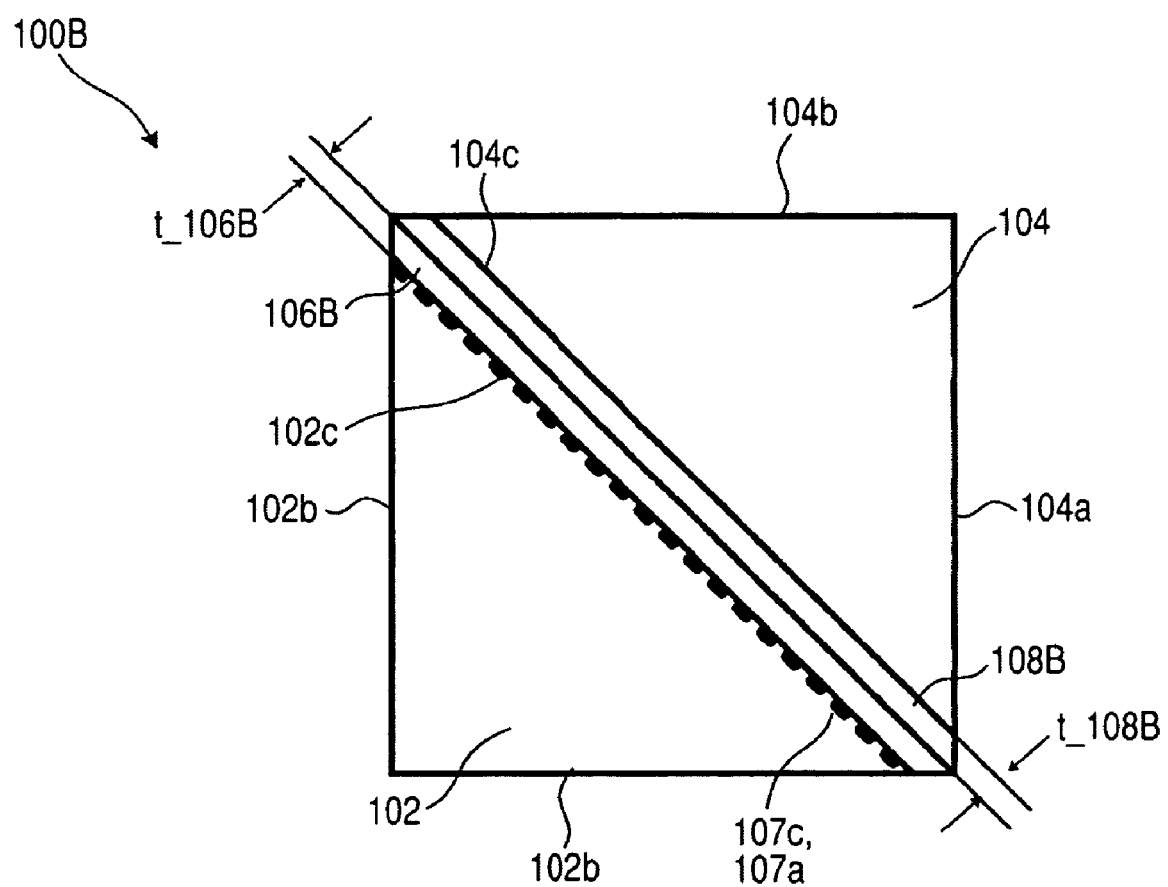
FIG. 10 is a sectional view illustrating a polarizing beam splitter according to a second embodiment of the invention in the x-y plane under the same condition as the arrangement shown in FIG. 5A.

FIGS. 10 to 13 are diagrams illustrating a basic configuration of a polarizing beam splitter according to a second embodiment of the invention. Here, FIG. 10 is a sectional view illustrating the polarizing beam splitter 100B according to the second embodiment in the x-y plane under the same condition as the arrangement shown in FIG. 5A. FIGS. 11A to 11C are diagrams illustrating a structure of a wire-grid polarization separating element used in the polarizing beam splitter 100B according to the second embodiment. FIGS. 12A and 12B are diagrams illustrating an operation of the polarizing beam splitter 100B according to the second embodiment. FIG. 13 is a table illustrating optical constants of the polarizing beam splitter 100B according to the second embodiment.

As shown in of FIG. 10, the polarizing beam splitter 100B according to the second embodiment includes triangular glass prisms 102 and 104 having substantially the identical refractive index and two parallel flat layers 106B and 108B disposed between the opposed surfaces of the glass prisms 102 and 104.

The first parallel flat layer 106B has a structure in which a thin polarization separating element such as a wire grid is formed on a glass substrate having a certain thickness t_106B, that is, on the surface of the first parallel flat layer 106B. That is, the first parallel flat layer 106B is formed of a wire-grid polarization separating element and a metallic grid 107c is formed on a surface of the glass substrate 107b with a predetermined pitch, thereby forming a metallic grid structure surface 107a.

Figure 11A:
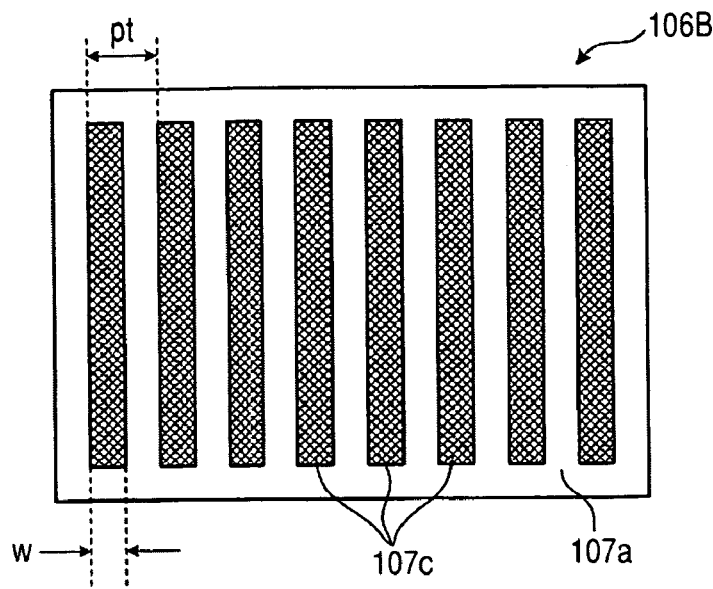
FIGS. 11A to 11C are diagrams illustrating a structure of a wire-grid polarization separating element used in the polarizing beam splitter according to the second embodiment of the invention.
Figure 11B:
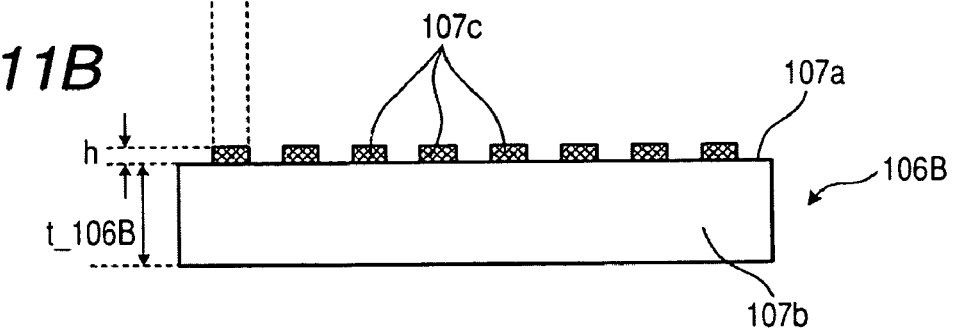

Specifically, in the first parallel flat layer 106B, as shown in FIGS. 11A and 11B, a stripe-like parallel metal grid 107c is formed on the surface (metallic grid structure surface 107a) of the glass substrate 107b out of metal such as aluminum. When the width of the individual metal stripes forming the metallic grid 107c is w, the height thereof is h, the grid forming period (pitch) is pt, the metallic grid 107c is formed with the period pt equal to or smaller than about ⅕ of the wavelength of the input beam, the beam of the electric field component vibrating perpendicular to the periodic direction is reflected, the beam of the electric field component vibrating parallel thereto is transmitted, and thus the absorption of light is hardly generated, thereby effectively separating the polarization.

Figure 11C:
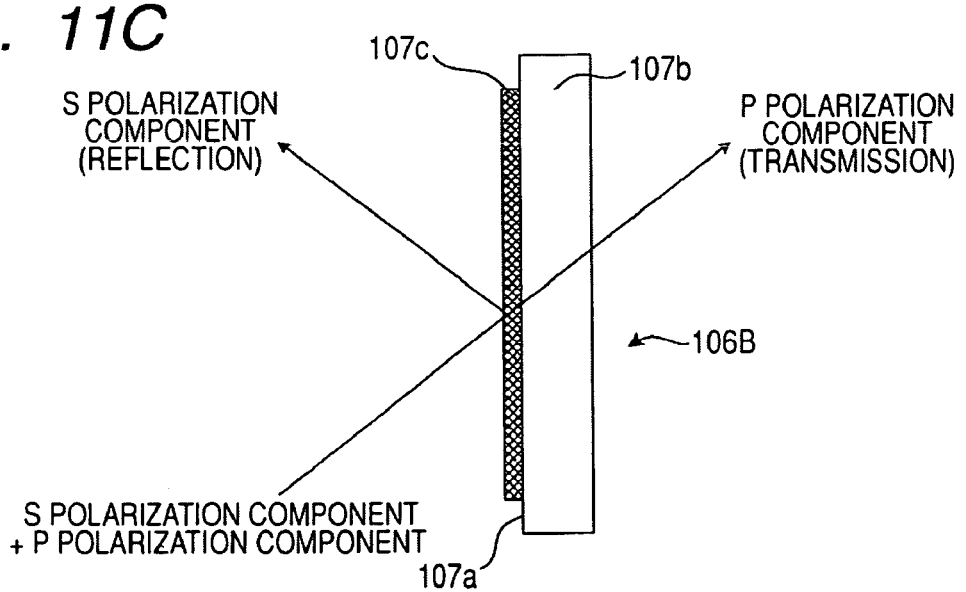

Accordingly, as shown in FIG. 11C, when a natural beam is input with a certain incidence angle, the reflected beam is the S polarization component with respect to the input surface of the first parallel flat layer 106B (wire-grid polarization separating element) and the transmitted beam is the P polarization component with respect to the input surface. The first parallel flat layer 106B is excellent in polarization separating characteristic and is small in variation of the spectrum transmittance with respect to the incidence angle. By inserting the first parallel flat layer 106B (wire-grid polarization separating element) between the triangular glass prisms 102 and 104, a polarizing beam splitter having an excellent polarization separating characteristic can be constructed.

The second parallel flat layer 108B is formed of a glass substrate having a certain thickness t_108B. The optical constants of the second parallel flat layer suitable for the optical constants of the first parallel flat layer 106B are set to have a function of correcting the astigmatism As1 due to the first parallel flat layer 106B having the polarization separating function (details of which are described later).

Two parallel flat layers 106B and 108B are disposed substantially in parallel between two triangular glass prisms 102 and 104, so that the first parallel flat layer 106B (wire-grid polarization separating element) is close to the opposed surface (side surface 102c) of the glass prism 102 and the second parallel flat layer 108B is close to the opposed surface (side surface 104c) of the glass prism 104. Here, the second parallel flat layer 108B is bonded and fixed to the opposed surface 104c of the glass prism 104 with an adhesive. The glass substrate 107b of the first parallel flat layer 106B is first bonded and fixed to the second parallel flat layer 108B with an adhesive. On the other hand, the metallic grid structure surface 107a of the first parallel flat layer 106B is bonded and fixed to the opposed surface 102c of the glass prism 102.

In the wire-grid polarization separating element, stripe-like metallic grids 107c are formed in parallel out of minute metal (such as aluminum), the height of the metallic grids 107c is about 100 to 200 nm, and the width of the metallic grids 107c is about 50 to 100 nm. Accordingly, when the triangular prism is bonded to the surface on which the metallic grids 107c are formed to be inserted between the glass prisms, the metallic grids 107c may be destructed due to the adhesive, thereby not exhibiting desired polarization separating performance. Even when the metallic grids 107c are not destructed but the refractive index is not 1, the opposite side of the glass substrate 107b, that is, the metallic grid structure surface 107a, does not have desired performance. Since the refractive index of 1 means air, the satisfactory performance is not exhibited only by inserting between and bonding to the triangular prisms.

In order to solve this problem, on the basis of the technique described in JP-A-2006-3384, it is preferable that the first parallel flat layer 106B (wire-grid polarization separating element) is disposed opposite to the metallic grids 107c (metallic grid structure surface 107a) fixed to the second parallel flat layer 108B, in a state where the surface of the glass substrate 107b on which the metallic grids 107c are not formed is fixed to the second parallel flat layer 108B and an air layer (air gap) is formed on the opposed surface 102c of the glass prism 102. That is, by opposing the metallic grids 107c (metallic grid structure surface 107a) and the glass prism 102 to each other with the air gap (air layer) therebetween, the metallic grid structure surface 107a of the first parallel flat layer 106B as the wire-grid polarization separating element is not bonded to the glass prism 102.

When the metallic grid structure surface 107a of the first parallel flat layer 106B is not bonded to the glass prism 102, for example, the upper surfaces and the lower surfaces of the glass prisms 102 and 104 may be bonded and fixed to each other with a fixing plate having proper size and shape. Alternatively, the end of the metallic grid structure surface 107a of the first parallel flat layer 106B bonded to the second parallel flat layer 108B and the end of the opposed surface 102c of the glass prism 102 may be bonded and fixed to each other with a space interposed therebetween. Alternatively, by using the upper surfaces and the lower surfaces of the glass prisms 102 and 104 may be fixed to each other with a fixing plate. The end to which the spacer is bonded is a portion on the metallic grid structure surface 107a to which the light beam is not input. The spacer may be formed to surround four sides of the second parallel flat layer 108B or may be disposed on at least two sides.

Figure 12A:
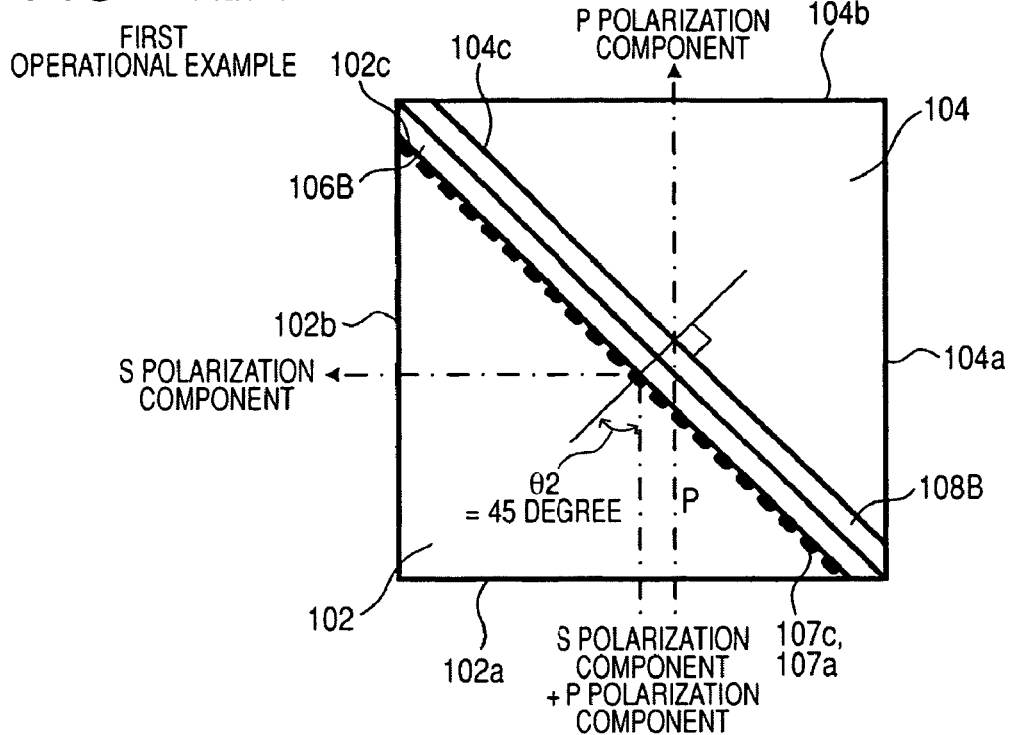
FIGS. 12A and 12B are diagrams illustrating an operation of the polarizing beam splitter according to the second embodiment of the invention.

The basic operation of the polarizing beam splitter 100B according to the second embodiment in which two parallel flat layers 106B and 108B are disposed between the glass prisms 102 and 104 is as follows. In the first operational example, it is assumed that a light beam is input from the input surface (side surface 102a) of the glass prism 102, as shown in FIG. 12A. The input beam has a P polarization component and an S polarization component. The parallel flat layers 106B and 108B are tilted by θ2 (=θp: for example, 45±15 degree) about the light beam input to the glass prism 102.

The input beam is input to the input surface (side surface 102a in the drawing) of the glass prism 102 and is then input to the bonding surface (opposed surface 102c) of the glass prism 102 and the first parallel flat layer 106B. Then, the beam is input to the metallic grid structure surface 107a of the first parallel flat layer 106B. Here, the S polarization component thereof is reflected and the P polarization component is transmitted by the metallic grid structure surface 107a. Thereafter, the S polarization component is input to the glass prism 102 again and is output from the output surface (side surface 102b in the drawing). On the other hand, the P polarization component is input to the glass substrate 107b of the first parallel flat layer 106B, is output from the glass substrate 107b, is input to and transmitted by the second parallel flat layer 108B, and then is input to the glass prism 104. Then, the P polarization component is input to and transmitted by the glass prism 104 and then is output from the output surface (side surface 104b in the drawing).

Figure 12B:
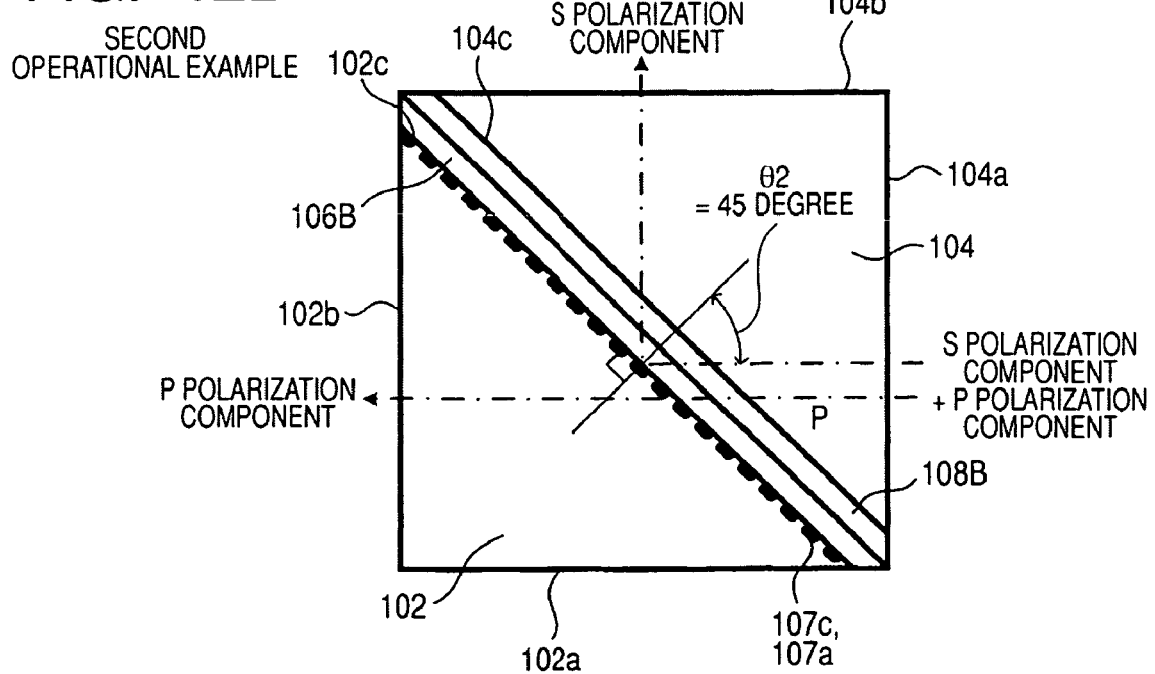

In the second operational example, as shown in FIG. 12B, it is assumed that a light beam is input to the input surface (side surface 104a) of the glass prism 104. The input beam has a P polarization component and an S polarization component. The parallel flat layers 106B and 108B are tilted by θ2 (=θp: for example, 45±15 degree) about the light beam input to the glass prism 102.

The input beam is input to the input surface (side surface 104a in the drawing) of the glass prism 104, is transmitted by the first parallel flat layer 106B, and is then input to the second parallel flat layer 108B. Then, the beam input to the first parallel flat layer 106B is input to the metallic grid structure surface 107a through the glass substrate 107b. Here, the S polarization component thereof is reflected and the P polarization component is transmitted by the metallic grid structure surface 107a. Thereafter, the S polarization component is output from the glass substrate 107b of the first parallel flat layer 106B, is input again to the second parallel flat layer 108B, is transmitted by the second parallel flat layer 108B, is input to the glass prism 104, and is output from the output surface (side surface 104b in the drawing). On the other hand, the P polarization component is input to the glass prism 102, is transmitted by the glass prism, and then is output from the output surface (side surface 102b in the drawing).

Here, the optical constants of the optical members 102, 104, 106B, and 108B of the polarizing beam splitter 100B according to the second embodiment are set as shown in the table of FIG. 13 so as to correct the astigmatism due to the first parallel flat layer 106B having the polarization separating function by the use of the second parallel flat layer 108B, where the refractive index N_102 of the glass prism 102 and the refractive index N_104 of the glass prism 104 are equally the refractive index Np2 (=Np), the refractive index and the thickness of the first parallel flat layer 106B are N_106B (=Na) and t_106B (=ta), respectively, and the refractive index and the thickness of the second parallel flat layer 108B are N_108B (=Nb) and t_108B (=tb), respectively.

In the optical constant shown in FIG. 13, the product of a difference in refractive index (N_106B−N_102)=(Na−Np) between the first parallel flat layer 106B and the glass prism 102 and a difference in refractive index (N_108B−N_104)=(Nb−Np) between the second parallel flat layer 108B and the glass prism 104 is (Na−Np)×(Nb−Np)=(1.60548−1.56605)×(1.51633−1.56605)=−0.001 96, which satisfies the condition of negative (<0).

In the optical constants shown in FIG. 13, from Expression 1, the astigmatism As_106B (=As1) of the first parallel flat layer 106B is −27.9 μm and the astigmatism As_108B (=As2) of the second parallel flat layer 108B is 27.6 μm, which are meaningful magnitudes. However, both astigmatism As_106B and As_108B has the opposite signs and substantially the same magnitude. Accordingly, the total astigmatism As which is the absolute value (=|As1+As2|) of the resultant astigmatism of both astigmatism As_106B and As_108B is 0.3 μm and it is expected to be much smaller than the allowable astigmatism value As0.

Figure 14:
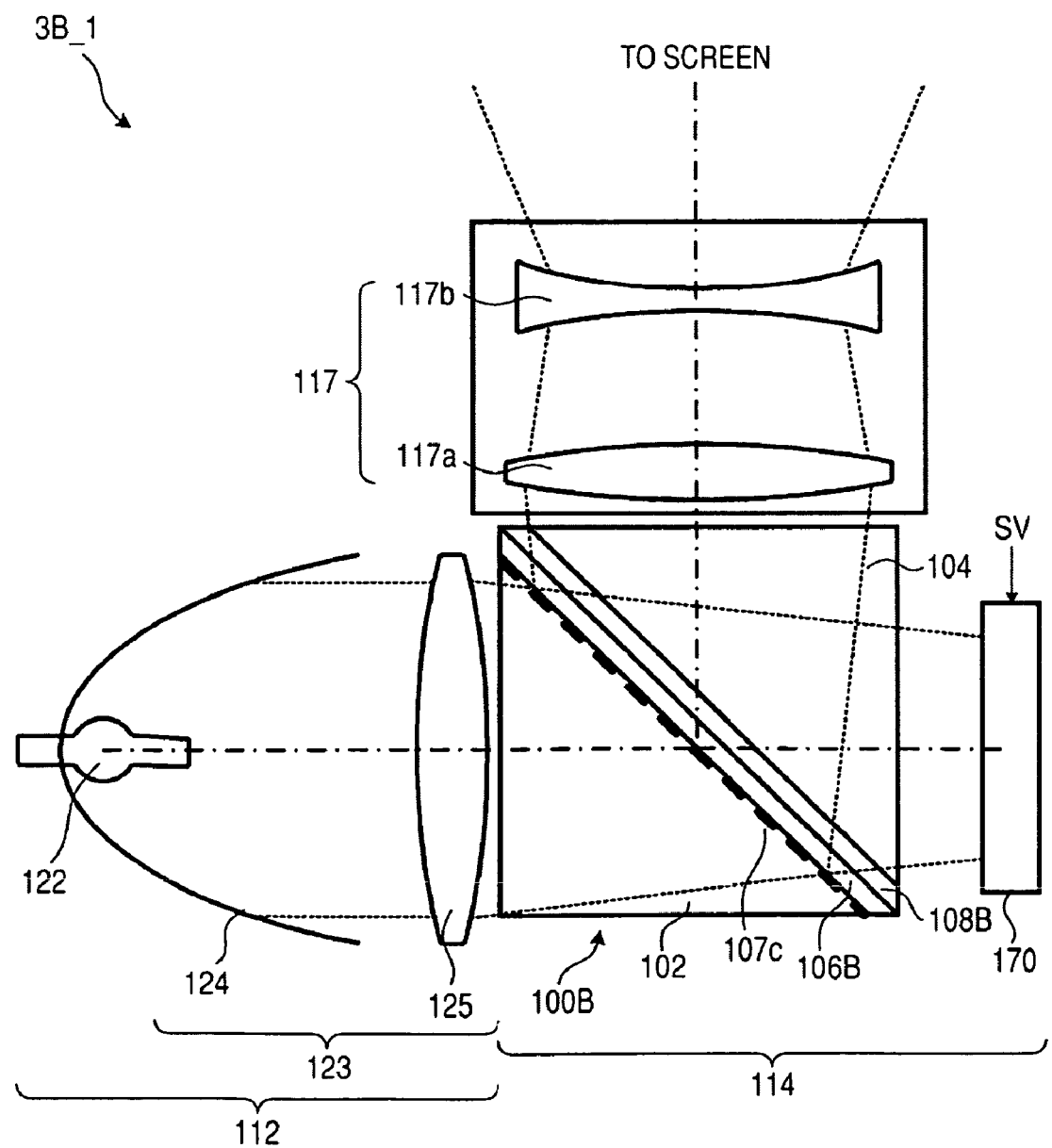
FIG. 14 is a diagram illustrating a projector unit having a basic configuration employing the polarizing beam splitter according to the second embodiment of the invention.

FIG. 14 is a diagram illustrating a projector unit 3B_1 (projection optical system) having a basic configuration employing the polarizing beam splitter 100B according to the second embodiment. In this basic configuration, the P polarization component is input to the reflective liquid crystal panel 170, similarly to FIGS. 29A and 29B or FIG. 9. In the configuration, the polarizing beam splitter 942 shown in FIG. 29B or the polarizing beam splitter 100A_2 having the modified configuration of the first embodiment shown in FIG. 9 is replaced with the polarizing beam splitter 100B according to the second embodiment. Here, detailed description thereof is omitted.

In this basic configuration, the panel-output beam (S polarization component) spatially modulated on the basis of the image information SV and output from the reflective liquid crystal panel 170 is an optical image corresponding to the image signal SV and is input again to the polarizing beam splitter 100B. At this time, the S polarization component of which the vibration direction is rotated by the reflective liquid crystal panel 170 is input to the glass prism 104, is input to and transmitted by the second parallel flat layer 108B and is then input to the first parallel flat layer 106B.

Since the first parallel flat layer 106B is formed of a wire-grid polarization separating element having a structure in which the metallic grids 107c are formed on the glass substrate 107b, the S polarization component input to the glass substrate 107b is reflected by the metallic grid structure surface 107a, is output from the glass substrate 107b, is input to and transmitted again by the second parallel flat layer 108B, and is then input to the glass prism 104. The S polarization component input to the glass prism 104 is transmitted thereby and is output from the output surface (side surface 104b). Thereafter, the optical image formed with the change in polarization of the beam by the reflective liquid crystal panel 170 is enlarged and projected onto the screen not shown by the projection lens 117.

Here, while the panel-output beam output from the reflective liquid crystal panel 170 is input to the polarizing beam splitter 100B and is projected to a desired position on the screen by the projection lens 117, the astigmatism As_108B (=As2) occurs in the second parallel flat layer 108B and the astigmatism As_106B (=As1) occurs in the first parallel flat layer 106B (particularly, the glass substrate 107b). Since only the S polarization component is selectively reflected by the first parallel flat layer 106B (particularly, the glass substrate 107b), the astigmatism As_106B (=As1) occurs in the first parallel flat layer 106B and the astigmatism As_108B (=As2) occurs in the second parallel flat layer 108B.

However, the optical constants of the polarizing beam splitter 100B are set as shown in FIG. 13, the positive astigmatism As_108B (=As2) of 27.6 μm occurs due to the second parallel flat layer 108B, but the negative astigmatism As_106B (=As1) of −27.9 μm occurs due to the first parallel flat layer 106B. Accordingly, both are almost cancelled. Regarding the S polarization component selectively reflected by the first parallel flat layer 106B, the negative astigmatism As_106B (=As1) of −27.9 μm occurs due to the first parallel flat layer 106B, but the positive astigmatism As_108B (=As2) of 27.6 μm occurs due to the second parallel flat layer 108B. Accordingly, both are almost cancelled and the total astigmatism As (=|2×As1+2×As2|) is satisfactorily small. That is, since the resultant astigmatism occurring due to the two times transmission of the light beam by the first parallel flat layer 106B is 2×As1=−55.8 μm and the resultant astigmatism occurring due to the two times transmission of the light beam by the second parallel flat layer 108B is 2×As2=55.2 μm, both are almost cancelled.

For example, when the F number of the projection lens 117 used in the projector unit 3B_1 according to the second embodiment (basic configuration) is 2.5 and the pixel pitch of the reflective liquid crystal panel 170 is 7 μm, the depth of focus Fδ is 17.5 μm and a half of the depth of focus Fδ is Fδ/2=8.75 μm. The absolute values of both astigmatism As_106B and As_108B are greater than the half Fδ/2 of the depth of focus Fδ. Accordingly, the astigmatism of −55.8 μm occurs using only the first parallel flat layer 106B, thereby not obtaining the desired resolution. On the contrary, by providing the second parallel flat layer 108B correcting the astigmatism As_106B due to the first parallel flat layer 106B, the total astigmatism As (=|2×As1+2×As2|) is 0.6 μm. The total astigmatism As (=|2×As1+2×As2|) is equal to or less than the half Fδ/2 (=8.75 μm) of the depth of focus Fδ as the first reference allowable astigmatism value As0_1, is also equal to or less than the quarter Fδ/4 (=4.38 μm) of the depth of focus Fδ as the second reference allowable astigmatism value As0_2, and is much less than the allowable astigmatism value As0, thereby obtaining the desired resolution.

Second Embodiment

Modified Example

Figure 15:
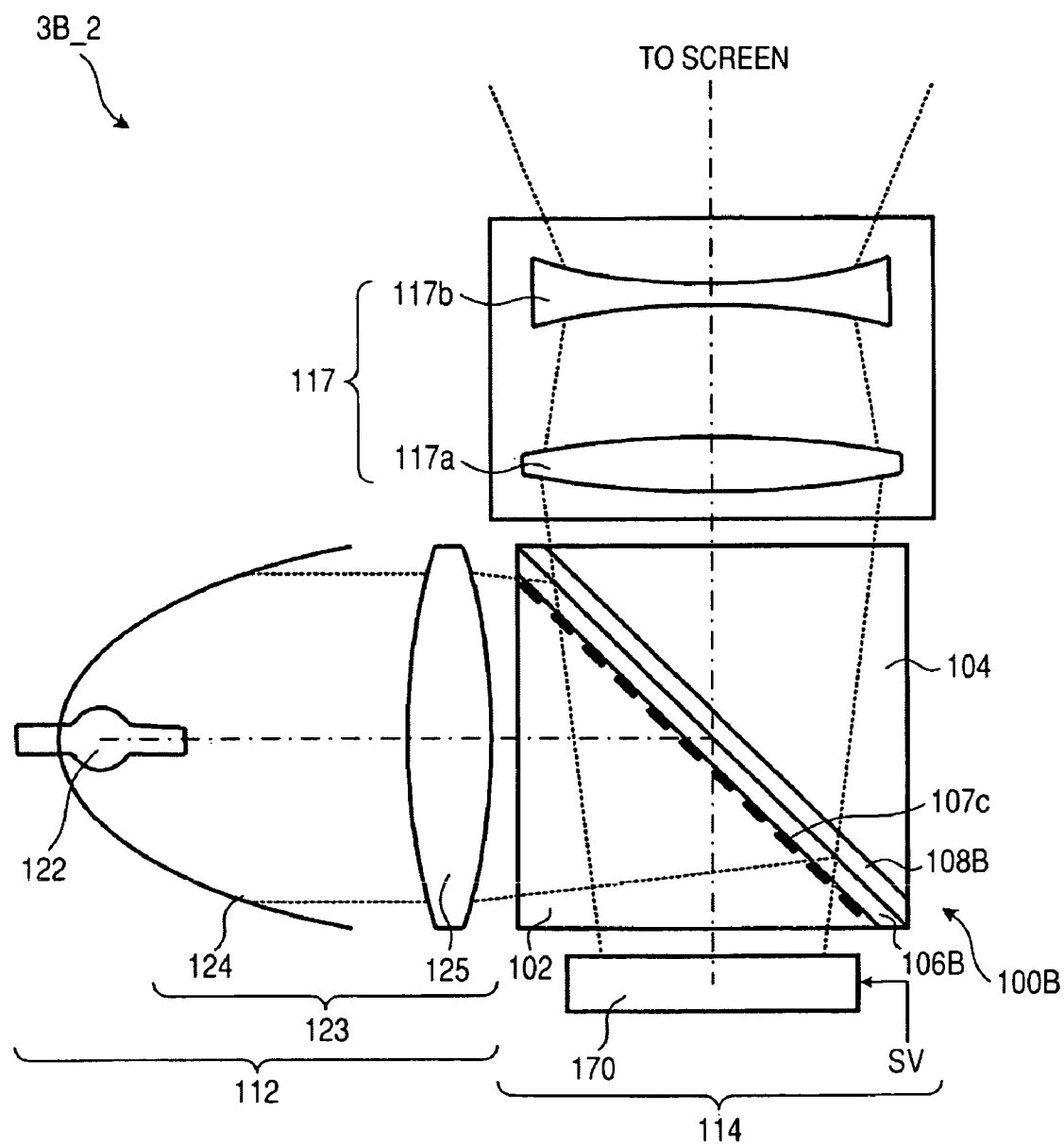
FIG. 15 is a diagram illustrating a projector unit having a modified configuration employing the polarizing beam splitter according to the second embodiment of the invention.

FIG. 15 is a diagram illustrating a projector unit 3B_2 (projection optical system) having a modified configuration using the polarizing beam splitter 100B according to the second embodiment. In this modified configuration, the S polarization component is input to the reflective liquid crystal panel 170 as shown in of FIG. 8. In the configuration shown in FIG. 8, the polarizing beam splitter 100A according to the first embodiment is replaced with the polarizing beam splitter 100B according to the second embodiment.

In this modified example, the panel-output beam (P polarization component) spatially modulated on the basis of the image information SV and output from the reflective liquid crystal panel 170 is an optical image corresponding to the image signal SV and is input again to the polarizing beam splitter 100B. At this time, the P polarization component of which the vibration direction is rotated by the reflective liquid crystal panel 170 is input to the glass prism 102 and is input to the metallic grid structure surface 107a of the first parallel flat layer 106B.

Since the first parallel flat layer 106B is formed of a wire-grid polarization separating element having a structure in which the metallic grids 107c are formed on the glass substrate 107b, the P polarization component input to the first parallel flat layer 106B is transmitted by the metallic grid structure surface 107a, is input to the glass substrate 107b, is output from the glass substrate 107b, is input to and transmitted by the second parallel flat layer 108B, and is then input to the glass prism 104. The P polarization component input to the glass prism 104 is transmitted thereby and is output from the output surface (side surface 104b). Thereafter, the optical image formed with the variation in polarization in the reflective liquid crystal panel 170 is enlarged and projected to the screen not shown by the projection lens 117.

Here, while the panel-output beam output from the reflective liquid crystal panel 170 is input to the polarizing beam splitter 100B and is projected to a desired position on the screen by the projection lens 117, the astigmatism As_106B (=As1) occurs in the first parallel flat layer 106B and the astigmatism As_108B (=As2) occurs in the second parallel flat layer 108B.

However, the optical constants of the polarizing beam splitter 100B are set as shown in FIG. 13, the negative astigmatism As_106B (=As1) of −27.9 μm occurs due to the first parallel flat layer 106B, but the positive astigmatism As_108B (=As2) of 27.6 μm occurs due to the second parallel flat layer 108B. Accordingly, both are almost cancelled and the total astigmatism As (=|As1+As2|) is satisfactorily small.

For example, when the F number of the projection lens 117 used in the projector unit 3B_2 according to the second embodiment (modified configuration) is 2.5 and the pixel pitch of the reflective liquid crystal panel 170 is 7 μm, the depth of focus Fδ is 17.5 μm and a half of the depth of focus Fδ is Fδ/2=8.75 μm. The absolute values of both astigmatism As_106B and As_108B are greater than the half Fδ/2 (=8.75 μm) of the depth of focus Fδ. Accordingly, the desired resolution is not obtained using only the first parallel flat layer 106B. On the contrary, by providing the second parallel flat layer 108B correcting the astigmatism As_106B due to the first parallel flat layer 106B, the total astigmatism As (=|As1+As2|) is 0.3 μm. The absolute value (=|As1+As2|) of the resultant astigmatism of both astigmatism As_106B and As_108B is equal to or less than the depth of focus Fδ (=17.5 μm) as the first reference allowable astigmatism value As0_1, is also equal to or less than the half Fδ/2 (=8.75 μm) of the depth of focus Fδ as the second reference allowable astigmatism value As0_2, and is much less than the allowable astigmatism value As0, thereby obtaining a desired resolution.

However, in the projector unit 3B_2 having the modified configuration, compared with the projector unit 3B_1 having the basic configuration for allowing the metallic grid structure surface 107a of the first parallel flat layer 106B to reflect the S polarization component polarized by the reflective liquid crystal panel 170 and enlarging and projecting the reflected S polarization component by the use of the projection lens 117, the S/N (signal to noise ratio) or the contrast may be deteriorated. Accordingly, the basic configuration shown in FIG. 14 is more excellent.

The reason that the modified configuration is lower in the S/N or the contrast than the basic configuration is as follows. That is, the birefringence occurs in usual glass due to the influence of heat or stress and thus the polarization is disturbed. Accordingly, when the usual glass is disposed in the front of the element finally separating the polarization, the S/N or the contrast is deteriorated. In order to avoid the problem in a projector with high contrast, a special optical glass having a low-photoelaticity should be used and thus the refractive index of the material is limited. Accordingly, it is difficult to perform proper correction.

However, when the modified configuration is applied to a low-contrast projector, the deterioration in S/N or contrast does not cause a problem. Actually, the projector employing the reflective panel is advantageous in high contrast and thus such a configuration is not generally used for a low-contrast projector.

Third Embodiment

Figure 16:
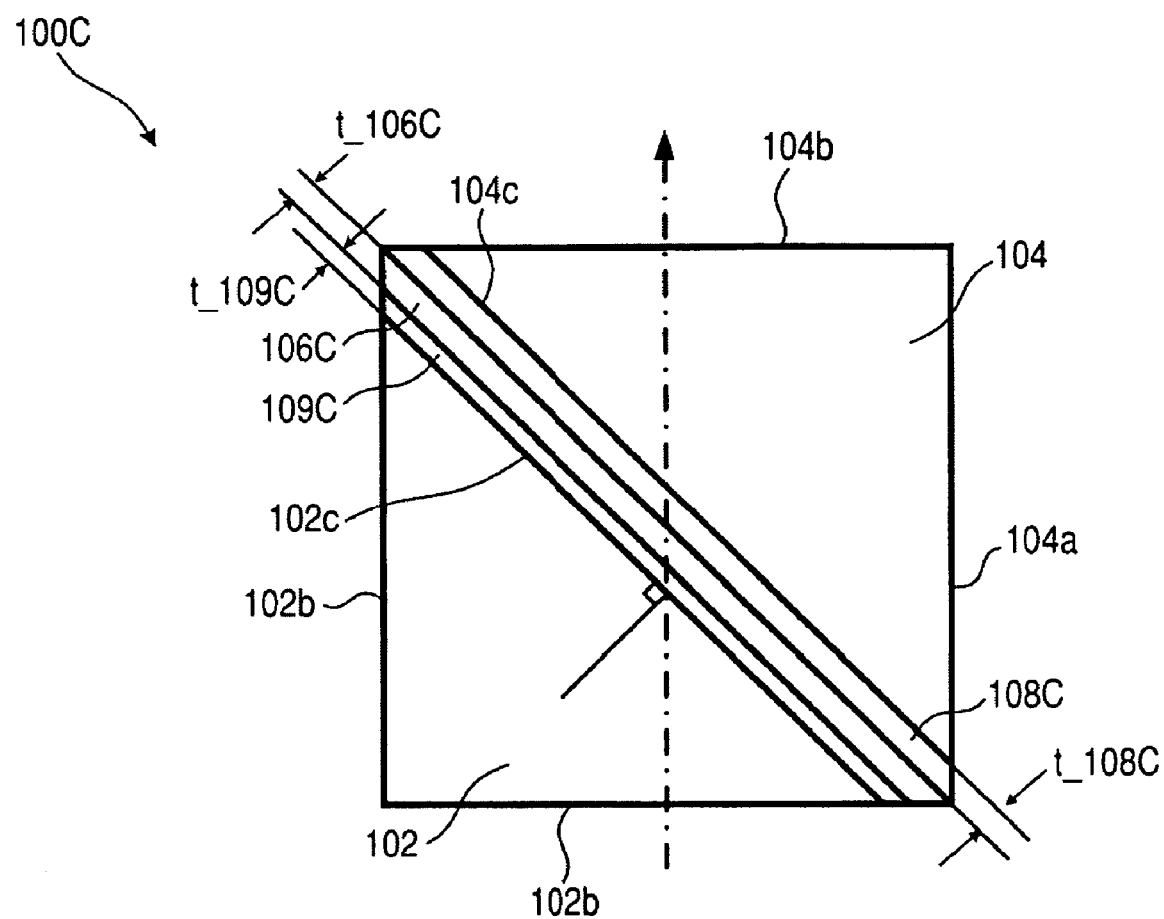
FIG. 16 is a sectional view illustrating a polarizing beam splitter according to a third embodiment of the invention in the x-y plane under the same condition as the arrangement shown in FIG. 5A.
Figure 17A:
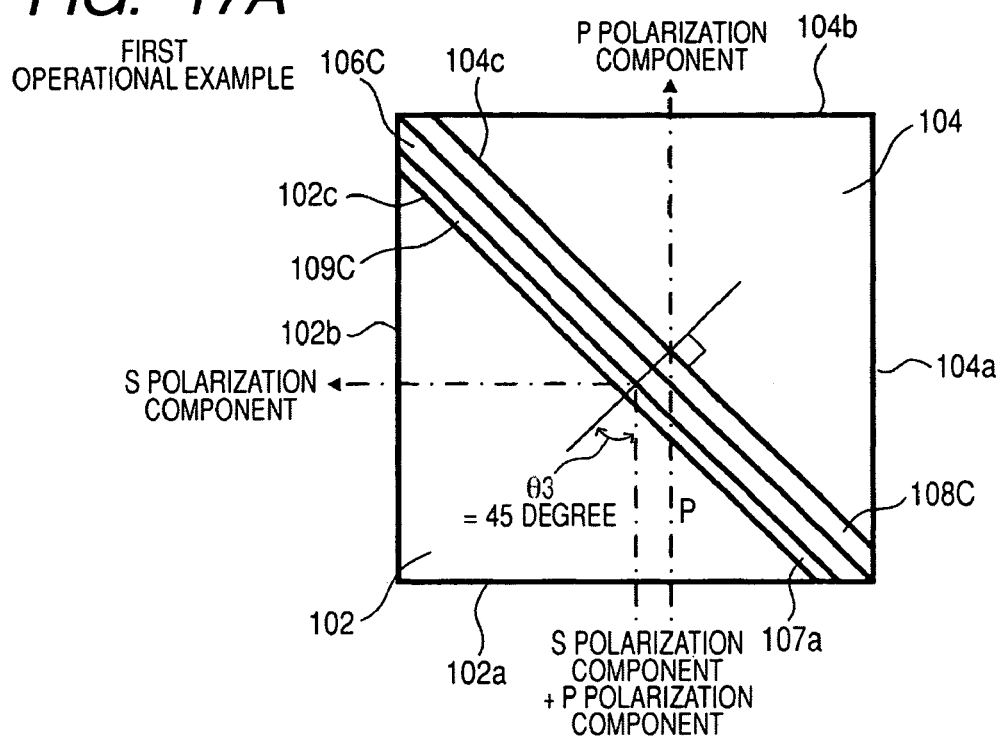
FIGS. 17A and 17B are diagrams illustrating an operation of the polarizing beam splitter according to the third embodiment of the invention.
Figure 17B:
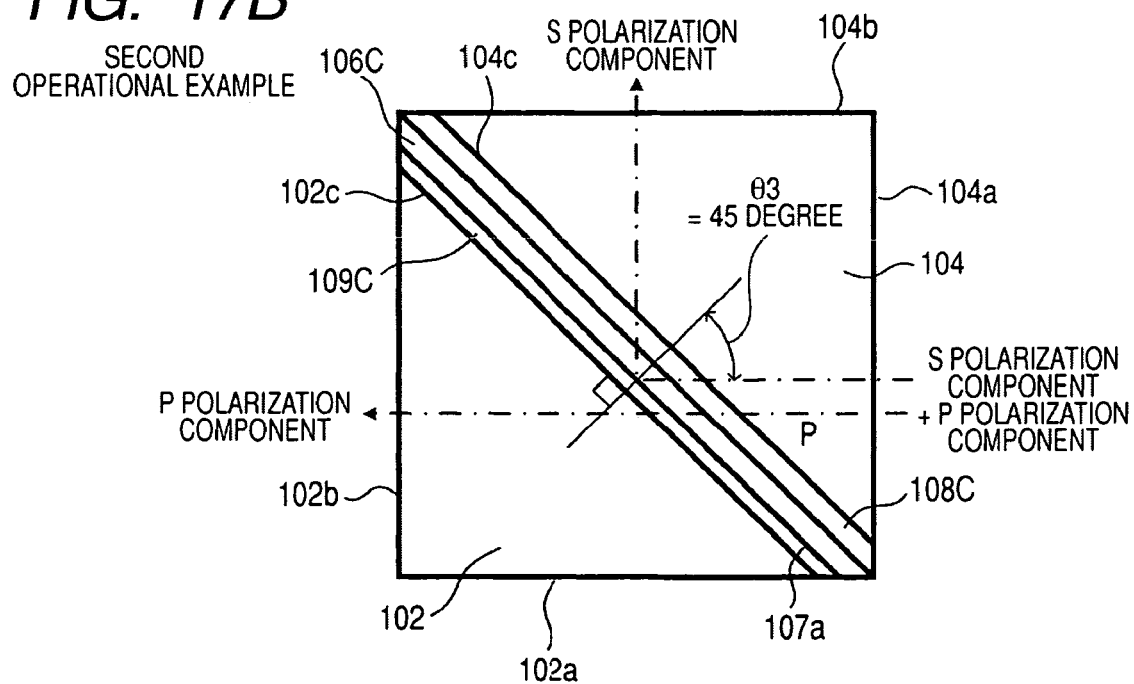
Figures 18, 19:
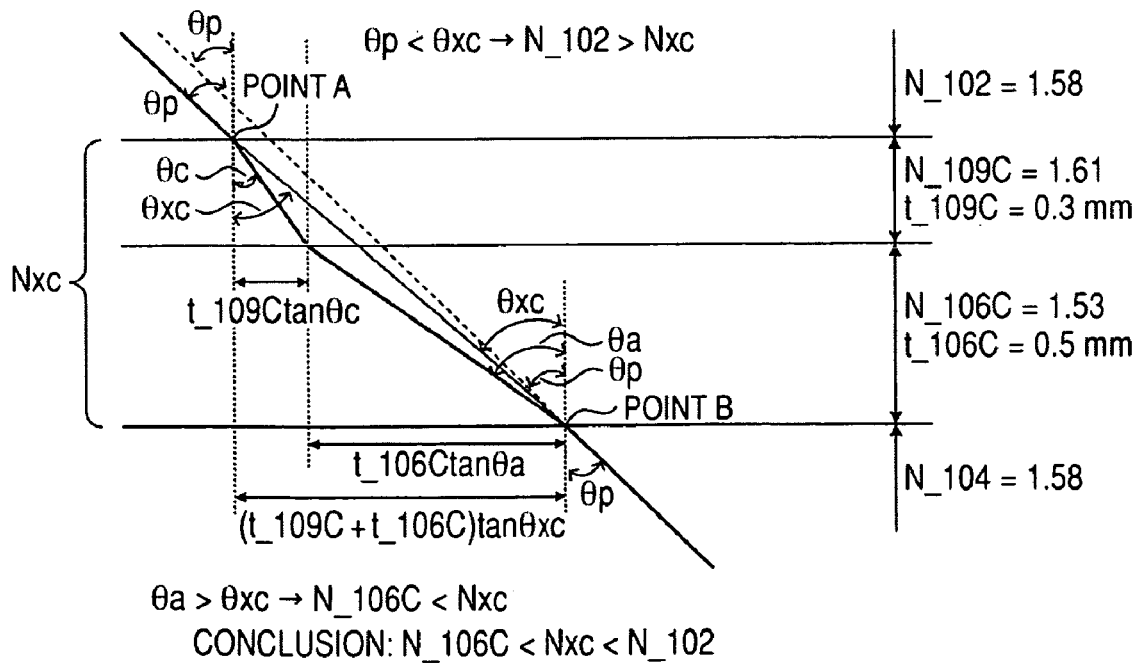
FIG. 18 is a table showing optical constants of the polarizing beam splitter according to the third embodiment of the invention.
FIG. 19 is a diagram illustrating the resultant refractive index of parallel flat layers of a polarizing beam splitter not employing the third embodiment of the invention.

FIGS. 16 to 19 are diagrams illustrating a basic configuration of a polarizing beam splitter according to a third embodiment of the invention. Here, FIG. 16 is a sectional view illustrating the polarizing beam splitter 100C according to the third embodiment in the x-y plane under the same condition as the arrangement shown in FIG. 5A. FIGS. 17A and 17B are diagrams illustrating an operation of the polarizing beam splitter 100C according to the third embodiment. FIG. 18 is a table illustrating optical constants of the polarizing beam splitter 100C according to the third embodiment. FIG. 19 is a diagram illustrating the resultant refractive index of parallel flat layers of a polarizing beam splitter 100Cx to which the third embodiment is not applied.

In the third embodiment, a parallel flat layer (referred to as a third parallel flat layer) other than the first parallel flat layer or the second parallel flat layer is interposed between the glass prisms 102 and 104. The third embodiment is different from a fourth embodiment to be described later, in that when the astigmatism As1 occurring in a first parallel flat layer 106C and a third parallel flat layer 109C interposed between the glass prisms 102 and 104 does not satisfy the allowable astigmatism value As0, a second parallel flat layer 108C having a function of correcting the astigmatism As1 is provided.

As shown in of FIG. 16, the polarizing beam splitter 100C according to the third embodiment includes triangular glass prisms (prism substrates) 102 and 104 using glass having substantially the same refractive index as a base material and three parallel flat layers 106C, 108C, and 109C disposed between the opposed surfaces of the glass prisms 102 and 104.

The first parallel flat layer 106C has a polarizing film having a certain thickness t_106C as a main part and serves as a polarization separating element as a whole. For example, the Vikuiti (registered trademark and/or trademark) DBEF-D film is used in the polarization separating element.

The third parallel flat layer 109C is a film-like protective layer for protecting the first parallel flat layer 106C from UV and has a certain thickness t_109C.

The second parallel flat layer 108C is formed of a glass substrate having a certain thickness t_108C. The optical constants of the second parallel flat layer suitable for the optical constants of the first parallel flat layer 106C and the third parallel flat layer 109C are set to have a function of correcting the astigmatism As1 due to the first parallel flat layer 106C and the third parallel flat layer 109C serving as the protective film of the first parallel flat layer 106C having the polarization separating function (details of which are described later).

Three parallel flat layers 106C, 108C, and 109C are disposed substantially in parallel between two triangular glass prisms 102 and 104 so that the third parallel flat layer 109C is close to the opposed surface (side surface 102c) of the glass prism 102, the second parallel flat layer 108C is close to the opposed surface (side surface 104c) of the glass prism 104, and the first parallel flat layer 106C is disposed between the second parallel flat layer 108C and the third parallel flat layer 109C. Here, the third parallel flat layer 109C is bonded and fixed to the opposed surface 102c of the glass prism 102 with an adhesive, the first parallel flat layer 106C is bonded and fixed to the third parallel flat layer 109C with an adhesive, and the second parallel flat layer 108C is bonded and fixed to the opposed surface 104c of the glass prism 104 with an adhesive.

The basic operation of the polarizing beam splitter 100C according to the third embodiment in which three parallel flat layers 106C, 108C, and 109C are disposed between the glass prisms 102 and 104 is as follows.

In the first operational example, it is assumed that a light beam is input from the input surface (side surface 102a) of the glass prism 102, as shown in FIG. 17A. The input beam has a P polarization component and an S polarization component. The parallel flat layers 106C, 108C, and 109C are tilted by θ3 (=θp: for example, 45±15 degree) about the light beam input to the glass prism 102.

The input beam is input to the input surface (side surface 102a in the drawing) of the glass prism 102, is input to and transmitted by the third parallel flat layer 109C, and is then input to the bonding surface of the third parallel flat layer 109C and the first parallel flat layer 106C. Then, the beam is input to the first parallel flat layer 106C. Here, since the first parallel flat layer 106C has the polarization separating function, the S polarization component thereof is reflected and the P polarization component is transmitted. Thereafter, the S polarization component is input to the glass prism 102 again and is output from the output surface (side surface 102b in the drawing). On the other hand, the P polarization component is output from the first parallel flat layer 106C, is input to and transmitted by the second parallel flat layer 108C, and then is input to the glass prism 104. Then, the P polarization component is input to and transmitted by the glass prism 104 and then is output from the output surface (side surface 104b in the drawing).

As shown in FIG. 17B, the second operational example is the same as shown in FIG. 6B according to the first embodiment. Detailed description of the operation is omitted.

Here, the optical constants of the optical members 102, 104, 106C, 108C, and 109C of the polarizing beam splitter 100C according to the third embodiment are set as shown in the table of FIG. 18 so as to correct the astigmatism As1 due to the first parallel flat layer 106C having the polarization separating function and the third parallel flat layer 109C serving as the protective film of the first parallel flat layer 106C by the use of the second parallel flat layer 108C, where the refractive index N_102 of the glass prism 102 and the refractive index N_104 of the glass prism 104 are equally the refractive index Np1 (=Np), the refractive index and the thickness of the first parallel flat layer 106A are N_106C and t_106C, respectively, the refractive index and the thickness of the second parallel flat layer 108C are N_108C and t_108C, respectively, and the refractive index and the thickness of the third parallel flat layer 109C are N_109C and t_109C, respectively.

As can be seen from the table shown in FIG. 18, similarly to the refractive index N_108C of the second parallel flat layer 108C, the refractive index N_109C of the third parallel flat layer 109C is greater than the refractive index Np1 of the glass prisms 102 and 104 and the third parallel flat layer has the same function as the second parallel flat layer 108C. However, it is not included in the second parallel flat layer according to the embodiments of the invention having a function of correcting the astigmatism As1 due to the first parallel flat layer 106C having the polarization separating function. In addition, the numerical value of the refractive index N_109C of the third parallel flat layer 109C is merely an extremely example and it is actually considered that the refractive index N_109C of the UV protective layer (third parallel flat layer 109C) and the plastic film of the first parallel flat layer 106C employed actually are all usually smaller than the refractive index Np1 of the glass prisms 102 and 104.

Here, when the resultant refractive index of the parallel flat layers (the first parallel flat layer 106C and the third parallel flat layer 109C) disposed between the opposed surfaces of the glass prisms 102 and 104 not employing the second parallel flat layer 108C according to this embodiment is Nxc and the resultant incidence angle or emission angle is θxc, the rough value of the refractive index Nxc can be seen from the geometric optical relation shown in FIG. 19. The resultant refractive index Nxc means the refractive index when it is considered that a parallel flat layer made of a single medium exists between the opposed surfaces of the glass prisms 102 and 104.

First, paying attention to point A in the drawing where a light beam is input from the glass prism 102 to the third parallel flat layer 109C, N_102>Nxc can be seen from θp<θxc. Paying attention to point B in the drawing where a light beam is output from the first parallel flat layer 106C to the glass prism 104, N_106C<Nxc can be seen from θp<θxc and θa>θxc. That is, finally, N_106C<Nxc<N_102 can be seen, thereby obtaining the relation 1.53<Nxc<1.58.

This can be analyzed using Expression 3. Nxc=1.5590 is obtained using the expression. Accordingly, N_106C<Nxc<N_102 can be seen. However, since the value of Nxc is minutely changed with a variation in θp, θp is calculated as an open angle of the input beam derived from the F number of the projection lens (2/F=tan θp). Specifically, the angle θp calculated from F=2 is θp=14.036 from tan θp=1/2/2.

$$\left.\begin{array}{l}(t\_109C + t\_106C)\tan\theta xc = t\_106C\tan\theta a + t\_109C\tan\theta c \\ Nxc\sin\theta xc = N\_102\sin\theta p \\ N\_106C\sin\theta a = N\_104\sin\theta p \\ N\_109C\sin\theta c = N\_102\sin\theta p \\ N\_102 = N\_104\end{array}\right\} \quad (3)$$

Accordingly, since the difference in refractive index (Nxc−N_102)=(Na−Np) between the resultant refractive index Nxc of the first parallel flat layer 106C and the third parallel flat layer 109C and the refractive index of the glass prism 102 is negative and the difference in refractive index (N_108C−N_104)=(Nb−Np) between the second parallel flat layer 108C and the glass prism 104 is positive, the product (Na−Np)×(Nb−Np) thereof is negative (<0).

In the optical constants shown in FIG. 18, from Expression 1, the astigmatism As_106C due to the first parallel flat layer 106C is 34 μm, the astigmatism As_108C (=As2) due to the second parallel flat layer 108C is −27.9 μm, the astigmatism As_109C due to the third parallel flat layer 109C is −9.2 μm, and the resultant astigmatism As1 of the astigmatism As_106C due to the first parallel flat layer 106C and the astigmatism As_109C due to the third parallel flat layer 109C is 24.8 μm, which are meaningful magnitudes. However, both astigmatism As1 (=As_106C+As_109C) and As2 (=As_108C) has the opposite signs and substantially the same magnitude. Accordingly, the absolute value (=|As1+As2|) of the resultant astigmatism of both astigmatism As1 and As2 as the total astigmatism As is 3.1 µm and it is expected to be much smaller than the allowable astigmatism value As0.

Figure 20:
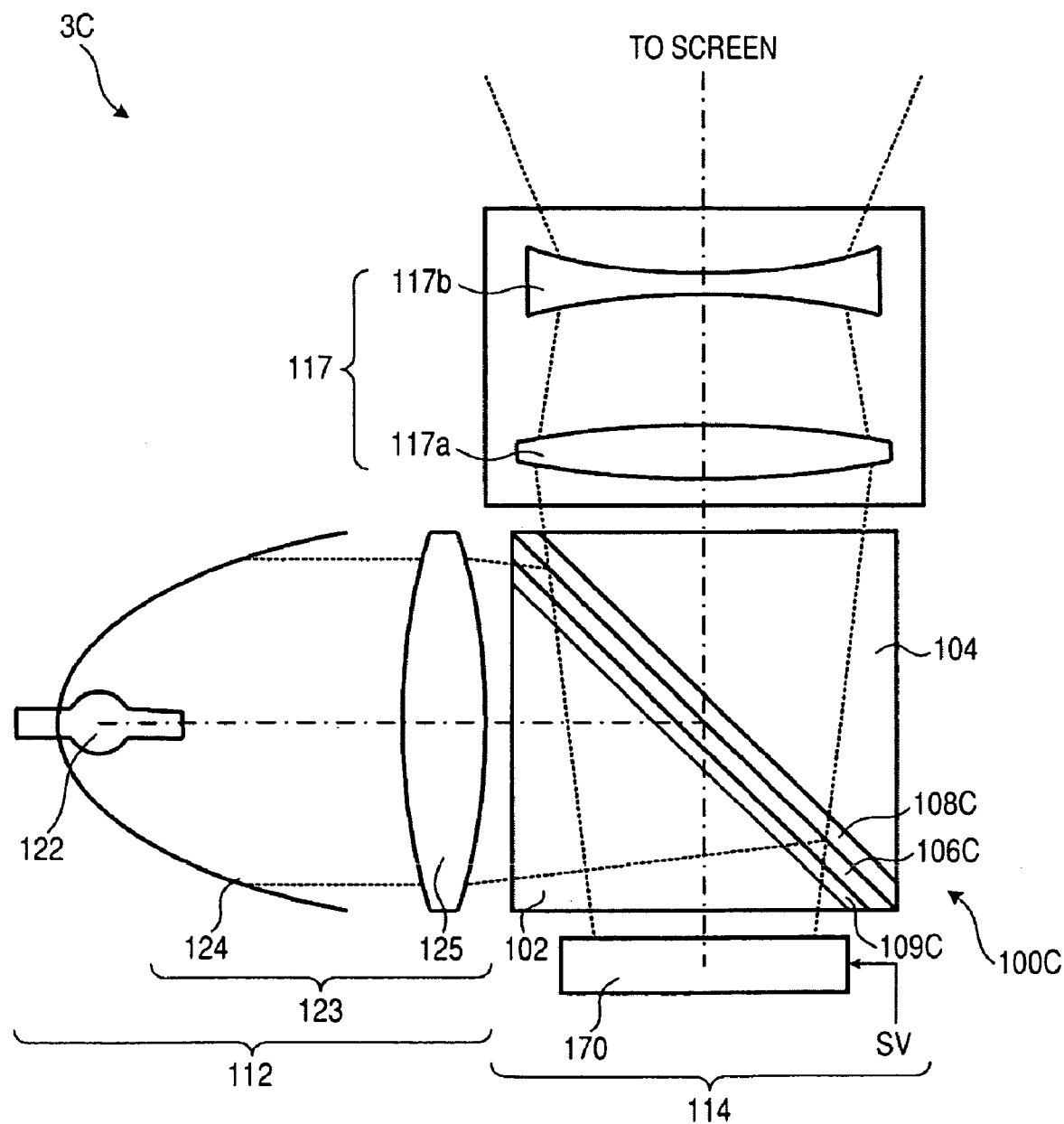
FIG. 20 is a diagram illustrating a projector unit (a projection optical system) having a basic configuration employing the polarizing beam splitter according to the third embodiment of the invention.

FIG. 20 is a diagram illustrating a projector unit 3C (projection optical system) having a basic configuration employing the polarizing beam splitter 100C according to the third embodiment. In this basic configuration, the S polarization component is input to the reflective liquid crystal panel 170, similarly to the basic configuration according to the first embodiment shown in FIG. 8. In the configuration, the polarizing beam splitter 3A_1 having the configuration shown in FIG. 8 is replaced with the polarizing beam splitter 100C according to the third embodiment. Here, detailed description thereof is omitted.

In this basic configuration, the panel-output beam (P polarization component) spatially modulated on the basis of the image information SV and output from the reflective liquid crystal panel 170 is an optical image corresponding to the image signal SV and is input again to the polarizing beam splitter 100C. At this time, the P polarization component of which the vibration direction is rotated by the reflective liquid crystal panel 170 is input to the glass prism 102, is input to and transmitted by the third parallel flat layer 109C as the protective layer of the first parallel flat layer 106C, is input to and transmitted by the first parallel flat layer 106C, is input to and transmitted by the second parallel flat layer 108C, and is then input to the glass prism 104. Then, the P polarization component input to the glass prism 104 is transmitted thereby and is output from the output surface (side surface 104b). Thereafter, the optical image formed with the change in polarization of the beam by the reflective liquid crystal panel 170 is enlarged and projected onto the screen not shown by the projection lens 117.

Here, while the panel-output beam output from the reflective liquid crystal panel 170 is input to the polarizing beam splitter 100C and is projected to a desired position on the screen by the projection lens 117, the astigmatism As_109C occurs in the third parallel flat layer 109C, the astigmatism As_106C occurs in the first parallel flat layer 106C, and the astigmatism As_108C (=As2) occurs in the second parallel flat layer 108C. However, the optical constants of the polarizing beam splitter 100C are set as shown in FIG. 18, the positive astigmatism As1 of 24.8 µm occurs due to the first parallel flat layer 106C and the third parallel flat layer 109C, but the negative astigmatism As_108C (=As2) of −27.9 µm occurs due to the second parallel flat layer 108C. Accordingly, both are almost cancelled and the total astigmatism As (=|As1+As2|) is 3.1 µm, which is satisfactorily small.

For example, when the F number of the projection lens 117 used in the projector unit 3C according to the third embodiment (basic configuration) is 2.0 and the pixel pitch of the reflective liquid crystal panel 170 is 5.4 µm, the depth of focus Fδ is 10.8 µm and a half Fδ/2 of the depth of focus Fδ is 5.4 µm. The absolute values of the resultant astigmatism As1 occurring due to the third parallel flat layer 109C and the first parallel flat layer 106C and the astigmatism As2 occurring due to the second parallel flat layer 108C are greater than the half Fδ/2=5.4 µm of the depth of focus Fδ. Accordingly, the astigmatism As1 (=As_106C+As_109C) of 24.8 µm occurs using only the third parallel flat layer 109C and the first parallel flat layer 106C, thereby not obtaining the desired resolution.

On the contrary, by providing the second parallel flat layer 108C correcting the astigmatism As1 due to the third parallel flat layer 109C and the first parallel flat layer 106C, the total astigmatism As (=|As1+As2|) As is 3.1 µm. The absolute value (=|As1+As2|) of the resultant astigmatism of both astigmatism As1 and As2 is equal to or less than the depth of focus Fδ (=10.8 µm) as the first reference allowable astigmatism value As0_1, is also equal to or less than the half Fδ/2 (=5.4 µm) of the depth of focus Fδ as the second reference allowable astigmatism value As0_2, and is much less than the allowable astigmatism value As0, thereby obtaining a desired resolution.

However, since the contrast is badly influenced depending on the arrangement of the second parallel flat layer 108C, it should be noted whether the second parallel flat layer 108C is disposed in the front of or in the back of the first parallel flat layer 106C.

For example, in the projector unit 3C according to the third embodiment shown in FIG. 20, the second parallel flat layer 108C is disposed after the first parallel flat layer 106C selectively reflecting the S polarization component and transmitting the P polarization component in a path of the light beam (optical path) from the light source 122. Accordingly, the bad influence of the second parallel flat layer 108C on contrast is hardly made in the projector unit 3C according to the third embodiment.

Here, although it has been described that the parallel flat layers disposed as the parallel flat layers other than the first parallel flat layer 106C or the second parallel flat layer 108C between the glass prisms 102 and 104 are only the third parallel flat layer 109C serving as the UV protective film of the first parallel flat layer 106C, that is, that three parallel flat layers are disposed between the glass prisms 102 and 104 as a whole, the invention is not limited to three layers.

When n layers are used and in relations between the second parallel flat layer 108C having a function of correcting the astigmatism and the other parallel flat layers including the first parallel flat layer 106C, the absolute values of the resultant astigmatism As1 occurring due to the first parallel flat layer 106C and the other parallel flat layers (excluding the second parallel flat layer 108C) and the astigmatism As2 occurring due to the second parallel flat layer 108C are both greater than the allowable astigmatism value As0 (Fδ or Fδ/2), the total astigmatism As which is the absolute value (=|As1+As2|) of the resultant astigmatism of both astigmatism As1 and As2 can be satisfactorily reduced by setting the optical constants so that both astigmatism As1 and As2 has the opposite signs and substantially the same magnitude.

Here, when the projector unit 3C is constructed so that the S polarization component from the light source 122 is input to the reflective liquid crystal panel 170 and an optical image having the P polarization component spatially modulated on the basis of the image signal SV is enlarged and projected onto the screen by the use of the projection lens 117, it is preferable that the total astigmatism As is less than the first reference allowable astigmatism value As0_1 (Fδ in this example). It is more preferable that the total astigmatism As is less than the second reference allowable astigmatism value As0_2 (Fδ/2 in this example).

In this case, paying attention to the function of correcting the resultant astigmatism As1 due to the other parallel flat layers (including the first parallel flat layer 106C) other than the second parallel flat layer 108C by the use of the second parallel flat layer 108C, since the P polarization component from the reflective liquid crystal panel 170 passes through all the parallel flat layers, the other parallel flat layers other than the first parallel flat layer 106C and the second parallel flat layer 108C may be disposed in the front of the first parallel flat layer 106C or in the back of the second parallel flat layer 108C. This point is different from the configuration in which the arrangement position of the parallel flat layer to be corrected is regulated when the S polarization component spatially modulated on the basis of the image signal SV by the use of the reflective liquid crystal panel 170 is reflected.

An example of the parallel flat layers other than the first parallel flat layer 106C and the second parallel flat layer 108C can include an adhesive layer for bonding the first parallel flat layer 106C to the glass prism 102 and a multi-layered film for reflecting only a light beam of a certain wavelength band, in addition to the third parallel flat layer 109C for protecting the first parallel flat layer 106C from UV.

The same appearing function as the second parallel flat layer 108C may be exhibited depending on the refractive indexes of the parallel flat layers. That is, it may have the same sign of refractive index as the second parallel flat layer 108C relative to the refractive index Np of the glass prisms 102 and 104 (whether greater or smaller than Np). However, this layer is not included in the second parallel flat layer according to the embodiments of the invention having the function of correcting the astigmatism As1 due to the first parallel flat layer 106C having the polarization separating function.

Although not shown, in some points of view, similarly to the projector unit 3A_2 having the modified configuration of the first embodiment, a light beam having the P polarization component from the light source 122 may be input to the reflective liquid crystal panel 170 using the polarizing beam splitter 100C according to the third embodiment and an optical image having the S polarization component spatially modulated on the basis of the image signal SV may be enlarged and projected onto the screen by the use of the projection lens 117.

Fourth Embodiment

Figure 21:
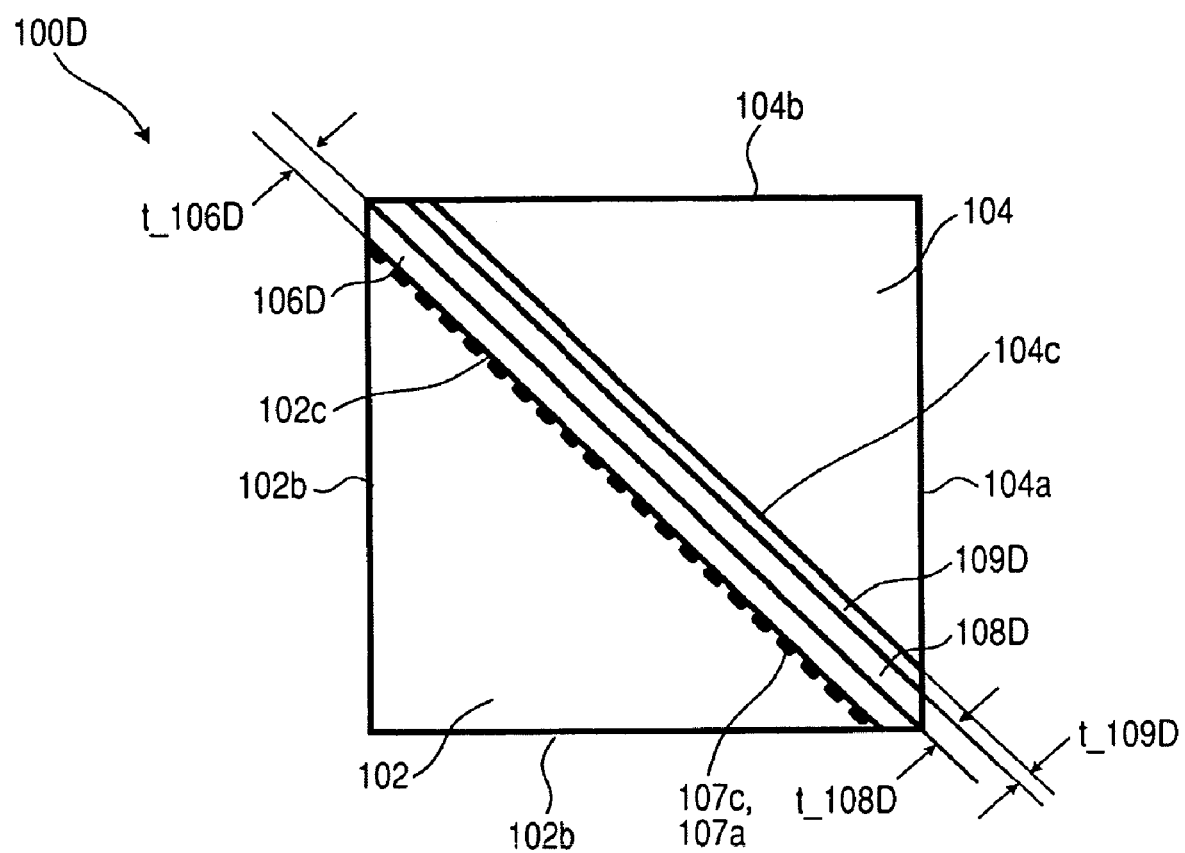
FIG. 21 is a sectional view illustrating a polarizing beam splitter according to a fourth embodiment of the invention in the x-y plane under the same condition as the arrangement shown in FIG. 5A.
Figure 22A:
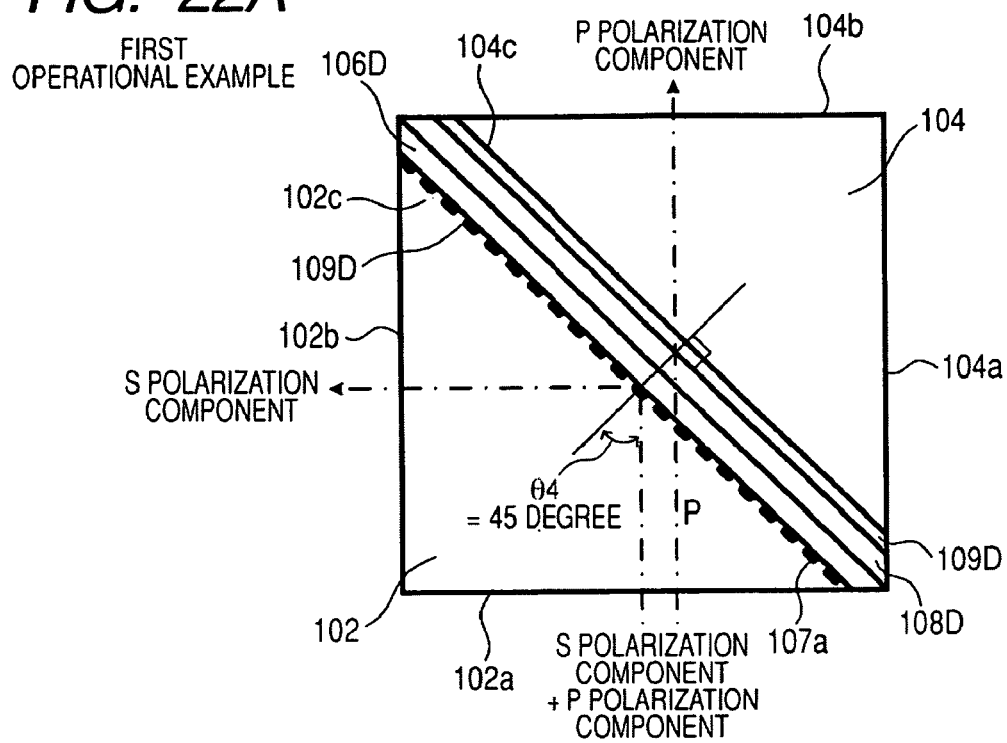
FIGS. 22A and 22B are diagrams illustrating an operation of the polarizing beam splitter according to the fourth embodiment of the invention.
Figure 22B:
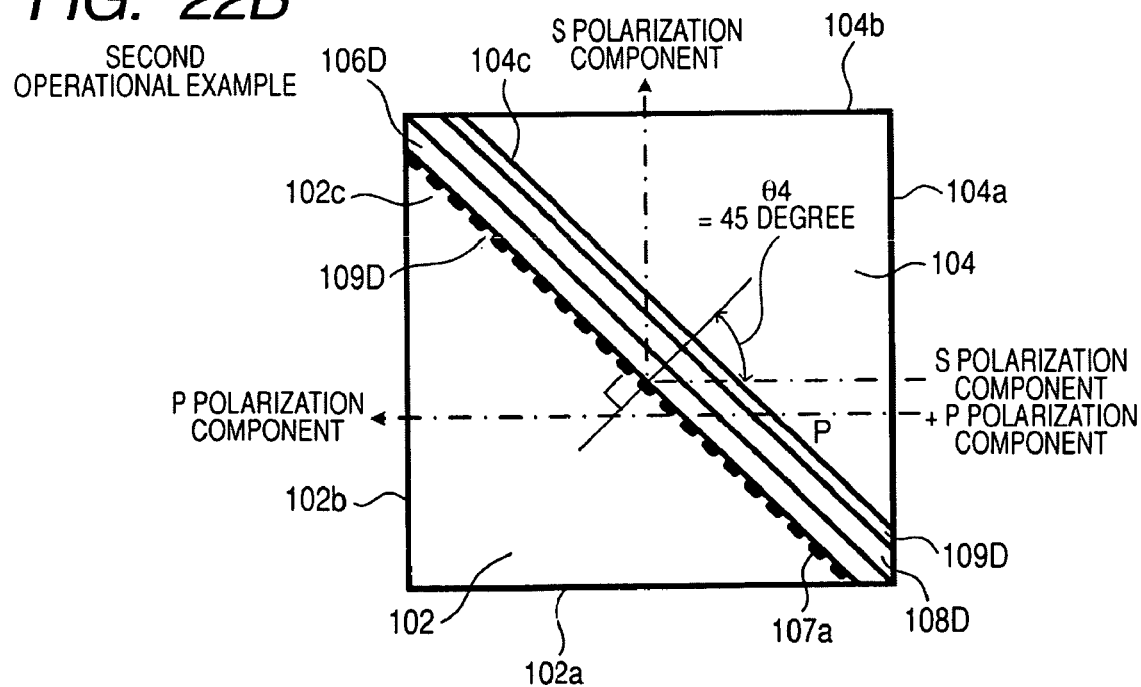
Figures 23, 24:
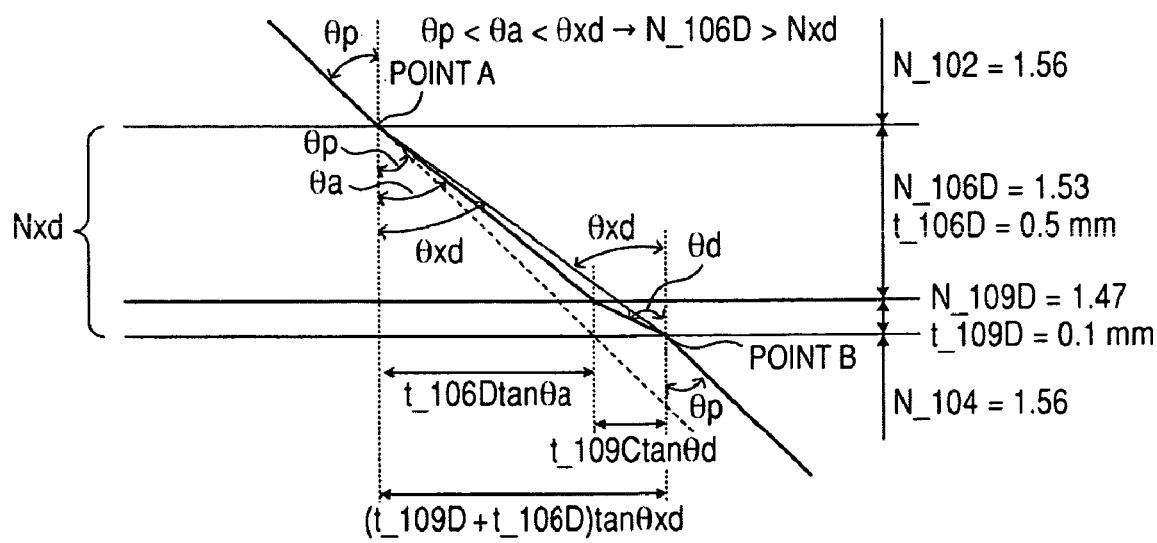
FIG. 23 is a table showing optical constants of the polarizing beam splitter according to the fourth embodiment of the invention.
FIG. 24 is a diagram illustrating the resultant refractive index of parallel flat layers of a polarizing beam splitter not employing the fourth embodiment of the invention.

FIGS. 21 to 24 are diagrams illustrating a basic configuration of a polarizing beam splitter according to a fourth embodiment of the invention. Here, FIG. 21 is a sectional view illustrating the polarizing beam splitter 100D according to the fourth embodiment in the x-y plane under the same condition as the arrangement shown in FIG. 5A. FIGS. 22A and 22B are diagrams illustrating an operation of the polarizing beam splitter 100D according to the fourth embodiment. FIG. 23 is a table illustrating optical constants of the polarizing beam splitter 100D according to the fourth embodiment. FIG. 24 is a diagram illustrating the resultant refractive index of parallel flat layers of a polarizing beam splitter 100Dx to which the fourth embodiment is not applied.

In the fourth embodiment, a parallel flat layer (referred to as a third parallel flat layer) other than the first parallel flat layer or the second parallel flat layer is interposed between the glass prisms 102 and 104. The fourth embodiment is different from the above-mentioned third embodiment, in that when the astigmatism As1 occurring in a first parallel flat layer 106D and a relatively-thick adhesive layer (a third parallel flat layer 109D) interposed between the glass prisms 102 and 104 does not satisfy the allowable astigmatism value As0, a second parallel flat layer 108D having a function of correcting the astigmatism As1 is provided.

In this case, similarly to the third embodiment, the optical constants of the second parallel flat layer 108D are set so that the second parallel flat layer 108D corrects the resultant astigmatism As1 occurring due to the first parallel flat layer 106D and the third parallel flat layer 109D.

As shown in of FIG. 21, the polarizing beam splitter 100D according to the fourth embodiment includes triangular glass prisms 102 and 104 using glass having substantially the same refractive index as a base material and three parallel flat layers 106D, 108D, and 109D disposed between the opposed surfaces of the glass prisms 102 and 104.

The first parallel flat layer 106D is formed of a wire-grid polarization separating element having a structure in which metallic grids 107c are formed on a glass substrate 107b, that is, the first parallel flat layer 106D, having a certain thickness t_106D to form a metallic grid structure surface 107a.

The second parallel flat layer 108D is formed of a glass substrate having a certain thickness t_108D. The third parallel flat layer 109D is an adhesive layer for boding and fixing the second parallel flat layer 108D to the glass prism 104 and has a meaningful thickness t_109D.

That is, the configuration of the polarizing beam splitter 100D according to the fourth embodiment shown in FIG. 21 is an embodiment where an adhesive layer is used as the third parallel flat layer 109D when the adhesive layer for bonding and fixing the second parallel flat layer 108D to the glass prism 104 has a meaningful thickness t_109D.

The optical constants of the second parallel flat layer 108D are set to be suitable for the optical constants of the first parallel flat layer 106D and the third parallel flat layer 109D so as to have a function of correcting the astigmatism As1 due to the first parallel flat layer 106D having the polarization separating function and the third parallel flat layer 109D (details of which are described later).

Three parallel flat layers 106D, 108D, and 109D are disposed substantially in parallel between the triangular glass prisms 102 and 104 in the same order of the polarizing beam splitter 100B according to the second embodiment. This embodiment is similar to the second embodiment, except that the adhesive layer for bonding and fixing the second parallel flat layer 108D to the glass prism 104 and is clearly called the third parallel flat layer 109D. Detailed description thereof is omitted.

The basic operation of the polarizing beam splitter 100D according to the fourth embodiment in which three parallel flat layers 106D, 108D, and 109D are disposed between the glass prisms 102 and 104 is as follows. The first operational example is the same as shown in FIG. 12A according to the second embodiment, as shown in FIG. 22A. The detailed description of the operation is omitted.

In the second operational example, as shown in FIG. 22B, a light beam is input to the input surface (side surface 104a) of the glass prism 104. The input beam has the P polarization component and the S polarization component. The parallel flat layers 106D, 108D, and 109D are tilted by θ4 (=θp: for example, 45±15 degree) about the light beam input to the glass prism 102.

The input beam is input to the input surface (side surface 104a in the drawing) of the glass prism 104, is input to and transmitted by the third parallel flat layer 109D, and is input to and transmitted by the second parallel flat layer 108D, and is then input to the first parallel flat layer 106D. Here, the beam input to the first parallel flat layer 106D is transmitted by the glass substrate 107b and is input to the metallic grid structure surface 107a. The S polarization component is reflected and the P polarization component is transmitted by the metallic grid structure surface 107a. Thereafter, the S polarization component is output from the glass substrate 107b of the first parallel flat layer 106D, is input again to second parallel flat layer 108D, is transmitted by the second parallel flat layer 108D, is input to the third parallel flat layer 109D, is transmitted by the third parallel flat layer 109D, is input to the glass prism 104, and is output from the output surface (side surface 104b in the drawing). On the other hand, the P polarization component is input to and transmitted by the glass prism 102 and is output from the output surface (side surface 102b in the drawing).

Here, the optical constants of the optical members 102, 104, 106D, 108D, and 109D of the polarizing beam splitter 100D according to the fourth embodiment are set as shown in the table of FIG. 23 so as to correct the astigmatism As1 due to the first parallel flat layer 106D having the polarization separating function and the third parallel flat layer 109D (adhesive layer) for bonding the second parallel flat layer 108D to the glass prism 104 by the use of the second parallel flat layer 108D, where the refractive index N_102 of the glass prism 102 and the refractive index N_104 of the glass prism 104 are equally the refractive index Np1 (=Np), the refractive index and the thickness of the first parallel flat layer 106D are N_106D and t_106D, respectively, the refractive index and the thickness of the second parallel flat layer 108D are N_108D and t_108D, respectively, and the refractive index and the thickness of the third parallel flat layer 109D are N_109D and t_109D, respectively.

Here, when the resultant refractive index of the parallel flat layers (the first parallel flat layer 106D and the third parallel flat layer 109D) disposed between the opposed surfaces of the glass prisms 102 and 104 not employing the second parallel flat layer 108D according to this embodiment is Nxd and the resultant incidence angle or emission angle is θxd, the rough value of the refractive index Nxd can be seen from the geometric optical relation shown in FIG. 24. That is, paying attention to point A in the drawing where a light beam is input from the glass prism 102 to the first parallel flat layer 106D, N_106D>Nxd can be seen from θp<θa<θxd. Paying attention to point B in the drawing where a light beam is output from the third parallel flat layer 109D to the glass prism 104, N_109D<Nxd can be seen from θd>θxd. That is, finally, N_109D<Nxd<N_106D can be seen, thereby obtaining the relation 1.47<Nxc<1.53.

This can be analyzed using Expression 4. Nxd=1.5196 is obtained from the expression. Accordingly, N_109D<Nxd<N_106D can be seen. However, since the value of Nxc is minutely changed with a variation in θp, θp is calculated as an open angle of the input beam derived from the F number of the projection lens (2/F=tan θp). Specifically, the angle θp calculated from F=2.5 is θp=11.31 from tan θp=1/2.5/2.

$$\left. \begin{array}{l} (t\_109D + t\_106D)\tan\theta xd = t\_106D\tan\theta a + t\_109D\tan\theta d \\ Nxd\sin\theta xd = N\_102\sin\theta p \\ N\_106D\sin\theta a = N\_102\sin\theta p \\ N\_109D\sin\theta d = N\_104\sin\theta p \\ N\_102 = N\_104 \end{array} \right\} \quad (4)$$

Accordingly, since the difference in refractive index (Nxd−N_102)=(Na−Np) between the resultant refractive index Nxd of the first parallel flat layer 106D and the third parallel flat layer 109D and the refractive index of the glass prism 102 is negative and the difference in refractive index (N_108D−N_104)=(Nb−Np) between the second parallel flat layer 108D and the glass prism 104 is positive, the product (Na−Np)×(Nb−Np) thereof is negative (<0).

In the optical constants shown in FIG. 23, from Expression 1, the astigmatism As_106D due to the first parallel flat layer 106D is 19.4 μm, the astigmatism As_108D (=As2) due to the second parallel flat layer 108D is −35.8 μm, the astigmatism As_109D due to the third parallel flat layer 109D is 14.9 μm, and the resultant astigmatism As1 of the astigmatism As_106D due to the first parallel flat layer 106D and the astigmatism As_109D due to the third parallel flat layer 109D is 34.3 μm, which is a meaningful magnitude. However, both astigmatism As1 (=As_106D+As_109D) and As2 (=As_108D) has the opposite signs and substantially the same magnitude. Accordingly, the absolute value As (=|As1+As2|) of the resultant astigmatism of both astigmatism As1 and As2 as the total astigmatism As is 1.5 μm and it is expected to be much smaller than the allowable astigmatism value As0.

Figure 25:
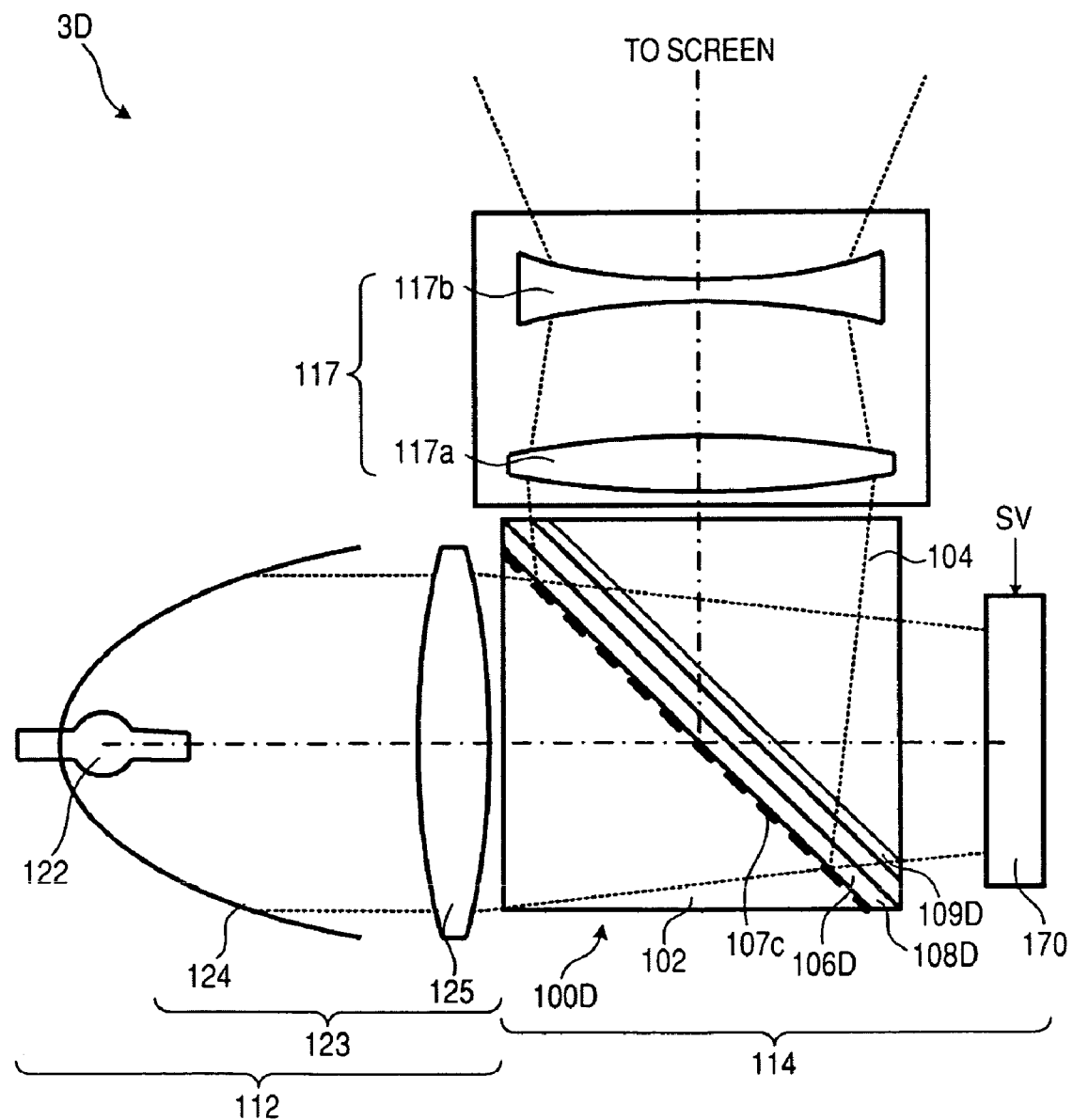
FIG. 25 is a diagram illustrating a projector unit having a basic configuration employing the polarizing beam splitter according to the fourth embodiment of the invention.

FIG. 25 is a diagram illustrating a projector unit 3D (projection optical system) having a basic configuration employing the polarizing beam splitter 100D according to the fourth embodiment. In this basic configuration, the P polarization component is input to the reflective liquid crystal panel 170, similarly to the basic configuration according to the second embodiment shown in FIG. 14. In the configuration, the polarizing beam splitter 3B_1 having the configuration shown in FIG. 14 is replaced with the polarizing beam splitter 100D according to the fourth embodiment. Here, detailed description thereof is omitted.

In this basic configuration, the panel-output beam (S polarization component) spatially modulated on the basis of the image information SV and output from the reflective liquid crystal panel 170 is an optical image corresponding to the image signal SV and is input again to the polarizing beam splitter 100D. At this time, the S polarization component of which the vibration direction is rotated by the reflective liquid crystal panel 170 is input to the glass prism 104, is input to and transmitted by the third parallel flat layer 109D, is input to and transmitted by the second parallel flat layer 108D, and is then input to the first parallel flat layer 106D.

Since the first parallel flat layer 106D is formed of a wire-grid polarization separating element having a structure in which the metallic grids 107c are formed on the glass substrate 107b, the S polarization component input to the glass substrate 107b is reflected by the metallic grid structure surface 107a, is output from the glass substrate 107b, is input to and transmitted again by the second parallel flat layer 108D, is input to and transmitted by the third parallel flat layer 109D, and is then input to the glass prism 104. The S polarization component input to the glass prism 104 is transmitted thereby and is output from the output surface (side surface 104b). Thereafter, the optical image formed with the change in polarization of the beam by the reflective liquid crystal panel 170 is enlarged and projected onto the screen not shown by the projection lens 117.

Here, while the panel-output beam output from the reflective liquid crystal panel 170 is input to the polarizing beam splitter 100D and is projected to a desired position on the screen by the projection lens 117, the astigmatism As_109D occurs in the third parallel flat layer 109D, the astigmatism As_108D (=As2) occurs in the second parallel flat layer 108D, and the astigmatism As_106D occurs in the first parallel flat layer 106D (particularly the glass substrate 107b). Since only the S polarization component is selectively reflected by the first parallel flat layer 106D, the astigmatism As_106D occurs in the first parallel flat layer 106D (particularly, the glass substrate 107b), the astigmatism As_108D (=As2) occurs in the second parallel flat layer 108D, and the astigmatism As_109D occurs in the third parallel flat layer 109D.

However, the optical constants of the polarizing beam splitter 100D are set as shown in FIG. 23, the positive astigmatism As1 of 34.3 μm occurs due to the third parallel flat layer 109D and the first parallel flat layer 106D, but the negative astigmatism As2 of −35.8 μm occurs due to the second parallel flat layer 108D. Accordingly, both are almost cancelled. Regarding the S polarization component selectively reflected by the first parallel flat layer 106D, the positive astigmatism As1 of 34.3 µm occurs due to the third parallel flat layer 109D and the first parallel flat layer 106D, but the negative astigmatism As2 of −35.8 µm occurs due to the second parallel flat layer 108D. Accordingly, both are almost cancelled and the total astigmatism As (=|2×As1+2×As2|) is satisfactorily small. That is, since the resultant astigmatism occurring due to the two times transmission of the light beam by the first parallel flat layer 106D and the third parallel flat layer 109D is 2×As1=34.3 µm and the resultant astigmatism occurring due to the two times transmission of the light beam by the second parallel flat layer 108D is 2×As2=−35.8 µm, both are almost cancelled.

For example, when the F number of the projection lens 117 used in the projector unit 3D according to the fourth embodiment (basic configuration) is 2.5 and the pixel pitch of the reflective liquid crystal panel 170 is 7 µm, the depth of focus Fδ is 17.5 µm, a half of the depth of focus Fδ is Fδ/2=8.75 µm, and a quarter of the depth of focus Fδ is Fδ/4=4.38 µm. The absolute values of both astigmatism As1 and As2 are greater than the half Fδ/2 or the quarter Fδ/4 of the depth of focus Fδ. Accordingly, the astigmatism As1 (As_106D+As_109D) of 68.6 µm occurs using only the first parallel flat layer 106D and the third parallel flat layer 109D, thereby not obtaining the desired resolution. On the contrary, by providing the second parallel flat layer 108D correcting the astigmatism As1 due to the first parallel flat layer 106D and the third parallel flat layer 109D, the total astigmatism As (=|2×As1+2×As2|) is 3.0 µm. The total astigmatism As (=|2×As1+2×As2|) is equal to or less than the half Fδ/2 (=8.75 µm) of the depth of focus Fδ as the first reference allowable astigmatism value As0_1, is also equal to or less than the quarter Fδ/4 (=4.38 µm) of the depth of focus Fδ as the second reference allowable astigmatism value As0_2, and is much less than the allowable astigmatism value As0, thereby obtaining the desired resolution.

Here, although it has been described that the parallel flat layers disposed as the parallel flat layers other than the first parallel flat layer 106D or the second parallel flat layer 108D between the glass prisms 102 and 104 are only the third parallel flat layer 109D serving as the adhesive layer for bonding and fixing to the glass prism 104, that is, that three parallel flat layers are disposed between the glass prisms 102 and 104 as a whole, the invention is not limited to three layers.

When n layers are used and in relations between the second parallel flat layer 108D having a function of correcting the astigmatism and the other parallel flat layers including the first parallel flat layer 106D, the absolute values of the resultant astigmatism As1 occurring due to the first parallel flat layer 106D and the other parallel flat layers all (excluding the second parallel flat layer 108D) and the astigmatism As2 occurring due to the second parallel flat layer 108D are both greater than the allowable astigmatism value As0 (Fδ or Fδ/2), the total astigmatism As which is the absolute value (=|As1+As2|) of the resultant astigmatism of both astigmatism As1 and As2 can be satisfactorily reduced by setting the optical constants so that both astigmatism As1 and As2 has the opposite signs and substantially the same magnitude.

Here, when the projector unit 3D is constructed so that the light beam having the P polarization component from the light source 122 is input to the reflective liquid crystal panel 170 and an optical image having the S polarization component spatially modulated on the basis of the image signal SV is enlarged and projected onto the screen by the use of the projection lens 117, it is preferable that the total astigmatism As is less than the first reference allowable astigmatism value As0_1 (Fδ/2 in this example). It is more preferable that the total astigmatism As is less than the second reference allowable astigmatism value As0_2 (Fδ/4 in this example).

In this case, paying attention to the function of correcting the resultant astigmatism As1 due to the other parallel flat layers (including the first parallel flat layer 106D) other than the second parallel flat layer 108D by the use of the second parallel flat layer 108D, it should be considered that only the parallel flat layers through which the S polarization component from the reflective liquid crystal panel 170 passes until it is input to the polarizing beam splitter 100D, is reflected by the first parallel flat layer 106D, and is input to the projection lens 117 are to be corrected. Specifically, among the parallel flat layers other than the first parallel flat layer 106D and the second parallel flat layer 108D, only the parallel flat layers disposed closer to the reflective liquid crystal panel 170 than the first parallel flat layer 106D can be corrected. That is, the parallel flat layers (including members up to the reflecting surface of the first parallel flat layer 106D) other than the second parallel flat layer 108D between the reflective liquid crystal panel 170 and the first parallel flat layer 106D of the polarizing beam splitter 100D are the parallel flat layers to be corrected.

An example of the parallel flat layers other than the first parallel flat layer 106D and the second parallel flat layer 108D can include a UV absorbing plate for cutting the UV harmful to the reflective liquid crystal panel 170 and emitted from the light source 122, in addition to the third parallel flat layer 109D as the adhesive layer for bonding the second parallel flat layer 108D to the glass prism 104.

Although not shown, in some points of view, similarly to the projector unit 3B_2 having the modified configuration of the second embodiment, a light beam having the P polarization component from the light source 122 may be input to the reflective liquid crystal panel 170 using the polarizing beam splitter 100D according to the fourth embodiment and an optical image having the S polarization component spatially modulated on the basis of the image signal SV may be enlarged and projected onto the screen by the use of the projection lens 117.

Fifth Embodiment

Figure 26:
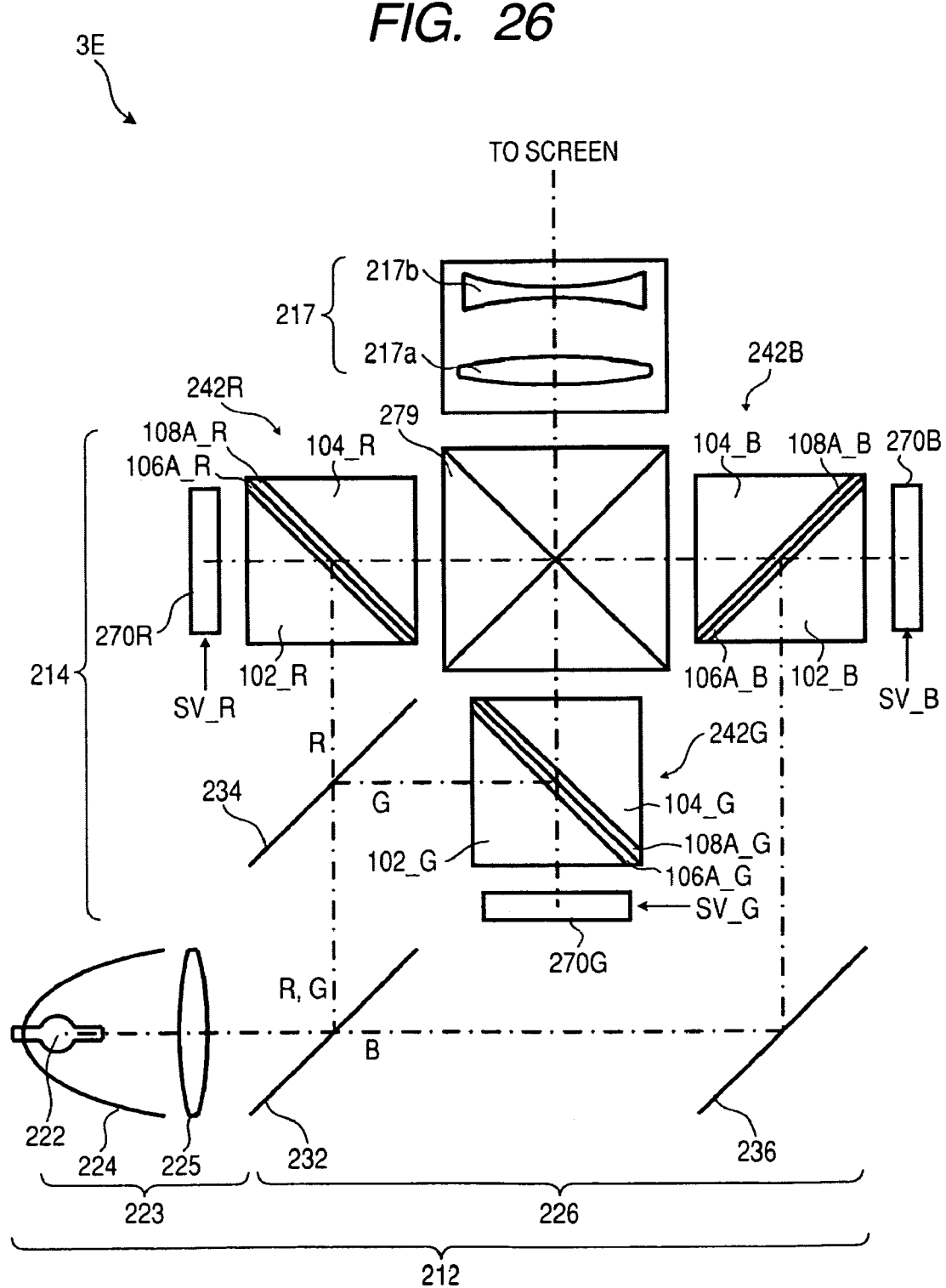
FIG. 26 is a diagram schematically illustrating a projector unit according to a fifth embodiment of the invention.

FIGS. 26 and 27C are diagrams illustrating a projector unit according to a fifth embodiment of the invention to cope with a full color display. Here, FIG. 26 is a diagram schematically illustrating the configuration of the projector unit 3E according to the fifth embodiment. FIGS. 27A to 27C are tables illustrating optical constants of color polarizing beam splitters 242 used in the projector unit 3E according to the fifth embodiment.

In the following description, when members or elements are distinguished by colors, lowercase letters of color identifiers R, G, and B are added to the back of "_". When they are not distinguished by colors, the identifiers are omitted. The same is true in a sixth embodiment to be described later.

The projector unit 3E according to the fifth embodiment includes a projection optical system having three polarizing beam splitters 242 and three reflective liquid crystal panels 270 to correspond to the colors of R (Red), G (Green), and B (Blue). That is, monochromic reflective liquid crystal panels 270R, 270G, and 270B for three colors of R, G, and B are disposed in optical paths of R, G, and B, respectively, thereby constructing a 3-plate color display.

This embodiment is different from the sixth embodiment to be described later, similarly to the projector unit 3A_1 or 3C according to the first embodiment or the third embodiment, in that a light beam having the S polarization component from the light source is input to the reflective liquid crystal panel 270 and an optical image having the P polarization component spatially modulated on the basis of the image signal SV is enlarged and projected onto a screen by the projection lens 217.

The projector unit 3E includes a light emitting unit 212, an image forming unit 214, and a projection lens 217. Relating to the projector units 3A to 3D according to the first to fourth embodiments, the light emitting unit 212 corresponds to the light emitting unit 112, the image forming unit 214 corresponds to the image forming unit 114, and the projection lens 217 corresponds to the projection lens 117.

The image forming unit 214 includes color polarizing beam splitters 242R, 242G, and 242B, three reflective liquid crystal panels 270 (270R, 270G, and 270B) displaying three-color image information of red (R), green (G), and blue (B), and a cross dichroic prism (color synthesizing prism) 279 synthesizing light beams reflected by the reflective liquid crystal panels 270 and spatially modulated on the basis of the three-color image information to generate an image-projecting beam. The reflective liquid crystal panels 270R, 270G, and 270B are supplied with color image signals SV_R, SV_G, and SV_B. The polarizing beam splitters 242R, 242G, and 242B, the three reflective liquid crystal panels 270R, 270G, and 270B, and the cross dichroic prism 279 are monolithically coupled to each other.

The polarizing beam splitters 242R, 242G, and 242B have a function of reflecting or transmitting a light beam depending on the polarization direction of the light beam, have a polarizing film having a certain thickness formed on a main part, and have the same structure as the polarizing beam splitter 100A according to the first embodiment in which the first parallel flat layer 106A serving as the polarization separating element as a whole and the second parallel flat layer 108A correcting the astigmatism As1 occurring in the first parallel flat layer 106A are interposed between the opposed surfaces of the glass prisms 102 and 104.

However, although details are described later, first parallel flat layers 106A_R, 106A_G, and 106A_B and second parallel flat layers 108A_R, 108A_G, and 108A_B are provided to correspond to three colors, thereby optimizing the optical constants thereof. The optimization by colors is performed because the dependency of refractive index on wavelength (is different in R, G, and B) exists in the same material (base material).

The light emitting unit 212 emits three-color light beams of red (R), green (G), and blue (B) to the image forming unit 214. The image forming unit 214 modulates the three-color light beams on the basis of the image information corresponding to three colors and synthesizes the modulated light beams into a single image-projecting beam. The image-projecting beam is enlarged and projected onto the screen not shown by the projection lens 217, where a color image is projected.

The light emitting unit 212 includes a light source 222 emitting a white light beam, a light-emitting optical system 223, and a color-separating optical system 226. The light-emitting optical system 223 includes a reflecting mirror 224 and a lens group 225 including a concave lens, a UV cut filter, and a condenser lens disposed in a straight line in the front of the light source 222. The white light beam from the light source 222 is input to the color-separating optical system 226 through the lens group 225. The color-separating optical system 226 separates the light beam (white beam) guided by the light-emitting optical system 223 into three-color light beams of red (R), green (G), and blue (B).

The color-separating optical system 226 includes, for example, color-separating dichroic mirrors 232 and 234 and a reflecting mirror 236. For example, the dichroic mirror 232 transmits the blue (B) beam and reflects the red (R) and green (G) beams. Accordingly, the light beam guided to the dichroic mirror 232 from the light-emitting optical system 223 is separated into two light beams of the red (R) and green (G) beam and the blue (B) beam by the dichroic mirror 232.

The dichroic mirror 234 transmits the red (R) beam and reflects the green (G) beam. Accordingly, the red (R) and green (G) beam separated by the dichroic mirror 232 is guided to the dichroic mirror 234 and the red (R) beam is transmitted and the green (G) beam is reflected by the dichroic mirror 234.

The color beams obtained by separating the light beam into three primary colors of R, G, and B by the use of the dichroic mirrors 232 and 234 of the color-separating optical system 226 are input to the color beam splitters 242R, 242G, and 242B. The B beam is reflected by the reflecting mirror 236 and is then input to the polarizing beam splitter 242B.

The color beams obtained by separating the light beam into three primary colors of R, G, and B by the use of the dichroic mirrors 232 and 234 are input to the polarizing beam splitters 242R, 242G, and 242B, respectively. In the fifth embodiment, the reflective liquid crystal panels 270R, 270G, and 270B are disposed at positions of the polarizing beam splitters 242R, 242G, and 242B at which the S polarized beams are input to the first parallel flat layers 106A.

As shown in FIG. 26, the white light beam emitted from the light emitting unit 212 to the image forming unit 214 is input to the dichroic mirror 232. The beam of a blue band (blue (B) beam) is transmitted and the beam of a yellow band (red (R) beam and green (G) beam) is reflected by the dichroic mirror 232. Hereinafter, the blue (B) beam is referred to as a B beam, the red (R) beam is referred to as a B beam, and the green (G) beam is referred to as a G beam.

The B beam (S polarization component) is reflected by the reflecting mirror 236 and is input to the polarizing beam splitter 242B. The polarizing beam splitter 242B selectively reflects the S polarization component at the first parallel flat layer 106A_B and transmits the P polarization component, as can be guessed from FIGS. 6A and 6B. The S polarization component is input to the reflective liquid crystal panel 270B.

The reflective liquid crystal panel 270B outputs an optical image corresponding to the image signal SV_B, which has been spatially modulated on the basis of the supplied image signal SV_B for the B color, has been converted into a second polarization component (P polarization component in this embodiment), and has been input to the reflective liquid crystal panel 270B. The panel-output beam spatially modulated on the basis of the image information SV_B and output from the reflective liquid crystal panel 270B is input again to the polarizing beam splitter 242B. At this time, the P polarization component of which the vibration direction is rotated by the reflective liquid crystal panel 270B is input to the glass prism 102_B, is input to and transmitted by the first parallel flat layer 106A_B, is input to and transmitted by the second parallel flat layer 108A_B, and is then input to the glass prism 104_B. The P polarization component input to the glass prism 104_B is transmitted thereby, is output from the output surface (side surface 104b), and is then input to the cross dichroic prism 279.

The R beam and the G beam reflected by the dichroic mirror 232 are input to the dichroic mirror 234, but the R beam is transmitted and the G beam is reflected by the dichroic mirror 234. The G beam reflected by the dichroic mirror 234 is input to the polarizing beam splitter 242G. The polarizing beam splitter 242G selectively reflects the S polarization component at the first parallel flat layer 106A_G and transmits the P polarization component, as can be guessed from FIGS. 6A and 6B. The S polarization component is input to the reflective liquid crystal panel 270G.

The reflective liquid crystal panel 270G outputs an optical image corresponding to the image signal SV_G, which has been spatially modulated on the basis of the supplied image signal SV_G for the G color, has been converted into a second polarization component (P polarization component in this embodiment), and has been input to the reflective liquid crystal panel 270G. The panel-output beam spatially modulated on the basis of the image information SV_G and output from the reflective liquid crystal panel 270G is input again to the polarizing beam splitter 242G. At this time, the P polarization component of which the vibration direction is rotated by the reflective liquid crystal panel 270G is input to the glass prism 102_G, is input to and transmitted by the first parallel flat layer 106A_G, is input to and transmitted by the second parallel flat layer 108A_G, and is then input to the glass prism 104_G. The P polarization component input to the glass prism 104_G is transmitted thereby, is output from the output surface (side surface 104b), and is then input to the cross dichroic prism 279.

The R beam transmitted by the dichroic mirror 234 is input to the polarizing beam splitter 242R. The polarizing beam splitter 242R selectively reflects the S polarization component at the first parallel flat layer 106A_R and transmits the P polarization component, as can be guessed from FIGS. 6A and 6B. The S polarization component is input to the reflective liquid crystal panel 270R.

The reflective liquid crystal panel 270R outputs an optical image corresponding to the image signal SV_R, which has been spatially modulated on the basis of the supplied image signal SV_R for the R color, has been converted into a second polarization component (P polarization component in this embodiment), and has been input to the reflective liquid crystal panel 270R. The panel-output beam spatially modulated on the basis of the image information SV_R and output from the reflective liquid crystal panel 270R is input again to the polarizing beam splitter 242R. At this time, the P polarization component of which the vibration direction is rotated by the reflective liquid crystal panel 270R is input to the glass prism 102_R, is input to and transmitted by the first parallel flat layer 106A_R, is input to and transmitted by the second parallel flat layer 108A_R, and is then input to the glass prism 104_R. The P polarization component input to the glass prism 104_R is transmitted thereby, is output from the output surface (side surface 104b), and is then input to the cross dichroic prism 279.

The three-color beams of R, G, and B guided to the cross dichroic prism 279 are synthesized into a single image-projecting beam by the cross dichroic prism 279 and the resultant beam is guided to the projection lens 217. Thereafter, a full-color optical image (color image) formed with a variation in color polarization in the reflective liquid crystal panels 270R, 270G, and 270B is enlarged and projected onto the screen not shown by the projection lens 217.

Although it has been described in this embodiment that three polarizing beam splitters 242R, 242G, and 242B, and three reflective liquid crystal panels 270R, 270G, and 270B, and the cross dichroic prism 279 constitute the image forming unit 214, the image forming unit 214 is not limited to this configuration, but may employ various known configurations.

Here, while the panel-output beam output from the reflective liquid crystal panel 270R is input to the polarizing beam splitter 242R and is projected to a desired position on the screen by the projection lens 217, the astigmatism As_106A_R (=As1) occurs in the first parallel flat layer 106A_R and the astigmatism As_108A_R (=As2) occurs in the second parallel flat layer 108A_R. Similarly, while the panel-output beam output from the reflective liquid crystal panel 270G is input to the polarizing beam splitter 242G and is projected to a desired position on the screen by the projection lens 217, the astigmatism As_106A_G (=As1) occurs in the first parallel flat layer 106A_G and the astigmatism As_108A_G (=As2) occurs in the second parallel flat layer 108A_G. Similarly, while the panel-output beam output from the reflective liquid crystal panel 270B is input to the polarizing beam splitter 242B and is projected to a desired position on the screen by the projection lens 217, the astigmatism As_106A_B (=As1) occurs in the first parallel flat layer 106A_B and the astigmatism As_108A_B (=As2) occurs in the second parallel flat layer 108A_B.

Here, the optical constants of the optical members 102, 104, 106A, and 108A of the polarizing beam splitters 242 used in the projector unit 3E according to the fifth embodiment are set so as to correct the astigmatism due to the first parallel flat layers 106A having the polarization separating function by the use of the second parallel flat layers 108A. For example, the R-color polarizing beam splitter 242R is set as shown in the table of FIG. 27A, where the refractive index N_102_R of the glass prism 102_R and the refractive index N_104_R of the glass prism 104_R are equally the refractive index Np1_R (=Np), the refractive index and the thickness of the first parallel flat layer 106A_R are N_106A_R (=Na) and t_106A_R (=ta), respectively, and the refractive index and the thickness of the second parallel flat layer 108A_R are N_108A_R (=Nb) and t_108A_R(=tb), respectively.

In the optical constant shown in FIG. 27A, the product of a difference in refractive index (N_106A_R−N_102_R)=(Na−Np) between the first parallel flat layer 106A_R and the glass prism 102_R and a difference in refractive index (N_108A_R−N_104_R)=(Nb−Np) between the second parallel flat layer 108A_R and the glass prism 104_R is (Na−Np)×(Nb−Np)=(1.56188−1.5871)×(1.61824−1.5871)=−0.000 78 5, which satisfies the condition of negative (<0).

Similarly, the G-color polarizing beam splitter 242G is set as shown in the table of FIG. 27B, where the refractive index N_102_G of the glass prism 102_G and the refractive index N_104_G of the glass prism 104_G are equally the refractive index Np1_G (=Np), the refractive index and the thickness of the first parallel flat layer 106A_G are N_106A_G (=Na) and t_106A_G (=ta), respectively, and the refractive index and the thickness of the second parallel flat layer 108A_G are N_108A_G (=Nb) and t_108A_G (=tb), respectively.

In the optical constant shown in FIG. 27B, the product of a difference in refractive index (N_106A_G−N_102_G)=(Na−Np) between the first parallel flat layer 106A_G and the glass prism 102_G and a difference in refractive index (N_108A_G−N_104_G)=(Nb−Np) between the second parallel flat layer 108A_G and the glass prism 104_G is (Na−Np)×(Nb−Np)=(1.56605−1.59142)×(1.62286−1.59142)=−0.000 798, which satisfies the condition of negative (<0).

Similarly, the B-color polarizing beam splitter 242B is set as shown in the table of FIG. 27C, where the refractive index N_102_B of the glass prism 102_B and the refractive index N_104_B of the glass prism 104_B are equally the refractive index Np1_B (=Np), the refractive index and the thickness of the first parallel flat layer 106A_B are N_106A_B (=Na) and t_106A_B (=ta), respectively, and the refractive index and the thickness of the second parallel flat layer 108A_B are N_108A_B (=Nb) and t_108A_B (=tb), respectively.

In the optical constant shown in FIG. 27C, the product of a difference in refractive index (N_106A_B−N_102_B)=(Na−Np) between the first parallel flat layer 106A_B and the glass prism 102_B and a difference in refractive index (N_108A_B−N_104_B)=(Nb−Np) between the second parallel flat layer 108A_B and the glass prism 104_B is (Na−Np)×(Nb−Np)=(1.57529−1.601)×(1.6331−1.601)=−0.0008253, which satisfies the condition of negative (<0).

Regarding the optical constants of the R-color polarizing beam splitter 242R shown in FIGS. 27A to 27C, from Expression (1), the astigmatism As_106A_R (=As1) due to the first parallel flat layer 106A_R is 18.6 μm and the astigmatism As_108A_R (=As2) due to the second parallel flat layer 108A_R is −18.9 μm, which are meaningful magnitudes. Similarly, in the G-color polarizing beam splitter 242G, the astigmatism As_106A_G (=As1) due to the first parallel flat layer 106A_G is 15.5 μm and the astigmatism As_108A_G (=As2) due to the second parallel flat layer 108A_G is −15.8 μm, which are meaningful magnitudes. Similarly, in the B-color polarizing beam splitter 242B, the astigmatism As_106A_B (=As1) due to the first parallel flat layer 106A_B is 12.4 μm and the astigmatism As_108A_B (=As2) due to the second parallel flat layer 108A_B is −12.7 μm, which are meaningful magnitudes.

On the other hand, since both astigmatism As_106A_R and As_108A_R, both astigmatism As_106A_G and As_108A_G, or both astigmatism As_106A_B and As_108A_B have the opposite signs and substantially the same magnitude, they are almost cancelled. Accordingly, the total astigmatism As (=|As1+As2|) is satisfactorily small and thus the amount of astigmatism occurring in the optical paths of red, green, and blue is suppressed. That is, the total astigmatism As which is the absolute value (=|As1+As2|) of the resultant astigmatism of both astigmatism As_106A_R and As_108A_R, both astigmatism As_106A_G and As_108A_G, or both astigmatism As_106A_B and As_108A_B is 0.3 μm for any color and it is expected to be much smaller than the allowable astigmatism value As0.

For example, when the F number of the projection lens 227 used in the projector unit 3E according to the fifth embodiment (basic configuration) is 2.0 and the pixel pitch of the reflective liquid crystal panels 270R, 270G, and 270B is 4.8 μm, the depth of focus Fδ is 9.6 μm and a half Fδ/2 of the depth of focus Fδ is 4.8 μm. The absolute values of both astigmatism As_106A_R and As_108A_R, both astigmatism As_106A_G and As_108A_G, or both astigmatism As_106A_B and As_108A_B are greater than the half Fδ/2 (=4.8 μm) of the depth of focus Fδ. Accordingly, the desired resolution is not obtained using only the first parallel flat layers 106A_R, 106A_G, and 106A_B. On the contrary, by providing the second parallel flat layers 108A_R, 108A_G, and 108A_B correcting the astigmatism As_106A_R, As_106A_G, and As_106A_B due to the first parallel flat layers 106A_R, 106A_G, and 106A_B, the total astigmatism As (=|As1+As2|) is 0.3 μm. The total astigmatism As is equal to or less than the depth of focus Fδ (=9.6 μm) as the first reference allowable astigmatism value As0_1, is also equal to or less than the half Fδ/2 (=4.8 μm) of the depth of focus Fδ as the second reference allowable astigmatism value As0_2, and is much less than the allowable astigmatism value As0, thereby obtaining a desired resolution.

Sixth Embodiment

Figure 28:
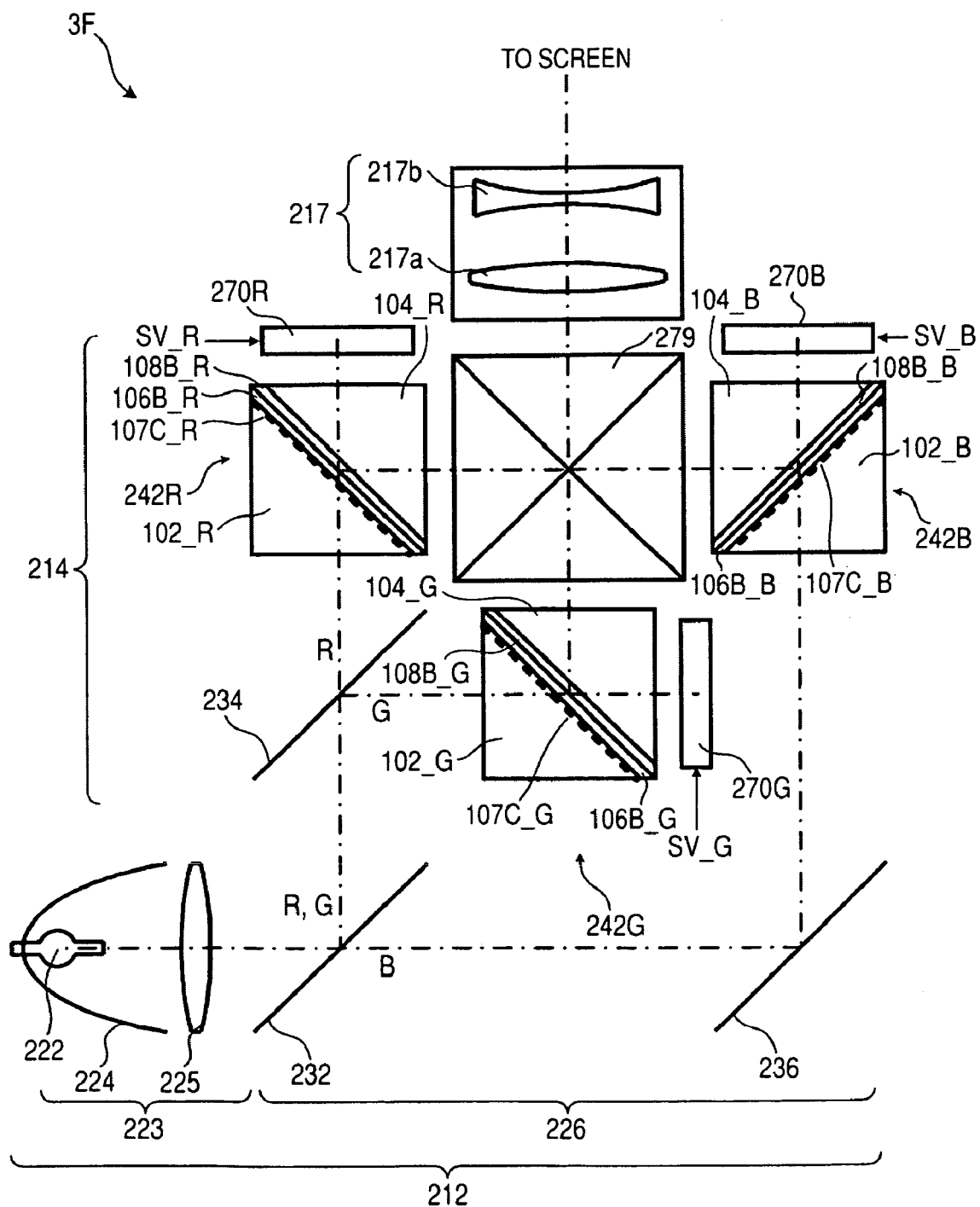
FIG. 28 is a diagram schematically illustrating a projector unit according to a sixth embodiment of the invention to cope with a full color display.

FIG. 28 is a diagram schematically illustrating a projector unit according to a sixth embodiment of the invention to cope with a full color display. Similarly to the projector unit 3E according to the fifth embodiment, the projector unit 3F according to the sixth embodiment employs a projection optical system including three polarizing beam splitters 242 and three reflective liquid crystal panels 270 to correspond to colors of R (Red), G (Green), and B (Blue).

This embodiment is different from the fifth embodiment, similarly to the projector unit 3B_1 or 3D according to the second embodiment or the fourth embodiment, in that a light beam having the P polarization component from the light source is input to the reflective liquid crystal panels 270 and an optical image having the S polarization component spatially modulated on the basis of the image signal SV is enlarged and projected onto a screen by the projection lens 217.

The projector unit 3F includes a light emitting unit 212, an image forming unit 214, and a projection lens 217, similarly to the projector unit 3E according to the fifth embodiment. The light emitting unit 212 includes a light source 222 emitting a white beam, a light-emitting optical system 223, and a color-separating optical system 226, and the configuration is equal to the projector unit 3E according to the fifth embodiment.

The polarizing beam splitters 242R, 242G, and 242B have a function of reflecting or transmitting a light beam depending on the polarization direction of the light beam and have the same structure as the polarizing beam splitter 100B according to the second embodiment in which the first parallel flat layer 106B formed of a wire-grid polarization separating element having a structure that metal grids 107c are disposed on a glass substrate 107b having a certain thickness t_106B with a predetermined pitch to form a metallic grid structure surface 107a and the second parallel flat layer 108B correcting the astigmatism As1 occurring in the first parallel flat layer 106B are interposed between the opposed surfaces of the glass prisms 102 and 104. However, first parallel flat layers 106B_R, 106B_G, and 106B_B and second parallel flat layers 108B_R, 108B_G, and 108B_B are provided to correspond to three colors, thereby optimizing the optical constants thereof.

The optimization by colors is performed because the polarization separating element does not have the wavelength selectivity but the glass substrates 107b thereof are different in dependency of refractive index on wavelength (is different in R, G, and B) in the same material (base material). Accordingly, the colors of R, G, and B need be separately optimized.

The color beams obtained by separating the light beam into three primary colors of R, G, and B by the use of the dichroic mirrors 232 and 234 are input to the polarizing beam splitters 242R, 242G, and 242B, respectively. In the sixth embodiment, the reflective liquid crystal panels 270R, 270G, and 270B are disposed at positions of the polarizing beam splitters 242R, 242G, and 242B at which the P polarized beams are input to the metallic grid structure surfaces 107a of the first parallel flat layers 106B.

The B beam transmitted by the dichroic mirror 232 is reflected by the reflecting mirror 236 and is input to and transmitted by the polarizing beam splitter 242B, and the P polarization component thereof is input to the reflective liquid crystal panel 270B. The panel-output beam (the S polarization component in this embodiment) spatially modulated on the basis of the image information SV_B and output from the reflective liquid crystal panel 270B is input again to the glass prism 102_B of the polarizing beam splitter 242B, is input to and transmitted by the second parallel flat layer 108B_B, and is input to the first parallel flat layer 106B_B. Since the first parallel flat layer 106B_B is formed of a wire-grid polarization separating element, the S polarization component input to the glass substrate 107b is reflected by the metallic grid structure surface 107a, is output from the glass substrate 107b, is input again to and transmitted by the second parallel flat layer 108B_B, and is then input to the glass prism 104_B. The S polarization component input to the glass prism 104_B is transmitted thereby, is output from the output surface (side surface 104b), and is then input to the cross dichroic prism 279.

The G beam reflected by the dichroic mirror 232 and then reflected by the dichroic mirror 234 is input to and transmitted by the polarizing beam splitter 242G, and the P polarization component thereof is input to the reflective liquid crystal panel 270G. The panel-output beam (the S polarization component in this embodiment) spatially modulated on the basis of the image information SV_G and output from the reflective liquid crystal panel 270G is input again to the glass prism 102_G of the polarizing beam splitter 242G, is input to and transmitted by the second parallel flat layer 108B_G, and is input to the first parallel flat layer 106B_G. Since the first parallel flat layer 106B_G is formed of a wire-grid polarization separating element, the S polarization component input to the glass substrate 107b is reflected by the metallic grid structure surface 107a, is output from the glass substrate 107b, is input again to and transmitted by the second parallel flat layer 108B_G, and is then input to the glass prism 104_G. The S polarization component input to the glass prism 104_G is transmitted thereby, is output from the output surface (side surface 104b), and is then input to the cross dichroic prism 279.

The R beam reflected by the dichroic mirror 232 and then transmitted by the dichroic mirror 234 is input to and transmitted by the polarizing beam splitter 242R, and the P polarization component thereof is input to the reflective liquid crystal panel 270R. The panel-output beam (the S polarization component in this embodiment) spatially modulated on the basis of the image information SV_R and output from the reflective liquid crystal panel 270R is input again to the glass prism 102_R of the polarizing beam splitter 242R, is input to and transmitted by the second parallel flat layer 108B_R, and is input to the first parallel flat layer 106B_R. Since the first parallel flat layer 106B_R is formed of a wire-grid polarization separating element, the S polarization component input to the glass substrate 107b is reflected by the metallic grid structure surface 107a, is output from the glass substrate 107b, is input again to and transmitted by the second parallel flat layer 108B_R, and is then input to the glass prism 104_R. The S polarization component input to the glass prism 104_R is transmitted thereby, is output from the output surface (side surface 104b), and is then input to the cross dichroic prism 279.

The three-color beams of R, G, and B guided to the cross dichroic prism 279 are synthesized into a single image-projecting beam by the cross dichroic prism 279 and the resultant beam is guided to the projection lens 217. Thereafter, a full-color optical image (color image) formed with a variation in color polarization in the reflective liquid crystal panels 270R, 270G, and 270B is enlarged and projected onto the screen not shown by the projection lens 217.

Here, while the panel-output beam output from the reflective liquid crystal panel 270R is input to the polarizing beam splitter 242R and is projected to a desired position on the screen by the projection lens 217, the astigmatism As_106B_R (=As1) occurs in the first parallel flat layer 106B_R and the astigmatism As_108B_R (=As2) occurs in the second parallel flat layer 108B_R. Similarly, while the panel-output beam output from the reflective liquid crystal panel 270G is input to the polarizing beam splitter 242G and is projected to a desired position on the screen by the projection lens 217, the astigmatism As_106B_G (=As1) occurs in the first parallel flat layer 106B_G and the astigmatism As_108B_G (=As2) occurs in the second parallel flat layer 108B_G. Similarly, while the panel-output beam output from the reflective liquid crystal panel 270B is input to the polarizing beam splitter 242B and is projected to a desired position on the screen by the projection lens 217, the astigmatism As_106B_B (=As1) occurs in the first parallel flat layer 106B_B and the astigmatism As_108B_B (=As2) occurs in the second parallel flat layer 108B_B.

Here, although the specific numerical values are omitted, the optical constants of the optical members 102, 104, 106B, and 108B of the polarizing beam splitters 242 used in the projector unit 3F according to the sixth embodiment are set so as to correct the astigmatism due to the first parallel flat layers 106A having the polarization separating function by the use of the second parallel flat layers 108A.

Except that the constants are optimized by colors, the basic idea is equivalent to the method of setting the optical constants of the first parallel flat layer 106B and the second parallel flat layer 108B in the polarizing beam splitter 100B according to the second embodiment. As a result, similar to the fifth embodiment, both astigmatism As_106B_R and As_108B_R, both astigmatism As_106B_G and As_108B_G, and both astigmatism As_106B_B and As_108B_B have the opposite sign and substantially the same magnitude and thus are almost cancelled. The total astigmatism As (=|2×As1+2×As2|) is sufficiently small and thus the astigmatism occurring in the optical paths of red, green, and blue is suppressed.

The total astigmatism As (=|2×As1+2×As2|) is equal to or less than a half $F\delta/2$ of the depth of focus $F\delta$ as the first reference allowable astigmatism $As0\_1$ and is equal to or less than a quarter $F\delta/4$ of the depth of focus $F\delta$ as the second reference allowable astigmatism $As0\_2$.

It should be understood by those skilled in the art that various modifications, combinations, sub-combinations, and alternations may occur depending on design requirements and other factors insofar as they are within the scope of the appended claims or the equivalents thereof.

What is claimed is:

1. A polarizing beam splitter comprising:
   first and second prisms each having first and second end surfaces serving as an input surface or an output surface of a light beam and an opposed surface that is one of a plurality of side surfaces; and
   at least a first parallel flat layer, of a plurality of parallel flat layers, a second parallel flat layer, of the plurality of parallel flat layers, and a third parallel flat layer, of the plurality of parallel flat layers, that are disposed in parallel between the opposed surfaces of the first and second prisms,
   wherein the third parallel flat layer is disposed in the front of the first parallel flat layer or in the back of the second parallel flat layer in the optical path;
   wherein the first parallel flat layer polarizes and separates an input beam, and
   wherein the refractive index of a base material of the first and second prisms is Np, the resultant refractive index of the parallel flat layers other than the second flat layer is Na, and the refractive index of the second flat layer is Nb, and $(Na-Np)\times(Nb-Np)<0$ is satisfied.

2. The polarizing beam splitter according to claim 1, wherein the first parallel flat layer is a wire-grid polarization separating element having a flat substrate and a metallic grid formed in stripes with a period much more minute than wavelengths of visible rays on a surface of the flat substrate and separating the polarization of the input beam by the use of the surface having the metallic grid formed thereon.

3. The polarizing beam splitter according to claim 1, wherein the first parallel flat layer has a polarizing film in a main part and serves as a polarization separating element separating the polarization of the input beam as a whole.

4. A projection optical device comprising:
a light source;
a reflective panel generating an optical image in accordance with an image signal;
a projection lens enlarging and projecting the optical image generated by the reflective panel; and
a polarizing beam splitter separating the polarization of a light beam guided from the light source through a predetermined optical path to guide the light beam to the reflective panel and separating the polarization of the light beam reflected by the reflective panel to guide the resultant light beam to the projection lens,
wherein the polarizing beam splitter includes first and second prisms each having first and second end surfaces serving as an input surface or an output surface of a light beam and an opposed surface that is one of a plurality of side surfaces and at least a first parallel flat layer, of a plurality of parallel flat layers, a second parallel flat layer, of the plurality of parallel flat layers, and a third parallel flat layer, of the plurality of parallel flat layers, that are disposed in parallel between the opposed surfaces of the first and second prisms, and the first parallel flat layer polarizes and separates an input beam,
wherein the third parallel flat layer is disposed in the front of the first parallel flat layer or in the back of the second parallel flat layer in the optical path;
wherein the refractive indexes of the parallel flat layers are N–x (where x is an identifier for identifying the parallel flat layers), the thicknesses of the parallel flat layers are t_x, the slope angles of the parallel flat layers about the normal line of the reflective panel are θ, and the refractive index of the first and second prisms is Np, the astigmatism As_x occurring in the parallel flat layers is expressed by Expression 1,
wherein the absolute value of the resultant astigmatism of the astigmatism occurring in all the parallel flat layers other than the second parallel flat layer and the absolute value of the second astigmatism occurring in the second parallel flat layer is greater than the depth of focus F<δ where δ represents the pixel pitch of the reflective panel and F represents the F number of the projection lens, and
wherein the number of times that the light beam reflected by the reflective panel passes through the plurality of flat layers of the polarizing beam splitter at the time of passing through the polarizing beam splitter and being guided to the projection lens is n, the absolute value of a value obtained by adding the second astigmatism to the resultant astigmatism is smaller than 1/n of the depth of focus Fδ:

$$As\_x = -\frac{((N\_x/Np)^2 - 1)\sin^2\theta}{((N\_x/Np)^2 - \sin^2\theta)^{3/2}} \cdot \frac{t\_x}{Np}. \quad (1)$$

5. The projection optical device according to claim 4, wherein the resultant astigmatism and the second astigmatism are greater than ½ of the depth of focus Fδ.

6. The projection optical device according to claim 4 or 5, wherein the absolute value of a value obtained by adding the second astigmatism to the resultant astigmatism is smaller than ½n of the depth of focus Fδ.

7. The projection optical device according to claim 4, wherein the resultant astigmatism and the second astigmatism are opposite each other in sign and have substantially the same magnitude.

8. The projection optical device according to claim 4, wherein the polarizing beam splitter satisfies (Na−Np)×(Nb−Np)<0, where the refractive index of a base material of the first and second prisms is Np, the resultant refractive index of the parallel flat layers other than the second parallel flat layer is Na, and the refractive index of the second parallel flat layer is Nb.

9. The projection optical device according to claim 4, wherein the reflective panel serves to generate the optical image spatially modulated by polarization-rotating the input beam in accordance with the image signal,
wherein the S polarization component of the light beam guided from the light source through a predetermined optical path is reflected by the first parallel flat layer of the polarizing beam splitter and is guided to the reflective panel, and
wherein the P polarization component polarization-rotated in accordance with the image signal by the reflective panel is guided to the polarizing beam splitter, and is then guided to the projection lens through the parallel flat layers of the polarizing beam splitter.

10. The projection optical device according to claim 9, wherein the first parallel flat layer of the polarizing beam splitter is a wire-grid polarization separating element having a flat substrate and a metallic grid formed in stripes with a period much more minute than wavelengths of visible rays on a surface of the flat substrate and separating the polarization of the input beam by the use of the surface having the metallic grid formed thereon.

11. The projection optical device according to claim 9, wherein the first parallel flat layer of the polarizing beam splitter has a polarizing film in a main part and serves as a polarization separating element separating the polarization of the input beam as a whole.

12. The projection optical device according to claim 9, wherein the second parallel flat layer is disposed in the back of the first parallel flat layer in the optical path.

13. The projection optical device according to claim 9, wherein the parallel flat layers other than the first parallel flat layer and the second parallel flat layer are disposed in the front of the first parallel flat layer or in the back of the second parallel flat layer in the optical path.

14. The projection optical device according to claim 4, wherein the reflective panel serves to generate the optical image spatially modulated by polarization-rotating the input beam in accordance with the image signal, wherein the P polarization component of the light beam guided from the light source through a predetermined optical path is guided to the polarizing beam splitter, is made to pass through the parallel flat layers of the polarizing beam splitter in the order of the third parallel flat layer, the first parallel flat layer and the second parallel flat layer, and is guided to the reflective panel, and
wherein the S polarization component polarization-rotated in accordance with the image signal by the reflective panel is guided to the second parallel flat layer of the polarizing beam splitter, is made to pass through the second parallel flat layer, is reflected by the first parallel flat layer, is guided to the second parallel flat layer, and is guided to the projection lens through the second parallel flat layer.

15. The projection optical device according to claim 14, wherein the first parallel flat layer of the polarizing beam splitter is a wire-grid polarization separating element having a flat substrate and a metallic grid formed in stripes with a period much more minute than wavelengths of visible rays on a surface of the flat substrate and separating the polarization of the input beam by the use of the surface having the metallic grid formed thereon.

16. The projection optical device according to claim 14, wherein the parallel flat layers other than the first parallel flat layer and the second parallel flat layer are disposed closer to the reflective panel than the first parallel flat layer.

17. A projection display comprising:
a projection optical device and a chassis housing the projection optical device, wherein the projection optical device includes:
a light source;
a reflective panel generating an optical image in accordance with an image signal;
a projection lens enlarging and projecting the optical image generated by the reflective panel; and
a polarizing beam splitter separating the polarization of a light beam guided from the light source through a predetermined optical path to guide the light beam to the reflective panel and separating the polarization of the light beam reflected by the reflective panel to guide the resultant light beam to the projection lens,
wherein the polarizing beam splitter includes first and second prisms each having first and second end surfaces serving as an input surface or an output surface of a light beam and an opposed surface that is one of a plurality of side surfaces and at least a first parallel flat layer, of a plurality of parallel flat layers, a second parallel flat layer, of the plurality of parallel flat layers, and a third parallel flat layer, of the plurality of parallel flat layers, that are disposed in parallel between the opposed surfaces of the first and second prisms, and the first parallel flat layer polarizes and separates an input beam,
wherein the third parallel flat layer is disposed in the front of the first parallel flat layer or in the back of the second parallel flat layer in the optical path;
wherein the refractive indexes of the parallel flat layers are N–x (where x is an identifier for identifying the parallel flat layers), the thicknesses of the parallel flat layers are t_x, the slope angles of the parallel flat layers about the normal line of the reflective panel are θ, and the refractive index of the first and second prisms is Np, the astigmatism As_x occurring in the parallel flat layers is expressed by Expression 1,
wherein the absolute value of the resultant astigmatism of the astigmatism occurring in all the parallel flat layers other than the second parallel flat layer and the absolute value of the second astigmatism occurring in the second parallel flat layer is greater than the depth of focus F<δ where δ represents the pixel pitch of the reflective panel and F represents the F number of the projection lens, and
wherein the number of times that the light beam reflected by the reflective panel passes through the plurality of flat layers of the polarizing beam splitter at the time of passing through the polarizing beam splitter and being guided to the projection lens is n, the absolute value of a value obtained by adding the second astigmatism to the resultant astigmatism is smaller than 1/n of the depth of focus Fδ:

$$As\_x = -\frac{((N\_x/Np)^2 - 1)\sin^2\theta}{((N\_x/Np)^2 - \sin^2\theta)^{3/2}} \cdot \frac{t\_x}{Np}. \quad (1)$$

18. The projection display according to claim 17, further comprising a rear projection screen onto which an optical image enlarged and projected by the projection lens is projected.

* * * * *